United States Patent
Kim et al.

(10) Patent No.: US 12,537,772 B2
(45) Date of Patent: Jan. 27, 2026

(54) ELECTRONIC DEVICE, AND METHOD FOR PROCESSING RECEIVED DATA PACKET BY ELECTRONIC DEVICE

(71) Applicant: Samsung Electronics Co., Ltd., Suwon-si (KR)

(72) Inventors: Youngwook Kim, Suwon-si (KR); Wonbo Lee, Suwon-si (KR); Youngki Hong, Suwon-si (KR); Sungin Kim, Suwon-si (KR); Hongshik Kim, Suwon-si (KR); Sangsoo Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 237 days.

(21) Appl. No.: 18/475,699

(22) Filed: Sep. 27, 2023

(65) Prior Publication Data
US 2024/0031297 A1    Jan. 25, 2024

Related U.S. Application Data

(63) Continuation of application No. PCT/KR2022/002812, filed on Feb. 25, 2022.

(30) Foreign Application Priority Data

Mar. 29, 2021    (KR) .................. 10-2021-0040160

(51) Int. Cl.
*H04L 47/24* (2022.01)
*H04L 47/12* (2022.01)
*H04L 49/9005* (2022.01)

(52) U.S. Cl.
CPC .............. *H04L 47/24* (2013.01); *H04L 47/12* (2013.01); *H04L 49/9005* (2013.01)

(58) Field of Classification Search
CPC ..... H04L 47/24; H04L 47/12; H04L 49/9005; H04L 67/14; H04L 47/125; H04L 65/612;
(Continued)

(56) References Cited

U.S. PATENT DOCUMENTS

2009/0086660 A1    4/2009  Sood et al.
2012/0036244 A1    2/2012  Ramachandra et al.
(Continued)

FOREIGN PATENT DOCUMENTS

JP        2014-179838 A    9/2014
KR    10-2010-0059915 A    6/2010
(Continued)

OTHER PUBLICATIONS

Extended European Search Report dated Apr. 8, 2024, issued in European Patent Application No. 22781407.6.
(Continued)

*Primary Examiner* — Farzana B Huq
(74) *Attorney, Agent, or Firm* — Jefferson IP Law, LLP

(57) ABSTRACT

An electronic device is provided. The electronic device includes an application processor comprising a plurality of cores, and a communication processor electrically connected to the application processor. The application processor may configure at least one session associated with respective applications based on quality of service (QoS) so as to correspond to at least one core from among the plurality of cores, transmit, to the communication processor, information corresponding to a first core configured for a first session from among the at least one session, receive a data packet of the first session from the communication processor, and process the received data packet of the first session by means of the first core configured for the first session, based on the information corresponding to the first core.

20 Claims, 39 Drawing Sheets

(58) Field of Classification Search
CPC ..... H04L 67/61; H04L 65/80; H04L 67/1012; G06F 9/5027; G06F 9/5033; G06F 9/5044; G06F 9/54; H04W 28/0268
See application file for complete search history.

(56) References Cited

U.S. PATENT DOCUMENTS

| | | |
|---|---|---|
| 2013/0210483 A1 | 8/2013 | Zimmer et al. |
| 2014/0164706 A1 | 6/2014 | Lee |
| 2015/0055457 A1 | 2/2015 | Agarwal et al. |
| 2016/0062438 A1 | 3/2016 | Das et al. |
| 2017/0017611 A1 | 1/2017 | Barroso |
| 2018/0336067 A1 | 11/2018 | Lee et al. |
| 2019/0045421 A1 | 2/2019 | Shah et al. |
| 2019/0132251 A1* | 5/2019 | Dao ................. H04L 69/22 |
| 2020/0127926 A1 | 4/2020 | Kim et al. |
| 2020/0301745 A1 | 9/2020 | Kim et al. |
| 2020/0314037 A1 | 10/2020 | Kim et al. |
| 2020/0328983 A1 | 10/2020 | Liu et al. |
| 2022/0103664 A1* | 3/2022 | Dai ................. H04L 63/20 |
| 2022/0303221 A1* | 9/2022 | Keith ............... H04L 43/16 |
| 2025/0203447 A1* | 6/2025 | Qiao ............... H04W 76/27 |

FOREIGN PATENT DOCUMENTS

| | | |
|---|---|---|
| KR | 10-2012-0114963 A | 10/2012 |
| KR | 10-2014-0056448 A | 5/2014 |
| KR | 10-2015-0114911 A | 10/2015 |
| KR | 10-2017-0134584 A | 12/2017 |
| KR | 10-2018-0126401 A | 11/2018 |
| KR | 10-2020-0043831 A | 4/2020 |
| KR | 10-2020-0112439 A | 10/2020 |
| KR | 10-2020-0114166 A | 10/2020 |
| WO | 2021-020952 A1 | 2/2021 |

OTHER PUBLICATIONS

Korean Office Action dated Mar. 9, 2025, issued in a Korean Patent Application No. 10-2021-0040160.
International Search Report dated May 31, 2022, issued in International Patent Application No. PCT/KR2022/002812.

* cited by examiner

ELECTRONIC DEVICE, AND METHOD FOR PROCESSING RECEIVED DATA PACKET BY ELECTRONIC DEVICE

CROSS-REFERENCE TO RELATED APPLICATION(S)

This application is a continuation application, claiming priority under § 365(c), of an International application No. PCT/KR2022/002812, filed on Feb. 25, 2022, which is based on and claims the benefit of a Korean patent application number 10-2021-0040160, filed on Mar. 29, 2021, in the Korean Intellectual Property Office, the disclosure of which is incorporated by reference herein in its entirety.

BACKGROUND

1. Field

The disclosure relates to an electronic device and a method for processing a received data packet by an electronic device.

2. Description of Related Art

Development of mobile communication technologies has been followed by widespread use of portable terminals that provide various functions, and $5^{th}$ generation (5G) communication systems have thus been developed to satisfy wireless data traffic demands that have been on the increase. It has been considered to implement communication systems in a higher frequency band (for example, 6-60 GHz band) in addition to frequency bands that have been used in $3^{rd}$ generation (3G) communication systems and long-term evolution (LTE) communication systems such that a higher data transmission speed can be provided, in order to accomplish a higher data transmission rate.

For example, an electronic device based on a 5G communication scheme may operate various types of protocol data unit (PDU) sessions including an internet protocol (IP) multimedia subsystem (IMS) protocol data unit (PDU) sessions, an enhanced mobile broadband (eMBB) PDU session, an ultra-reliable and low latency communication (URLLC) PDU session, a massive machine-type communications (mMTC) PDU session, and a local area data network (LADN) PDU session, according to service or application characteristics. For example, the eMBB PDU session may be used for a service or an application requiring a high throughput, and the URLLC PDU session may be used for a service or an application requiring low-latency characteristics.

The above information is presented as background information only to assist with an understanding of the disclosure. No determination has been made, and no assertion is made, as to whether any of the above might be applicable as prior art with regard to the disclosure.

SUMMARY

Data received by an electronic device according to each service or application is transferred in a packet form by an application processor through a communication processor. The communication processor stores the packets in a buffer and then successively transfer the same to the application processor in the received order. The application processor merges multiple packets received from the communication processor through a packet merging module and then transfer the same to an upper layer.

If the application processor includes multiple cores, the application processor distributes received packets to the multiple cores and process the same in a parallel manner. For example, one core (for example, a control core) among the multiple cores of the application processor distributes multiple packets received from the communication processor to one of the multiple cores.

When the communication processor receives packets regarding multiple sessions having different degrees of quality of service (QoS), the control core of the application processor fails to provide a low-latency service because processing of packets (for example, URLLC data) of the low-latency service is delayed by a large amount of normal packets in the course of merging packets in the order in which they are received from the communication processor.

Aspects of the disclosure are to address at least the above-mentioned problems and/or disadvantages and to provide at least the advantages described below. Accordingly, an aspect of the disclosure is to provide an electronic device and a method for processing received data packets by an electronic device, wherein an application processor shares group information based on characteristics (for example, QoS) of an application or a service with a communication processor, and packets received from the communication processor are processed through a corresponding core mapped according to the group information, among multiple cores, thereby reducing the latency resulting from packet processing.

Another aspect of the disclosure is to provide an electronic device and a method for processing received data packets by an electronic device, wherein group information based on characteristics (for example, QoS) of an application or a service is configured to be mapped to each of multiple cores, and packets received from a communication processor are processed through a corresponding core mapped according to the group information, thereby reducing the latency resulting from packet processing.

Additional aspects will be set forth in part in the description which follows and, in part, will be apparent from the description, or may be learned by practice of the presented embodiments.

In accordance with an aspect of the disclosure, an electronic device is provided. The electronic device includes an application processor including multiple cores, and a communication processor electrically connected to the application processor, and the application processor is configured to configure at least one session related to each application such that the at least one session corresponds to at least one core among the multiple cores, based on quality of service (QoS), transmit information corresponding to a first core configured for a first session among the at least one session to the communication processor, receive a data packet of the first session from the communication processor, and process the received data packet of the first session through the first core configured for the first session, based on information corresponding to the first core.

In accordance with another aspect of the disclosure, an electronic device is provided. The electronic device includes an application processor including multiple cores, and a communication processor electrically connected to the application processor, and the application processor is configured to configure at least one session related to each application such that the at least one session corresponds to at least one core among the multiple cores, based on quality of service (QoS), receive a data packet of a first session among the at least one session from the communication processor, store the received data packet of the first session in a logical buffer allocated for a first core configured corresponding to the first session among the multiple cores, and process the data packet of the first session stored in the logical buffer through the first core.

In accordance with another aspect of the disclosure, a method for processing a received data packet by an electronic device is provided. The method includes configuring at least one session related to each application such that the at least one session corresponds to at least one core among multiple cores included in an application processor, based on quality of service (QoS), transmitting information corresponding to a first core configured for a first session among the at least one session to a communication processor by the application processor, receiving a data packet of the first session from the communication processor by the application processor, and processing the received data packet of the first session through the first core configured for the first session, based on information corresponding to the first core.

In accordance with another aspect of the disclosure, a method for processing a received data packet by an electronic device is provided. The method includes configuring at least one session related to each application such that the at least one session corresponds to at least one core among multiple cores included in an application processor, based on quality of service (QoS), receiving a data packet of a first session among the at least one session from the communication processor by the application processor, storing the received data packet of the first session in a buffer allocated for a first core configured corresponding to the first session among the multiple cores, and processing the data packet of the first session stored in the buffer through the first core.

An electronic device and a method for processing received data packets by an electronic device according to various embodiments of the disclosure are advantageous in that, in various embodiments of the disclosure, an application processor shares group information based on characteristics (for example, QoS) of an application or a service with a communication processor, and data packets received from the communication processor are mapped to multiple cores according to the group information and then processed, thereby reducing the latency resulting from packet processing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
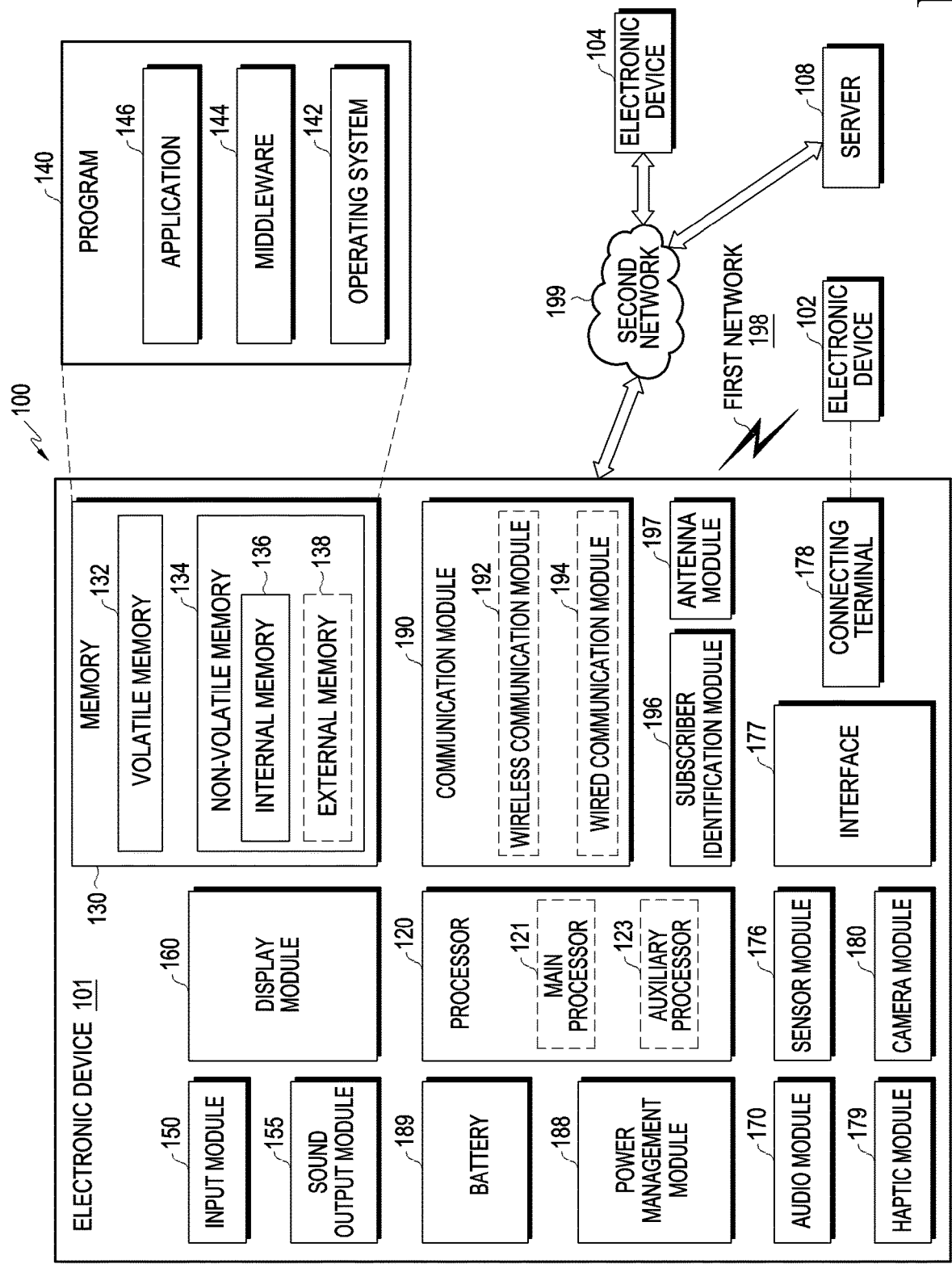
FIG. 1 is a block diagram of an electronic device inside a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
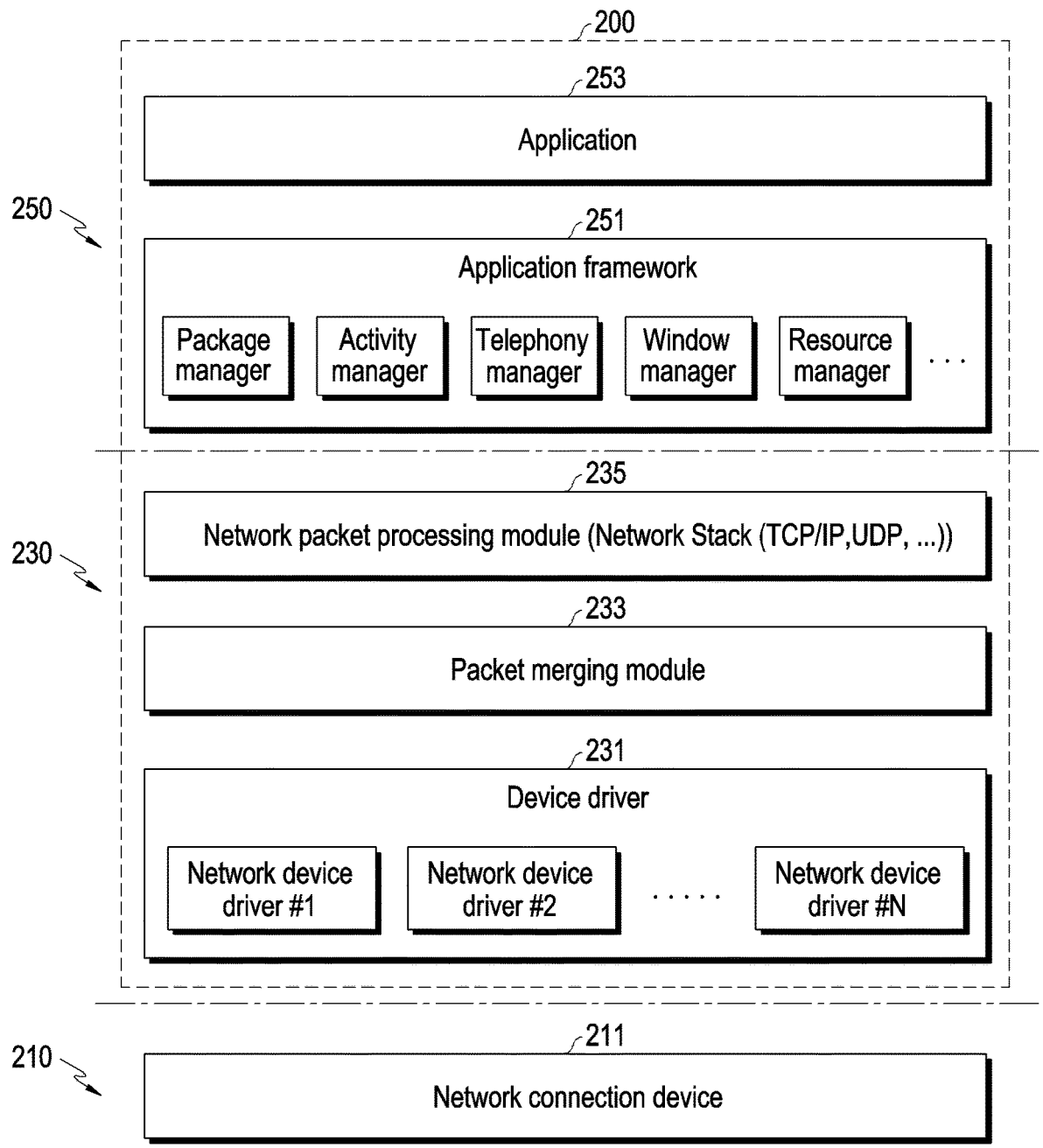
FIG. 2 illustrates a hierarchical configuration for processing data packets according to an embodiment of the disclosure.

FIG. 2 illustrates a hierarchical configuration for data packet processing according to an embodiment of the disclosure.

Referring to FIG. 2, an electronic device according to various embodiments (for example, the electronic device 101 in FIG. 1) may include a device layer 210 for transmitting or receiving data packets (hereinafter, simply referred to as "packets" for convenience of description), a kernel layer 230, and a user layer 250. Operations in the device layer 210 may be executed by a communication processor (CP) (for example, the auxiliary processor 123 in FIG. 1) or a communication module (for example, the communication module 190 in FIG. 1). The kernel layer 220 and the user layer 250 may correspond to a memory address space included in at least a part of a program 140. Operations in the kernel layer 230 and the user layer 250 may be executed by a processor (for example, the processor 120 in FIG. 1) (for example, an application processor (AP)). The processor 120 may perform operations (or functions) in the kernel layer 230 and the user layer 250 through execution of software 200 (for example, the program 140 in FIG. 1). Commands (or instructions) related to the operations may be stored in a memory (for example, the memory 130 in FIG. 1).

According to various embodiments of the disclosure, the device layer 210 may provide an operation of a hardware device for transmitting or receiving packets. The device layer 210 may include a network connection device 211 (for example, a network interface controller (NIC) or a modem). The network connection device 211 may be a hardware device for converting a packet to be transferred by the electronic device 101 through a network into a signal or a bit string and physically transmitting or receiving the same. The packet may include a data packet to be transferred by a transmitting end (or a transmitting-side electronic device) to a receiving end (or a receiving-side electronic device). According to various embodiments of the disclosure, if the network connection device 211 is included in the processor 120 and thus configured as a single processor chip, the network connection device 211 may refer to an interface (for example, an inter-processor communication (IPC) interface) for transferring packets from the communication processor to the application processor.

According to various embodiments of the disclosure, the application processor (AP) (for example, the processor in FIG. 1) 120 may receive packets through the network connection device 211 (for example, the communication module 190 in FIG. 1) and may transmit packets through the network connection device 211. For example, the network connection device 211 may include a communication processor (CP) (for example, the auxiliary processor 123 or the communication module 190 in FIG. 1) and an interface between the communication processor 123 and the processor 120. The AP may transmit packets to an external electronic device (for example, the external electronic device 102 or 104 in FIG. 1) or a server (for example, the server 108 in FIG. 1) through the network connection device 211, and may receive packets transmitted from the external electronic device or server. According to various embodiments of the disclosure, the network connection device 211 may include an interface (for example, a PCIe interface, a USB interface, or a shared memory interface) with a model (for example, the communication processor 123) electrically connected to the processor 120 (for example, an AP). According to various embodiments of the disclosure, the network connection device 211 may be included in the processor 120 (for example, the main processor 121 or the auxiliary processor 123).

According to various embodiments of the disclosure, the kernel layer 230 may be included in the operating system (OS) (for example, the operating system 142 in FIG. 1) of the electronic device (for example, the electronic device 101 in FIG. 1). The kernel layer 230 may control packet processing. The kernel layer 230 may include various modules for processing received packets. The kernel layer 230 may include a device driver 231, a packet merging module 233, and a network packet processing module 235.

According to various embodiments of the disclosure, the device driver 231 may modify received packets such that the same can be processed in an upper layer. The device driver 231 may modify packets so as to conform to the operating system currently operating in the electronic device 101. The device driver 231 may include one or at least two network device drivers (network device driver #1, network device driver #2, . . . , network device driver #N). The network device driver may receive packets based on communication protocols defined by the manufacturer of the network connection device 211. The network device driver may include device drivers of network devices (for example, a modem, a LAN card, Bluetooth, near field communication (NFC), Wi-Fi, a display, audio, video). The network connection device 211 may generate an interrupt (for example, hardware interrupt request (HW IRQ)) in the processor 120 while transmitting packet(s) to the processor 120. The network device driver may receive packets together with an interrupt. Each network device driver may modify received packets into structures.

According to various embodiments of the disclosure, the structures may be stored in a buffer for network processing. The buffer may store structures in a list type for the sake of packet merging. The operation in which packets are modified into structures and then stored may be referred to as packet structuring.

According to various embodiments of the disclosure, the packet merging module 233 may perform operations (for example, merge, flush, or skip) related to packet merging. The packet merging module 233 may transfer received packets to an upper layer (for example, the network packet processing module 235). The packet merging module 233 may transfer structured packets received from the device driver 231 to the upper layer. The packet merging module 233 may merge received packets and transfer the same. The operation related to packet merging may be a technique wherein, upon receiving packets from the network device driver, continuous pieces of packet data, the IP/TCP header information of which is at least partially identical, are merged (or bound) into a single packet, and the merged packet is uploaded to the network packet processing module 235 (for example, a network stack). The packet merging module 233 may merge receive packets and transfer the same to the upper layer in a batch mode, thereby reducing the load of the network packet processing module 235. In addition, through the operation related to packet merging, the number of responses (for example, acknowledge (ACK)) to received packets may be reduced, thereby reducing the load of the network connection device 211. Alternatively, the overall load inside the system may be reduced, and the processing efficiency may thus increase, thereby raising the throughput (Tput).

According to various embodiments of the disclosure, the packet merging module 233 may instantly transfer received packets to the upper layer (for example, TCP/IP (Transmission Control Protocol/Internet Protocol)). If a notification indicating that packet reception is complete is received, or if a specific condition is satisfied, the packet merging module 233 may instantly transfer received packets to the upper layer.

According to various embodiments of the disclosure, the operation in which the packet merging module 233 merges received packets and transfers the same to the upper layer, or instantly transfers received packets to the upper layer, may be referred to as flushing. Flushing may refer to an operation in which structures stored in the buffer of the packet merging module 233 are transferred to the upper layer. The packet merging module 233 may store structures in the buffer in a list type so as to correspond to streams (for example, TCP streams). The packet merging module 233 may include a packet list corresponding to each stream.

According to various embodiments of the disclosure, the operation related to packet merging may be referred to as an offload or a receive offload. The operation related to packet merging may be performed as a function defined in the OS currently operating in the electronic device 101. For example, the operation related to packet merging may include a generic receiver offload (GRO) of Linux™. As another example, the operation related to packet merging may be a receive segment coalescing (RSC) of Windows™.

In various embodiments of the disclosure, if the processor (for example, the processor 120 in FIG. 1) is a multicore processor having multiple cores (core processors), operations of the packet merging module 233 may be performed in a parallel manner by different processors during respective sessions. For example, packets received by at least one network connection device 211 may be transferred to one of multiple core processors, and each of the multiple core processors may simultaneously process packets received from the at least one network connection device 211 in a parallel manner.

According to various embodiments of the disclosure, the network packet processing module 235 may process packets received from the packet merging module 233. The network packet processing module 235 may include a network stack. The network packet processing module 235 may include a network layer (for example, Internet protocol (IP) or Internet control message protocol (ICMP) and a transmission layer (transmission control protocol (TCP) or user datagram protocol (UDP)). The network packet processing module 235 may receive packets from the network connection device 211 through the device driver 231 and the packet merging module 233. The network packet processing module 235 may process packets received from the device driver 231 and the packet merging module 233 such that the same can be processed by the user layer, and may then transfer the processed packets to the user layer. For example, on the IP layer, the network packet processing module 235 may perform IP routing. In addition, for example, on the TCP layer, the network packet processing module 235 may identify a TCP control block. The network packet processing module 235 may identify the IP and port number of the corresponding packet.

According to various embodiments of the disclosure, on the user layer 250, operations may be performed to use packets transferred from the kernel layer 230. On the user layer 250, transferred packets may be used in conformity with the purpose of applications operating on the user layer. For example, a message may be displayed to the user of the electronic device 101, or a video streaming service may be provided. The user layer 250 may include an application framework 251 and an application 253.

According to various embodiments of the disclosure, the application 253 may be driven by an operating system (for example, the operating system 142 in FIG. 1) configured to control resources related to the electronic device and/or on the operating system. The operating system may include, for example, Android™ Linux™, iOS™, Windows™, Symbian™, Tizen™, or Bada™. The application framework 251 may provide a function commonly required by the application 253, or may provide various functions to the application 253 such that the application 253 can use limited system resources inside the electronic device. For example, the application framework 251 may include a package manager, an activity manager, a telephony manager, a window manager, or a resource manager.

According to various embodiments of the disclosure, packets received from the network connection device 211 may be transferred to the network packet processing module 235 (for example, a network stack) through the device driver 231 which may be implemented as software 200 (for example, the program 140 in FIG. 1) via the packet merging module 233, and the application 253 may use packets processed by the network packet processing module 235 (for example, a network stack).

According to various embodiments of the disclosure, the operation related to packet merging provided by the packet merging module 233 may merge multiple received packets into a single packet and transfer the same to the network stack in a batch mode, thereby reducing the processing load of the network stack. A maximum transmission unit (MTU) may be the unit of maximum transmission of packets which may be transferred to the network layer (for example, the IP layer of the network stack). If no operation related to packet merging is applied, the network device driver may transfer packets, the size of which is equal to/less than the MTU, to the network stack. If the operation related to packet merging is applied, the size of packets flushed to the network stack may exceed the MTU (for example, 999 packets or 64 kilobyte (KB)). If the operation related to packet merging is applied, the load of the network stack of the system may decrease, an ACK regarding a small number of packets may be transmitted to the server, and the load of the data transmission hardware (for example, NIC or modem) and the entire network processors may be reduced. However, if the packet merging module 233 unilaterally merges packets and transfers the same to the upper layer, the network speed may fail to increase rapidly because of delayed transmission of an ACK regarding received packets if the network speed is low, for example, as in the initial phase of packet transmission.

According to various embodiments of the disclosure, a transmission protocol, such as TCP may increase the window size whenever an ACK is received for congestion control. For example, in the initial phase of transmission, the window size may be exponentially until a threshold is exceeded whenever an ACK is received. For example, in the initial phase of transmission, the faster an ACK regarding a transmitted packet, the faster the network speed may increase. However, if a small amount of ACKs is transmitted, the increase in network speed is slow, and this may slow down the time until the first screen starts during streaming video playback. For example, if a single ACK is transmitted with regard to multiple merged packets instead of transmitting an ACK with regard to each received packet, the transmitting end may increase the window size in view of the single ACK. If the operation related to packet merging is applied, the number of times the ACK occurs may decrease, and the throughput may be lower than when no operation related to packet merging is applied. The better the network situation, the larger the number of times the ACK occurs, and the throughput resulting from the operation related to packet merging may thus decrease.

According to various embodiments of the disclosure, based on characteristics (for example, IP type or application type) of a session corresponding to a received data packet, packets may be merged adaptively (or variably) and transferred to the upper layer, or received packets may be instantly transferred to the upper layer, thereby improving the throughput. The operation in which the packet merging module 233 transfers packets (for example, merged packets) to the upper layer (for example, the network packet processing module 235) may be referred to as flushing.

Figure 3:
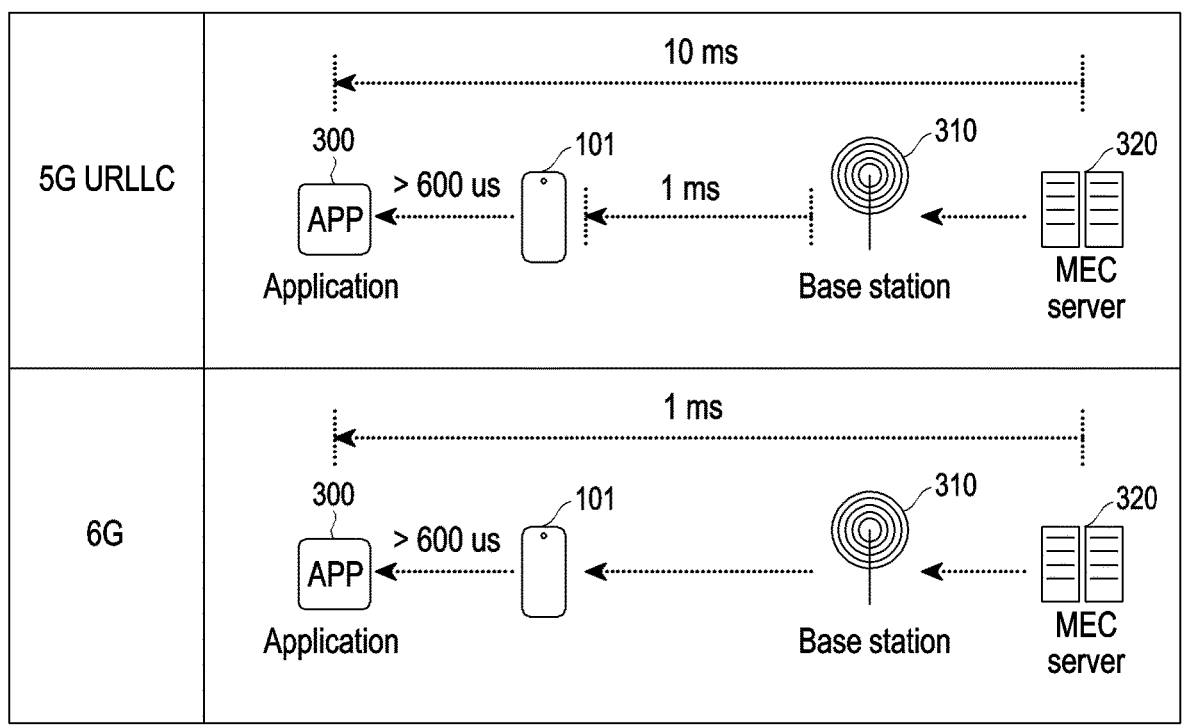
FIG. 3 illustrates a transmission delay between an electronic device and a server according to an embodiment of the disclosure.

FIG. 3 illustrates a transmission delay between an electronic device and a server according to an embodiment of the disclosure.

Referring to FIG. 3, URLLC data that supports an ultra-low-latency service in a 5G communication network may be processed within 10 ms from a server 320 (for example, a mobile edge computing (MEC) server) to an application 300 through a base station 310. In a 6G communication network, the URLLC data may be processed within 1 ms from the server 320 to the application 300. The shorter the target processing time from the server 320 to the application 300 inside the electronic device 101, the larger the relative proportion of time occupied to process packets inside the electronic device 101. For example, the simultaneous occurrence of a low-latency service (for example, a cloud game or V2X) and a large amount of traffic (for example, a high-quality video) may delay the final processing time of the low-latency service. Hereinafter, a time delay that may occur during packet processing inside the electronic device 101 will be described with reference to FIG. 4 and FIG. 5.

Figure 4:
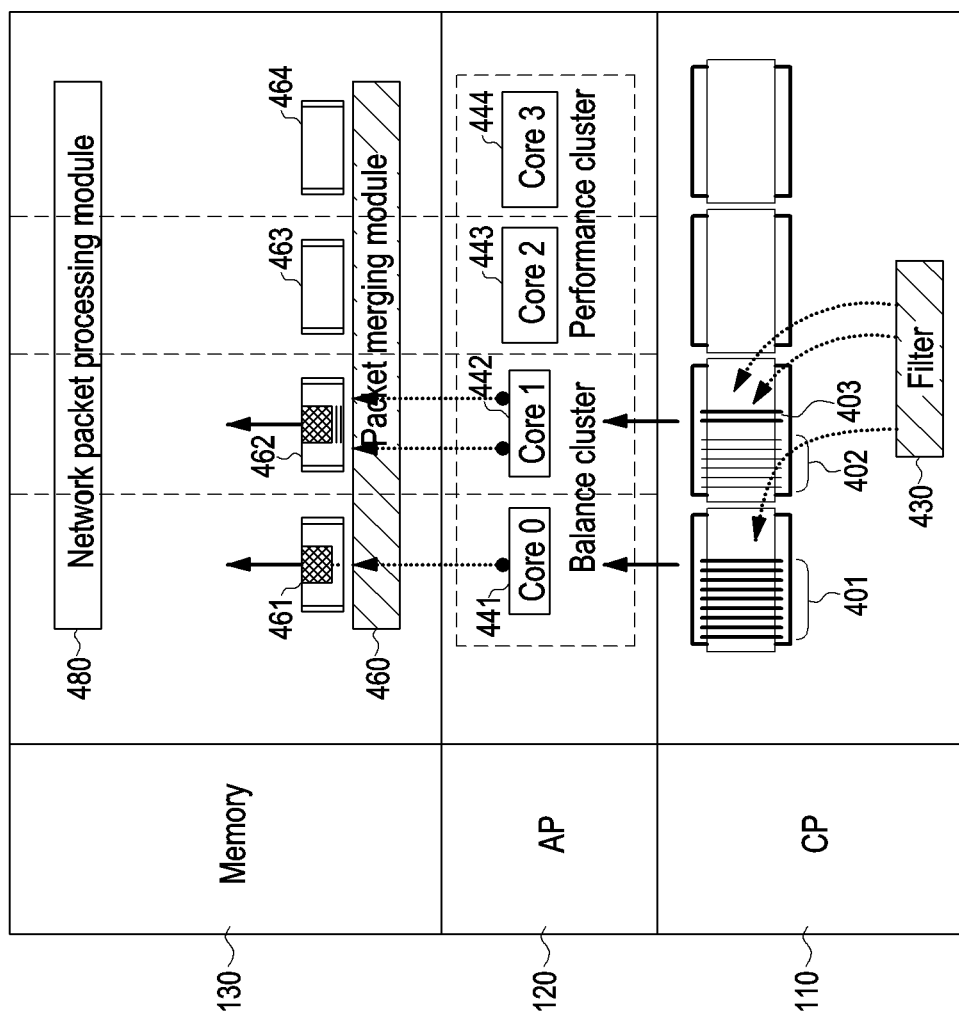
FIG. 4 illustrates a RSS-type data packet processing by an electronic device according to an embodiment of the disclosure.

FIG. 4 illustrates receive side steering (RSS) type data packet processing by an electronic device according to an embodiment of the disclosure.

Referring to FIG. 4, the electronic device 101 may include a CP 110 (for example, a communication module 190), a processor 120 (for example, the processor 120 in FIG. 1) (hereinafter, referred to as an AP for convenience of description), and a memory 130 (for example, the memory 130 in FIG. 1). The AP 120 may include multiple cores (or core processors) and although it is assumed in the following description that the AP 120 includes four cores (for example, a first core 441 (core 0), a second core 442 (core 1), a third core 443 (core 2), and a fourth core 444 (core 3)) for convenience of description, embodiments described below are not limited to the above number. According to various embodiments of the disclosure, the first core 441 and the second core 442 may be referred to as a balance cluster, and the third core 443 and the fourth core 444 may be referred to as a performance cluster. The cores corresponding to the performance cluster may have a relatively excellent performance compared with the cores corresponding to the balance cluster and may have a larger battery consumption. The cores corresponding to the balance cluster may have a relatively low performance compared with the cores corresponding to the performance cluster and may have a smaller battery consumption. The cores corresponding to the balance cluster may be referred to as little cores, and the cores corresponding to the performance cluster may be referred to as big cores, but embodiments described below are not limited to the above terms. According to various embodiments of the disclosure, a core having an intermediate performance between the balance cluster and the performance cluster may be referred to as a middle core.

According to various embodiments of the disclosure, the CP 110 may include a filter 430 and multiple buffers. Packets received by the CP 110 may be distributed to one of the multiple buffers through the filter 430. The filter 430 may identify the header of received packets (or hash the header) such that packets of the same session (or same flow) are stored in the same buffer. For example, packets 401 of the first session may be stored in the first buffer through the filter 430, and packets 402 of the second session and packets 403 of the third session may be stored in the second buffer through the filter 430. The packets 401 of the first session stored in the first buffer may be transferred to the AP 120, and the AP 120 may control the packets 401 of the first session received from the first buffer so as to be processed through the first core 441. The packets 402 of the second session and the packets 403 of the third session stored in the second buffer may be transferred to the AP 120, and the AP 120 may control the packets 402 of the second session and the packets 403 of the third session received from the second buffer so as to be processed through the second core 442.

According to various embodiments of the disclosure, packets transferred to respective cores may undergo an operation related to packet merging through a packet merging module 460 (for example, the packet merging module 233 in FIG. 2). For example, the packet merging module 460 may perform an operation related to packet merging (for example, merge, flush, or skip). The packet merging module 460 may transfer received packets to the upper layer (for example, a network packet processing module 480 (for example, the network packet processing module 235 in FIG. 2)). A specific embodiment of the packet merging module 460 has been described with reference to FIG. 2, and detailed descriptions thereof will be omitted herein.

According to various embodiments of the disclosure, if the AP 120 (for example, the processor 120 in FIG. 1) is a multi-core processor having multiple cores (for example, core processors) as illustrated in FIG. 4, operations of the packet merging module 460 may be performed in a buffer 461 corresponding to the first core 441, a buffer 462 corresponding to the second core 442, a buffer 463 corresponding to the third core 443, and a buffer 464 corresponding to the fourth core 444 in a parallel manner. For example, packet data 401 of the first session allocated to the first core 441 may be stored in the buffer 461 corresponding to the first core 441 and may then undergo an operation related to packet merging. At the same time, packet data 402 of the second session or packet data 403 of the third session, allocated to the second core 442, may be stored in the buffer 462 corresponding to the second core 442 and may then undergo an operation related to packet merging in a parallel manner. Data packets which have been stored in the buffer 461 corresponding to the first core 441 and then merged and data packets which have been stored in the buffer 462 corresponding to the second core 442 and then merged may be transferred to the network packet processing module 480.

According to various embodiments of the disclosure, if packet data 403 of the third session is low-latency service data, a time delay may occur because packet merging may be performed after completing packet merging with regard to the packet data 402 of the second session. In addition, the packet data 403 of the third session may be processed through cores (for example, the first core 441 and the second 442) corresponding to the balance cluster, instead of cores (for example, the third core 443 and the fourth core 444) corresponding to the performance cluster, and the processing speed may thus decrease relatively.

Figure 5:
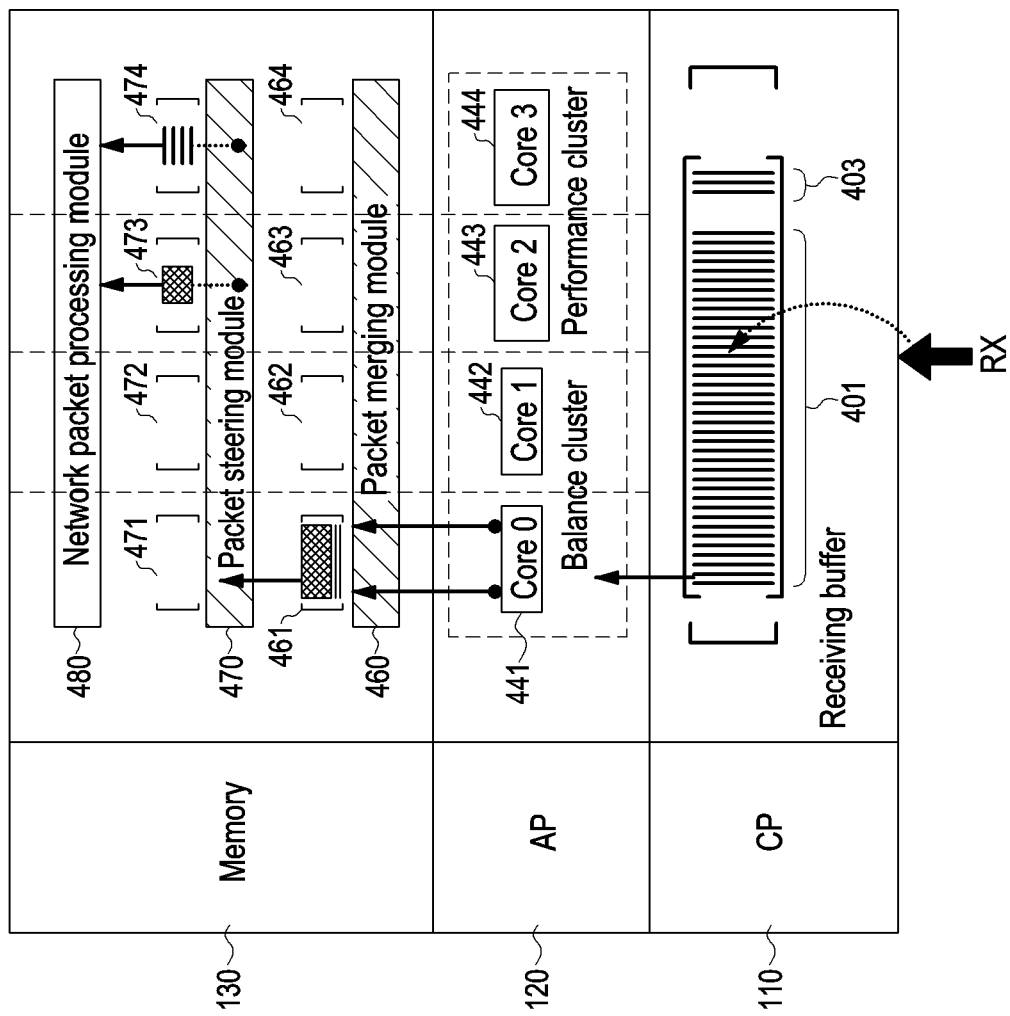
FIG. 5 illustrates a RSS-type data packet processing by an electronic device according to an embodiment of the disclosure.

FIG. 5 illustrates a receive packet steering (RPS) type data packet processing by an electronic device according to an embodiment of the disclosure.

Referring to FIG. 5, the electronic device 101 may include a CP 110 (for example, a communication module 190), an AP 120, and a memory 130 (for example, the memory 130 in FIG. 1). The AP 120 may include multiple cores (or core processors). According to various embodiments of the disclosure, the first core 441 and the second core 442 may be referred to as a balance cluster, and the third core 443 and the fourth core 444 may be referred to as a performance cluster. According to various embodiments of the disclosure, the CP 110 may include a filter 430 and multiple buffers. The multiple buffers included in the CP 110 may be a single buffer from a physical point of view, or may be multiple virtual buffers implemented by software.

Packets input to the CP 110 may be input to a single receiving buffer. The receiving buffer may store multiple packets according to the order in which they are input to the CP 110. For example, the receiving buffer may store packets 401 of a first session and then store packets 403 of a third session.

The packets 401 of the first session and the packets 403 of the third session, successively stored in the receiving buffer, may be transferred to the AP 120, and the AP 120 may control the packets 401 of the first session and the packets 403 of the third session, received from the first buffer, so as to be processed through the first core 441.

According to various embodiments of the disclosure, packets transferred to the first core 441 may undergo an operation related to packet merging through the packet merging module 460 (for example, the packet merging module 233 in FIG. 2). For example, the packet merging module 460 may perform an operation related to packet merging (for example, merge, flush, or skip). The packet merging module 460 may transfer received packets 401 of the first session and packets 403 of the third session to the upper layer (for example, the network packet processing module 480 (for example, the network packet processing module 235 in FIG. 2)) through a packet steering module 470. The packet merging module 460 has been described with reference to FIG. 2, and detailed descriptions thereof will be omitted herein.

According to various embodiments of the disclosure, the packet merging module 460 may cause data packets 401 of the first session and data packets 403 of the third session, which have been stored in the buffer 461 of the first core 441 and then subjected to packet merging, to be processed by separate cores, respectively, through the packet steering module 470. For example, the packet steering module 470 may receive merged packets and may store the same in a buffer 471 corresponding to the first core 441, may store the same in a buffer 472 corresponding to the second core 442, may store the same in a buffer 473 corresponding to the third core 443, or may store the same in a buffer 474 corresponding to the fourth core 444. For example, packets stored in the buffer 471 corresponding to the first core 441 may be processed through the network packet processing module 480 of the first core 441, packets stored in the buffer 472 corresponding to the second core 442 may be processed through the network packet processing module 480 of the second core 442, packets stored in the buffer 473 corresponding to the third core 443 may be processed through the network packet processing module 480 of the third core 443, and packets stored in the buffer 474 corresponding to the fourth core 444 may be processed through the network packet processing module 480 of the fourth core 444.

For example, the first session data packet 401 may be stored in the buffer 461 corresponding to the first core 441, merged, and then transferred to the network packet processing module 480 of the third core 443, and the third session data packet 403 may be stored in the buffer 461 corresponding to the first core 441, merged, and then transferred to the network packet processing module 480 of the fourth core 444. According to various embodiments of the disclosure, if the AP 120 (for example, the processor 120 in FIG. 1) is a multi-core processor having multiple cores (for example, core processors) as illustrated in FIG. 5, the third session data packet 403 corresponding to low-latency service data may undergo network packet processing by a core separately from the first session data packet 401. However, the first session data packet 401 undergoes packet merging in the first core 441 and is then redistributed to the fourth core 444. Accordingly, packet merging may be performed after packet merging is completed with regard to the packet data 401 of the first session, thereby causing a time delay. Hereinafter, various embodiments will be described with reference to FIGS. 6 to 8, 9A, 9B, 10A, 10B, 11A, 11B, 12 to 23, 24A, 24B, 25, 26, 27A, 27B, 28A, 28B, 29A, 29B, and 30 to 34, wherein packets are mapped to multiple cores according to group information based on characteristics (for example, QoS) of an application or a service and then processed, thereby reducing the latency resulting from packet processing.

Although the AP 120 and the CP 110 will be separately described as different components in various embodiments described below, the AP 120 and the CP 110 are not necessary configured as separate chips. For example, the AP 120 and the CP 110 may be configured as separate chips, respectively, or configured such that an application processor and a communication processor are included in a single chip. According to various embodiments described below, a controller 410 may be included in the AP 120 in various embodiments of the disclosure, and may be included in a hardware component separately from the AP 120. For example, the controller 410 may be stored as a program 140 in the memory 130 in FIG. 1, or implemented as one of an operating system 142 (for example, Android™, Linux™, iOS™, Windows™, Symbian™, Tizen™, or Bada™), middleware 144, or an application 146.

Figure 6:
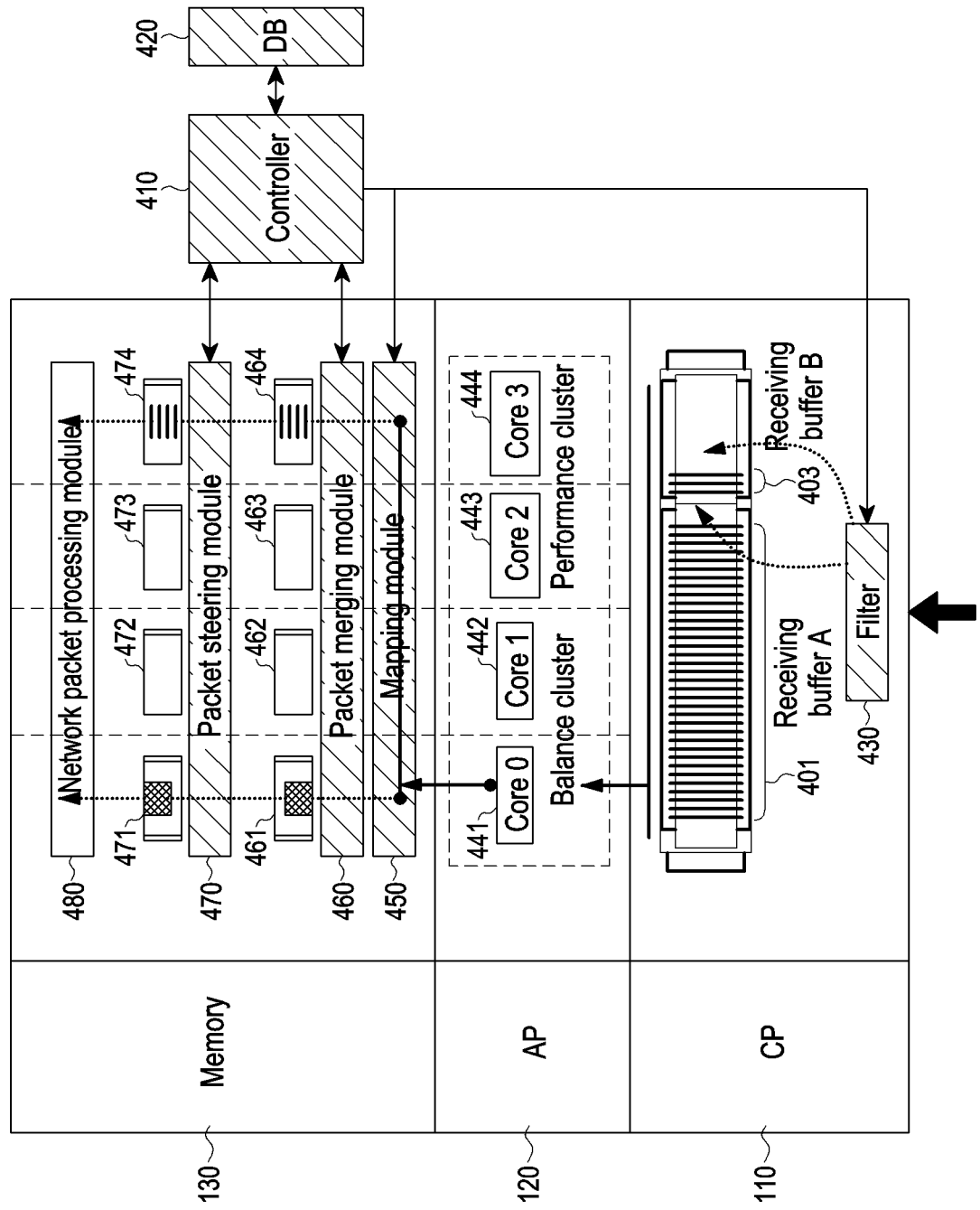
FIG. 6 illustrates data packet processing by an electronic device according to an embodiment of the disclosure.

FIG. 6 illustrates data packet processing by an electronic device according to an embodiment of the disclosure.

Referring to FIG. 6, the electronic device 101 may include a CP 110 (for example, a communication module 190), an AP 120, and a memory 130 (for example, the memory 130 in FIG. 1). The AP 120 may include multiple cores (or core processors). According to various embodiments of the disclosure, the first core 441 and the second core 442 may be referred to as a balance cluster, and the third core 443 and the fourth core 444 may be referred to as a performance cluster. According to various embodiments of the disclosure, the CP 110 may include a filter 430 and multiple buffers. The multiple buffers included in the CP 110 may be a single buffer physically, and may be divided logically.

According to various embodiments of the disclosure, the controller 410 may transmit session-specific group information to the filter 430 of the CP 110, based on information stored in a database 420. The filter 430 may receive session-specific group information from the controller 410 and may store the same in a buffer mapped to the corresponding group according to the session of received packets. For example, the filter 430 may receive session-specific group information from the controller 410 and may generate a buffer (for example, a logical buffer) corresponding to the corresponding group. Referring to FIG. 6, receiving buffer A and receiving buffer B may be generated as two logical buffers corresponding to two groups. For example, the controller 410 may map the first session to the first group, map the third session to the second group, and may store the same in the database 420. The controller 410 may transmit each session-specific group information to the filter 430 in the CP 110. The filter 430 may receive session-specific group information from the controller 410 and may generate receiving buffer A corresponding to the first group and receiving buffer B corresponding to the second group.

According to various embodiments of the disclosure, the filter 430 may receive a data packet corresponding to each session and inspect the header of the corresponding data packet, thereby identifying the session of the received data packet. For example, if the session of a received data packet is identified as a data packet 401 of the first session, the filter 430 may store the identified data packet 401 of the first session in receiving buffer A generated so as to correspond to the first group mapped to the first session. If the session of a received data packet is identified as a data packet 403 of the third session, the filter 430 may store the identified data packet 403 of the third session in receiving buffer B generated so as to correspond to the second group mapped to the third session.

Packets 401 of the first session and packets 403 of the third session, stored in respective receiving buffers, may be transferred to the control core (for example, the first core 441 (core 0)) of the AP 120. When transferring the packets to the AP 120, the CP 110 may also transfer meta-information (for example, the buffer number (or group number), the starting position of buffers, the ending position of buffers, the number of packets of buffers, or the number of sessions of buffers) related to corresponding receiving buffers generated so as to correspond to respective groups. According to various embodiments of the disclosure, the control core (for example, the first core 441) of the AP 120 may distribute received packets to cores configured through a mapping module 450 based on information regarding mapping between groups and cores received from the controller 410 before the received packets are merged. For example, the mapping module 450 of the first core 441 may transmit data packets 401 of the first session received from receiving buffer A to the packet merging module 460 of the first core 441, based on information received from the controller 410. The mapping module 450 of the first core 441 may transmit data packets 403 of the third session received from receiving buffer B to the packet merging module 460 of the fourth core 444, based on information received from the controller 410.

According to various embodiments of the disclosure, packets 401 of the first session transferred to the first core 441 may be stored in a buffer 461 corresponding to the first core 441 and subjected to an operation related to packet merging through the packet merging module 460 (for example, the packet merging module 233 in FIG. 2). For example, the packet merging module 460 may perform an operation related to packet merging (for example, merge, flush, or skip). Packets 403 of the third session transferred to the fourth core 444 may be stored in a buffer 464 corresponding to the fourth core 444 and subjected to an operation related to packet merging through the packet merging module 460 (for example, the packet merging module 233 in FIG. 2). According to various embodiments of the disclosure, the packet merging module 460 described later with reference to FIG. 6 and FIG. 7 may independently apply a packet merging policy for each session inside respective cores 441, 442, 443, and 444 under the control of the controller 410, or may independently apply a packet merging policy with regard to respective cores 441, 442, 443, and 444.

According to various embodiments of the disclosure, the packet merging module 460 may cause data packets 401 of the first session subjected to packet merging through the first core 441 to be processed in separate cores, respectively, through the packet steering module 470. For example, the packet steering module 470 may receive data packets 401 of the first session subjected to packet merging and may store the same in the buffer 471 corresponding to the first core 441. The data packets 401 of the first session stored in the buffer 471 corresponding to the first core 441 may be processed through the network packet processing module 480 of the first core 441. The packet merging module 460 may cause data packets 403 of the third session subjected to packet merging through the fourth core 444 to be processed in separate cores, respectively, through the packet steering module 470. For example, the packet steering module 470 may receive data packets 403 of the third session subjected to packet merging and may store the same in the buffer 474 corresponding to the fourth core 444. The data packets 403 of the third session stored in the buffer 474 corresponding to the fourth core 444 may be processed through the network packet processing module 480 of the fourth core 444.

According to various embodiments of the disclosure, if the third session is related to a low-latency service, data packets 403 of the third session may be separately mapped to the fourth core 444 of the performance cluster, which has a relatively excellent performance, and merged, prior to merging data packets 401 of the first session, thereby reducing the delay resulting from packet processing. According to various embodiments of the disclosure, the controller 410 may control the packet merging module 460 such that the packet merging policy of the packet merging module 460 is applied with regard to each core. According to various embodiments of the disclosure, the controller 410 may control the mapping module 450 and/or the packet steering module 470 as described above such that data packets of a specific session corresponding to a group mapped to each session are processed through the configured core. According to various embodiments of the disclosure, if data packets 403 of the third session are related to a low-latency service, the same may be directly transmitted from the mapping module 450 to the network packet processing module 480 without going through the packet merging module 460 and/or the packet steering module 470 for fast packet processing.

Figure 7:
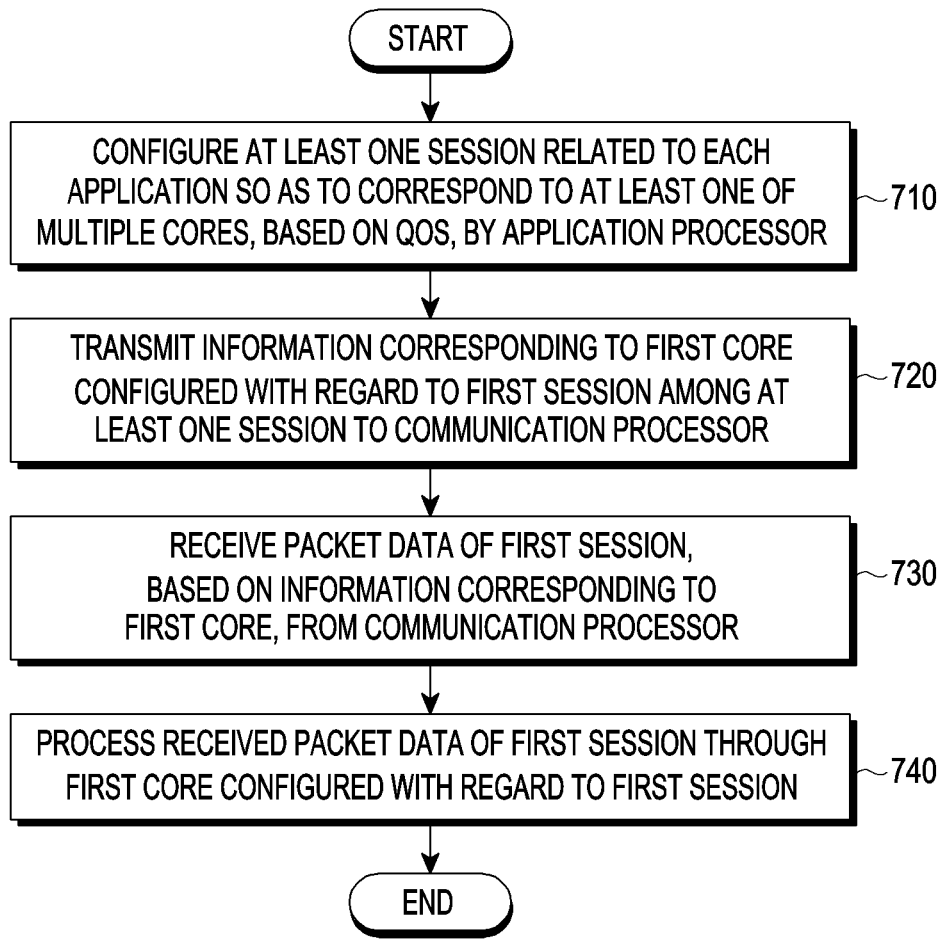
FIG. 7 illustrates a flow of operations for data packet processing by an electronic device according to an embodiment of the disclosure.

FIG. 7 illustrates a flow of operations for data packet processing by an electronic device according to an embodiment of the disclosure.

Referring to FIG. 7, the electronic device 101 may include an application processor (for example, the processor 120 in FIG. 1) including multiple cores, and a communication processor 120 (CP) (for example, the communication module 190 in FIG. 1) electrically connected to the application processor.

According to various embodiments of the disclosure, the application processor of the electronic device 101 may configure at least one session related to each application so as to correspond to at least one core, among the multiple cores, based on the quality of service (QoS) in operation 710. For example, the application processor may map at least one session related to each application to a group and may map the group to a specific core among the multiple cores.

According to various embodiments of the disclosure, the application processor of the electronic device 101 may transmit information (for example, first group information) corresponding to a first core configured with regard to a first session, among the at least one session, to the communication processor in operation 720. According to various embodiments of the disclosure, the communication processor of the electronic device 101 may generate a logical buffer corresponding to each group, based on information received from the application processor.

According to various embodiments of the disclosure, the application processor of the electronic device 101 may receive packet data of the first session from the communication processor, based on information corresponding to the first core (for example, meta-information of receiving buffer A allocated to group A corresponding to the first core), in operation 730. For example, when transferring the packets to the AP 120, the communication processor may also transfer meta-information (for example, the buffer number (or group number), the starting position of buffers, the ending position of buffers, the number of packets of buffers, or the number of sessions of buffers) related to corresponding receiving buffers generated so as to correspond to respective groups.

According to various embodiments of the disclosure, the application processor of the electronic device 101 may process the received packet data of the first session through a first core configured with regard to the first session in operation 740. Packet data of the second session configured for group B, which is a group different from the first session, may be processed through a second core configured with regard to group B.

Figure 8:
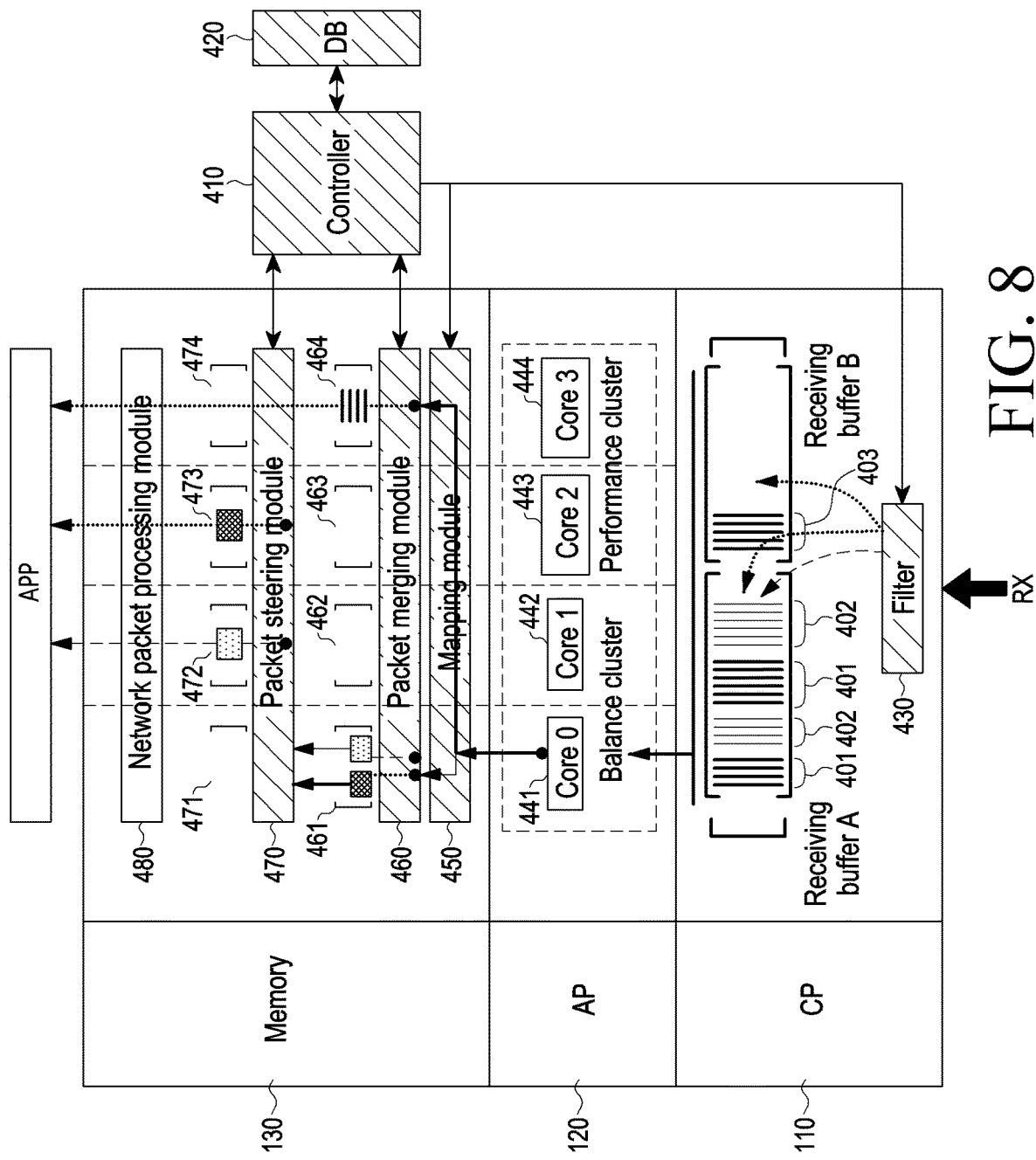
FIG. 8 illustrates data packet processing by an electronic device according to an embodiment of the disclosure.

FIG. 8 illustrates data packet processing by an electronic device according to an embodiment of the disclosure.

Referring to FIG. 8, the electronic device 101 may include a CP 110 (for example, a communication module 190), an AP 120, and a memory 130 (for example, the memory 130 in FIG. 1). The AP 120 may include multiple cores (or core processors). According to various embodiments of the disclosure, the first core 441 and the second core 442 may be referred to as a balance cluster, and the third core 443 and the fourth core 444 may be referred to as a performance cluster. According to various embodiments of the disclosure, the CP 110 may include a filter 430 and multiple buffers. The multiple buffers included in the CP 110 may be a single buffer physically, and may be divided logically.

According to various embodiments of the disclosure, the controller 410 may transmit session-specific group information to the filter 430 of the CP 110, based on information stored in the database 420. The filter 430 may receive session-specific group information from the controller 410 and may store the same in a buffer mapped to the corresponding group according to the session of received packets. For example, the filter 430 may receive session-specific group information from the controller 410 and may generate a buffer (for example, a logical buffer) corresponding to the corresponding group. Referring to FIG. 8, receiving buffer A and receiving buffer B may be generated as two logical buffers corresponding to two groups. For example, the controller 410 may map the first session and the second session to the first group, map the third session to the second group, and may store the same in the database 420. The controller 410 may transmit each session-specific group information to the filter 430 in the CP 110. The filter 430 may receive session-specific group information from the controller 410 and may generate receiving buffer A corresponding to the first group and receiving buffer B corresponding to the second group.

According to various embodiments of the disclosure, the filter 430 may receive a data packet corresponding to each session and inspect the header of the corresponding data packet, thereby identifying the session of the received data packet. For example, if the session of a received data packet is identified as a data packet 401 of the first session or a data packet 402 of the second session, the filter 430 may store the data packet 401 of the first session or the data packet 402 of the second session, which has been identified, in receiving buffer A generated so as to correspond to the first group mapped to the first session or the second session. If the session of a received data packet is identified as a data packet 403 of the third session, the filter 430 may store the identified data packet 403 of the third session in receiving buffer B generated so as to correspond to the second group mapped to the third session.

Packets 401 of the first session, packets 402 of the second session, and packets 403 of the third session, stored in respective receiving buffers, may be transferred to the control core (for example, the first core 441 (core 0)) of the AP 120. When transferring the packets to the AP 120, the CP 110 may also transfer meta-information (for example, the buffer number (or group number), the starting position of buffers, the ending position of buffers, the number of packets of buffers, or the number of sessions of buffers) related to corresponding receiving buffers generated so as to correspond to respective groups. According to various embodiments of the disclosure, the control core (for example, the first core 441) of the AP 120 may distribute received packets to cores configured through a mapping module 450 based on information regarding mapping between groups and cores received from the controller 410 before the received packets are merged. For example, the mapping module 450 of the first core 441 may transmit data packets 401 of the first session and data packets 402 of the second session, received from receiving buffer A, to the packet merging module 460 of the first core 441, based on information received from the controller 410. The mapping module 450 of the first core 441 may transmit data packets 403 of the third session received from receiving buffer B to the packet merging module 460 of the fourth core 444, based on information received from the controller 410.

According to various embodiments of the disclosure, packets 401 of the first session and packets 402 of the second session, stored in a buffer 461 corresponding to the first core 441, may undergo an operation related to packet merging through the packet merging module 460 (for example, the packet merging module 233 in FIG. 2) of the first core 441. For example, the packet merging module 460 may perform an operation related to packet merging (for example, merge, flush, or skip). Packets 403 of the third session stored in a buffer 464 corresponding to the fourth core 444 may undergo an operation related to packet merging through the packet merging module 460 (for example, the packet merging module 233 in FIG. 2) of the fourth core 444.

According to various embodiments of the disclosure, the packet merging module 460 may cause data packets 401 of the first session, data packets 402 of the second session, and data packets 403 of the third session, which have undergone packet merging through the first core 441 and the fourth core 444, to be processed in separate cores, respectively, through the packet steering module 470. For example, the packet steering module 470 may receive data packets 401 of the first session subjected to packet merging through the first core 441 and may store the same in a buffer 472 corresponding to the second core 442. The data packets 401 of the first session stored in the buffer 472 corresponding to the second core 442 may be processed through the network packet processing module 480 of the second core 442. The packet steering module 470 may receive the data packets 402 of the second session merged by the first core 441 and may store the same in a buffer 473 corresponding to the third core 443. The data packets 402 of the second session stored in the buffer 473 corresponding to the third core 443 may be processed through the network packet processing module 480 of the third core 443. The packet steering module 470 may store the data packets 403 of the third session merged by the fourth core 444 in a buffer 474 corresponding to the fourth core 444. The data packets 403 of the third session stored in the buffer 474 corresponding to the fourth core 444 may be processed through the network packet processing module 480 of the fourth core 444.

According to various embodiments of the disclosure, the controller 410 may determine the operating core of data packets 402 of each session, based on meta-information of each receiving buffer (for example, receiving buffer A and receiving buffer B) and/or state information of each session transferred from the CP 110 to the AP 120. For example, the controller 410 may determine a core to perform packet merging through the packet merging module 460 with regard to respective session-specific data packets and/or a core to perform network packet processing through the network packet processing module 480, based on meta-information of each receiving buffer and/or state information of each session transferred from the CP 110 to the AP 120. According to various embodiments of the disclosure, the controller 410 may adjust the level of packet merging of the corresponding packet merging module 460 when respective session-specific data packets undergo packet merging, based on meta-information of each receiving buffer and/or state information of each session transferred from the CP 110 to the AP 120.

According to various embodiments of the disclosure, receiving buffers (for example, receiving buffer A and receiving buffer B) of the CP 110 are memory spaces in which packets received from the CP 110 are stored. According to a request of the AP 120 or the controller 410 to add a group, a new receiving buffer corresponding to the corresponding group may be added or, according to a request thereof to delete a group, the receiving buffer corresponding to the corresponding group may be deleted.

According to various embodiments of the disclosure, the mapping module 450 may identify meta-information (or metadata) transferred from the CP 110 and may distribute received packet data of each session to the corresponding core. The mapping module 450 may identify core mapping information regarding a packet merging module 460 regarding a receiving buffer (for example, receiving buffer A or receiving buffer B) generated with regard to each group through the controller 410. The mapping module 450 may allocate a corresponding buffer to each core, based on the result of identification, and may activate the mapped core.

According to various embodiments of the disclosure, the controller 410 may monitor applications (apps), services, or frameworks. The controller 410 may monitor a specific app, a specific service, or a specific session and may provide relevant information to the filter 430 of the CP 110, based on information stored in the database. The controller 410 may transfer a packet merging policy configured with regard to each operating core to the packet merging module 460. The controller 410 may monitor the mapping module 450 and the packet merging module 460, may add a group according to a configured condition, and may transfer the same to the CP 110. Alternatively, the controller 410 may update a core (for example, the core of the packet merging module 460 or the core of the network packet processing module 480) mapped to a receiving buffer corresponding to a specific group according to a configured condition.

According to various embodiments of the disclosure, the database 420 may store group mapping information regarding respective sessions. The database 420 may store session-specific hourly throughput, group state-specific core use amount policy, and group state-specific merging policy received through the controller 410. The controller 410 may refer to the information stored in the database 420 so as to control or change core mapping of the mapping module 450 and/or the packet steering module 470, or to adjust the packet merging policy of the packet merging module 460.

According to various embodiments of the disclosure, the controller 410 may receive data (for example, UE route selection policy (URSP) or edge discovery response message) related to a specific service and may update the database 420. The controller 410 may provide changed session-specific group information to the filter 430 of the CP 110, based on the updated database 420. The filter 430 of the CP 110 may store received data packets in a receiving buffer, based on the group information. When transferring data from each receiving buffer to the AP 120, the CP 110 may interrupt the control core (for example, the first core 441) of the AP 120 and may update meta-information regarding each receiving buffer. According to various embodiments of the disclosure, the control core of the AP 120 may identify updated meta-information and may map respective receiving buffers to respective cores of the packet merging module 460, based on the identified meta-information. The AP 120 may merge data packets of a corresponding session in each mapped core. The controller 410 may monitor the session state and update the operating core of the mapping module 450 and/or the packet steering module 470. The controller 410 may update the operating level of the packet merging module 460.

Figure 9A:
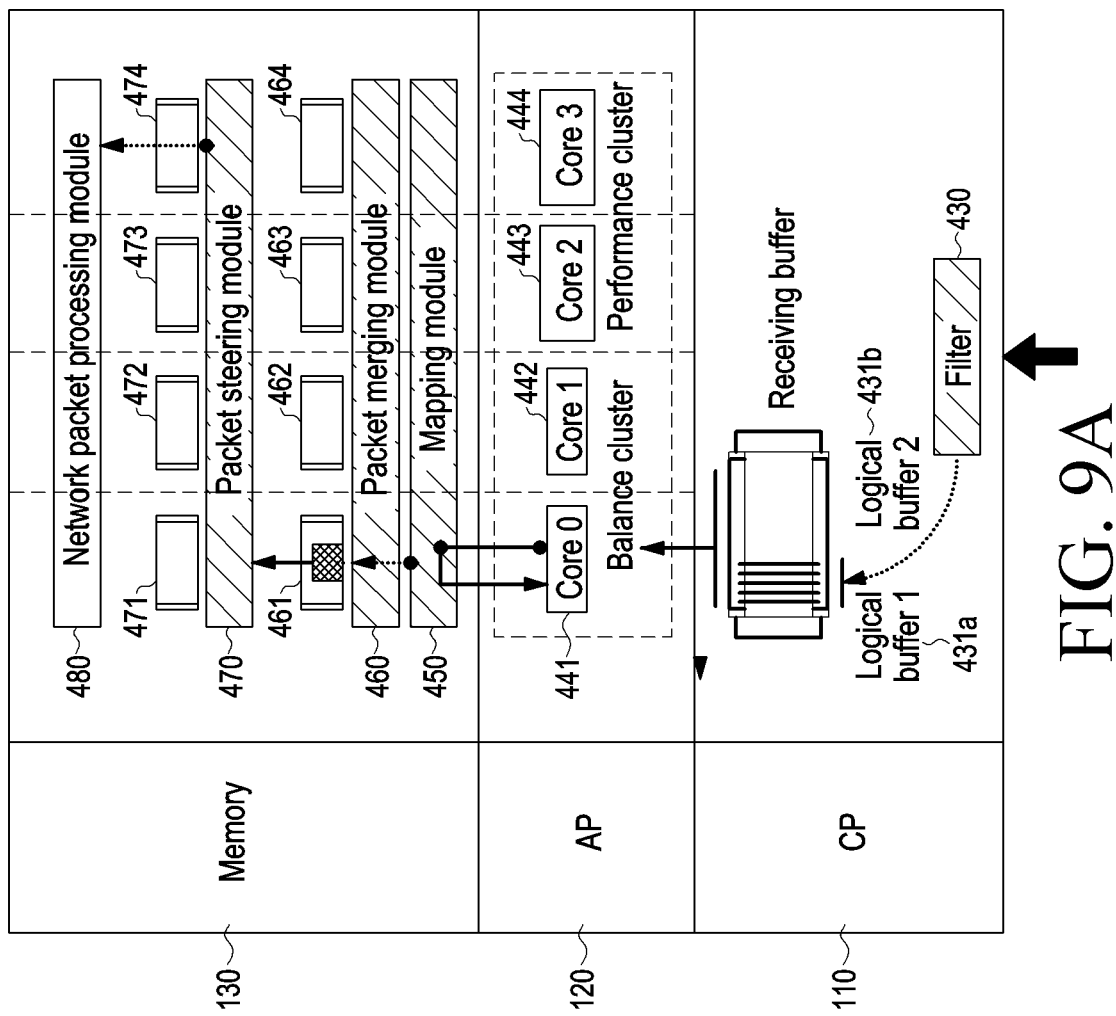
FIG. 9A illustrates data packet processing by an electronic device according to an embodiment of the disclosure.
Figure 9B:
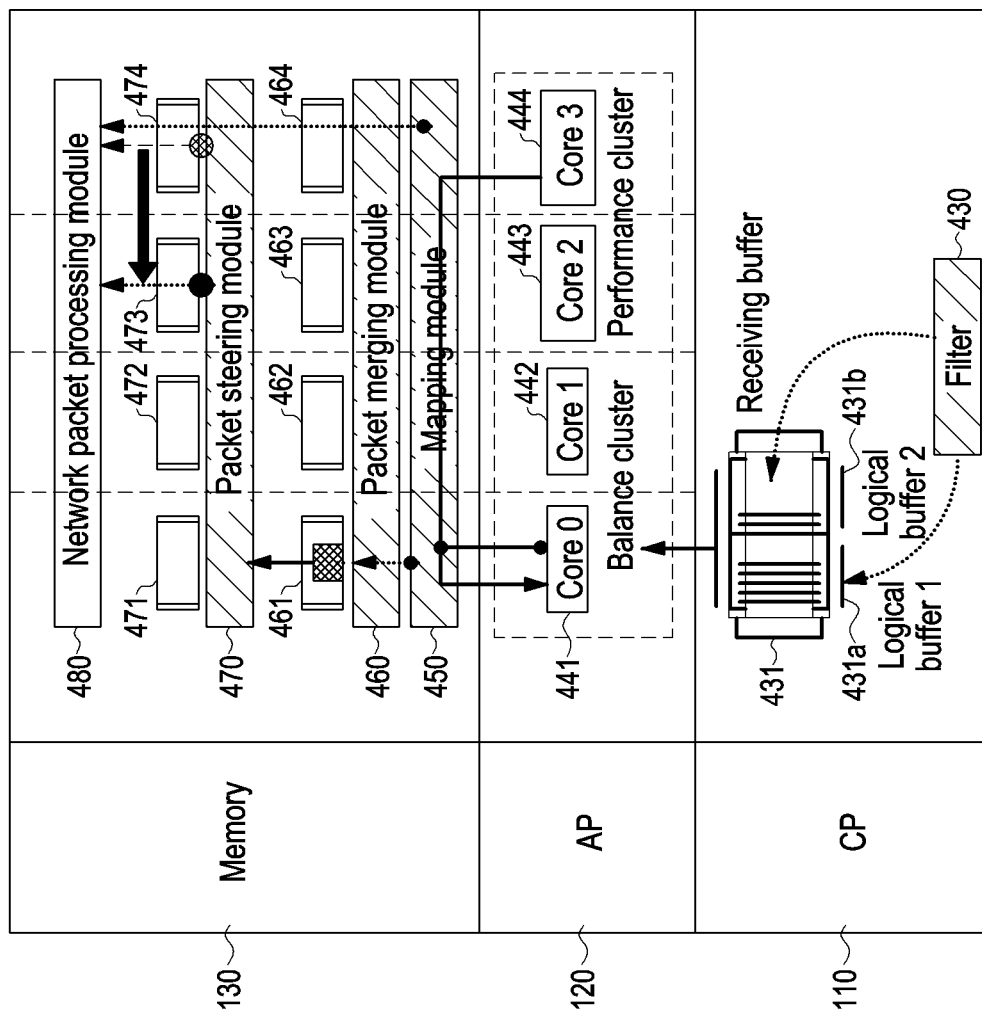
FIG. 9B illustrates data packet processing by an electronic device according to an embodiment of the disclosure.

FIGS. 9A and 9B illustrate data packet processing by an electronic device according to various embodiments of the disclosure.

Referring to FIGS. 9A and 9B, according to various embodiments of the disclosure, if the number of receiving buffers (for example, logical queues) is changed based on information received from the controller 410, cores allocated to respective sessions or groups may be changed. For example, if the number of receiving buffers is changed, cores mapped to the packet merging module 460 may be allocated according to a predefined receiving buffer-specific core number as illustrated in FIG. 9A. If cores mapped to the network packet processing module 480 overlap as the number of receiving buffers is changed, the core of the overlapping session may be changed to another core in the cluster of the changed corresponding group as illustrated in FIG. 9B.

Referring to FIG. 9A, as a first session is generated, logical buffer 1 431*a* corresponding to a first group mapped to the first session may be generated. The controller 410 may determine that a core (hereinafter, referred to as a "first operating core" for convenience of description) to be mapped to the packet merging module 460 with regard to the first group is the first core 441, and a core (hereinafter, referred to as a "second operating core" for convenience of description) to be mapped to the network packet processing module 480 is the fourth core 444.

Referring to FIG. 9B, as a second session is generated, logical buffer 2 431*b* corresponding to a second group mapped to the second session may be generated. The controller 410 may determine that, with regard to the second group, the first operating core is the fourth core 444, and the second operating core is the fourth core 444. According to the core configuration regarding the second session, the second operating core of the first session and the second operating core of the second session may overlap. As the cores overlap, the second operating core of the first session may be changed to the third core 443 which is another core in the same cluster as the fourth core 444. As a method for reallocating cores according to the overlapping sessions, a random, round robin, or load recognition-based method may be applied, but the method is not limited.

According to various embodiments of the disclosure, if a session allocated to a specific logical buffer (for example, logical buffer 2 431*b*) uses a specific protocol (for example, URSP), data packets may be directly transferred from the first operating core to the upper layer without using the second operating core, or the second operating core may be allocated as the same core as the first operating core.

Figure 10A:
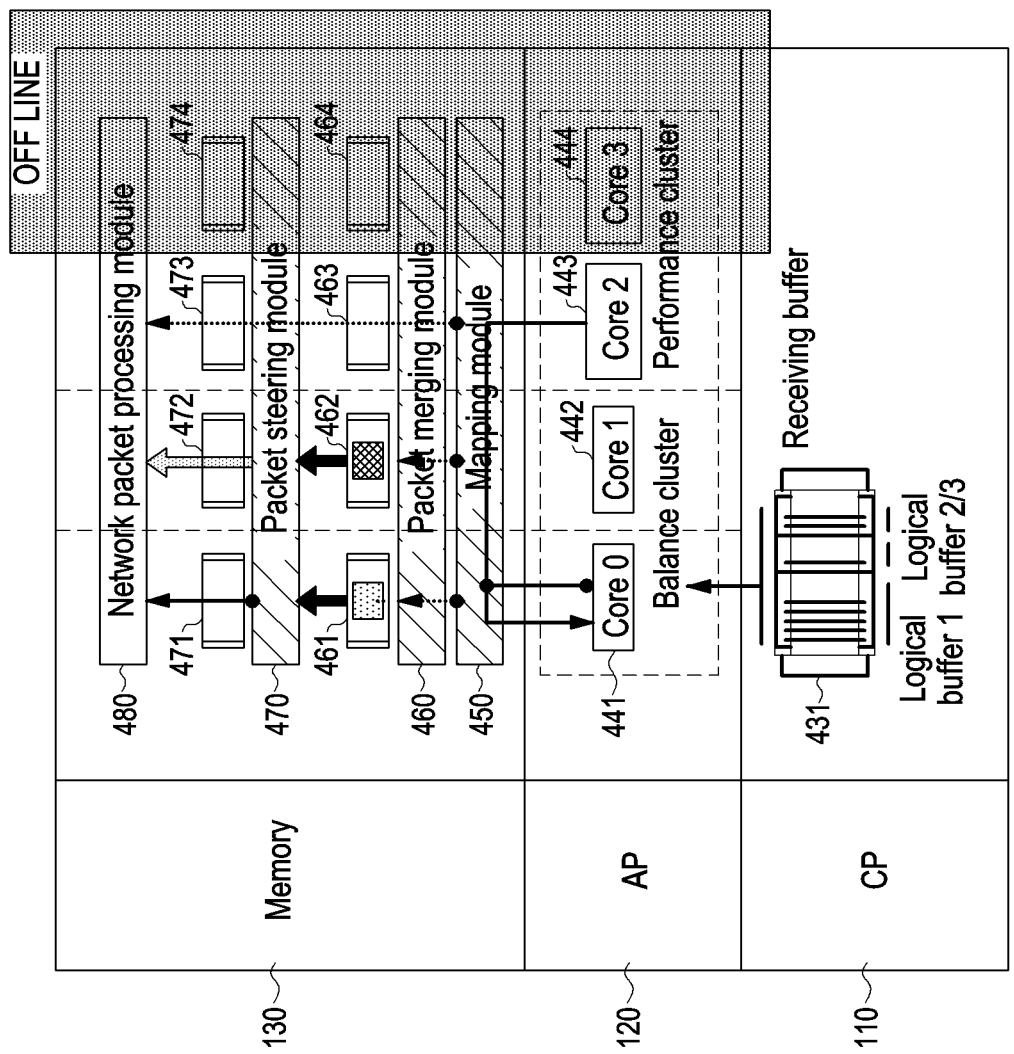
FIG. 10A illustrates data packet processing by an electronic device according to an embodiment of the disclosure.
Figure 10B:
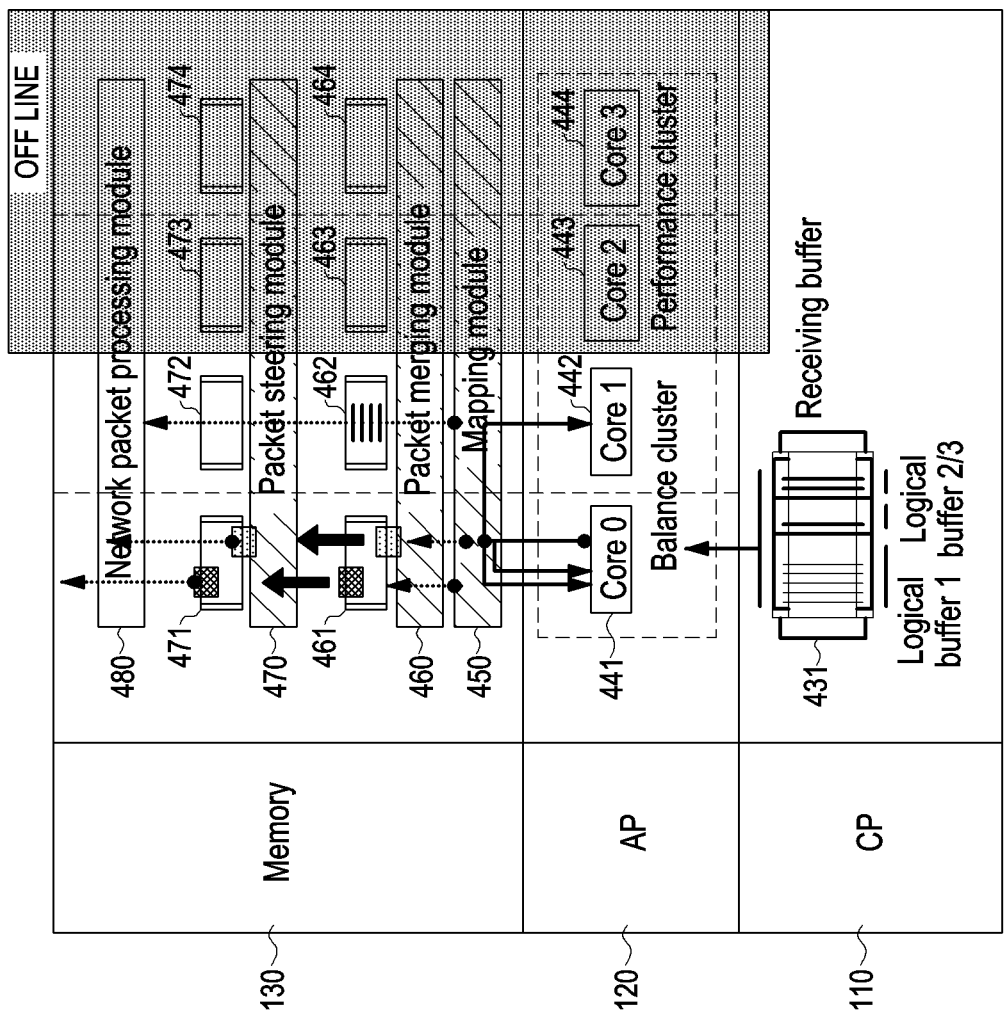
FIG. 10B illustrates data packet processing by an electronic device according to an embodiment of the disclosure.

FIGS. 10A and 10B illustrate data packet processing by an electronic device according to various embodiments of the disclosure.

Referring to FIGS. 10A and 10B, according to various embodiments of the disclosure, if currently available cores do not include a first operating core available to all group-specific buffers, the controller 410 may prioritize a low order, based on the priority of groups defined in the database 420, and make a movement to the first operating core in a lower group. For example, the electronic device 101 may use a hot plug scheme according to the state of the electronic device 101 (for example, a low battery state or a high temperature), system design (for example, CPU use amount), or an algorithm such that a specific core is dynamically processed online/offline. In this case, the core currently available to the electronic device 101 and the core to be used by a buffer 431 may differ from each other. According to various embodiments of the disclosure, if two different groups are allocated to one core, the controller 410 may schedule a core configured by prioritizing a group buffer having a high priority.

For example, referring to FIG. 10A, data packets of the first session may be stored in logical buffer 1, data packets of the second session may be stored in logical buffer 2, and data packets of the third session may be stored in logical buffer 3. According to various embodiments of the disclosure, the first operating core and the second operating core of the first session may be configured as the first core 441. The first operating core and the second operating core of the second session may be configured as the second core 442. The first operating core and the second operating core of the third session may be configured as the third core 443. The fourth core 444 may be controlled in an offline state as described above.

According to various embodiments of the disclosure, referring to FIG. if an additional core (for example, the third core 443) becomes offline as described above, or added or increased logical buffers make the number of available first operating cores and that of the logical buffers different, following operations may proceed. The controller 410 may determine that the first operating core and the second operating core of the first session and the second session, which have a relatively low priority, are the first core 441. Next, the controller 410 may control the first operating core and the second operating core to be changed to the second core 442 and processed accordingly with regard to the third session, which has a low priority.

Figure 11A:
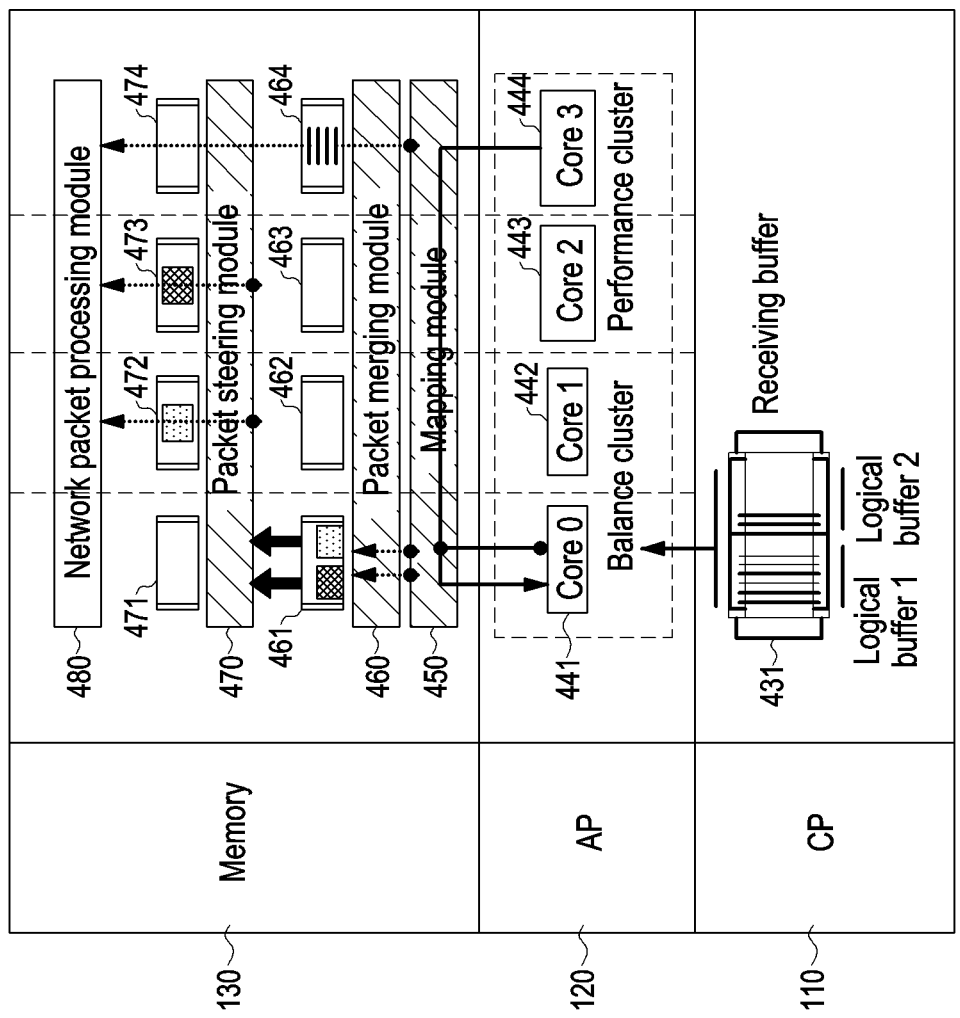
FIG. 11A illustrates data packet processing by an electronic device according to an embodiment of the disclosure.
Figure 11B:
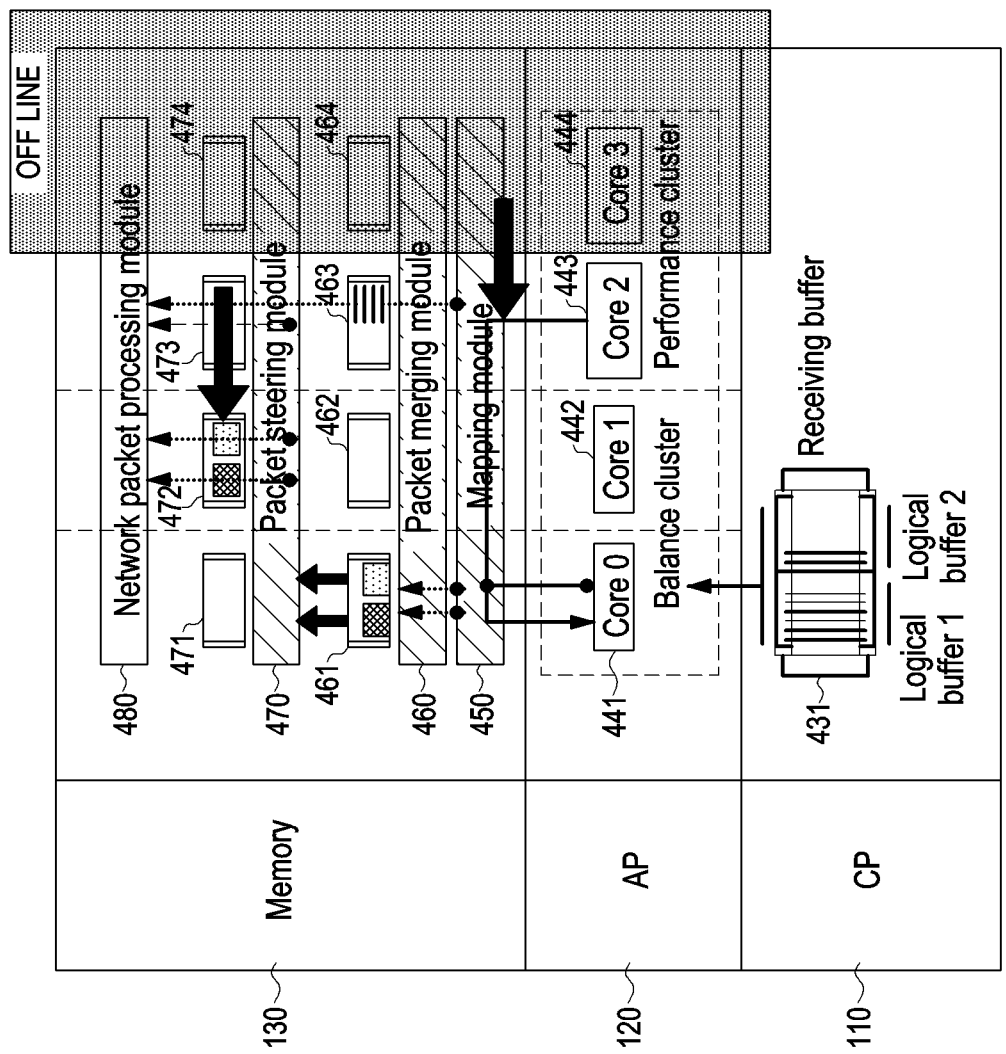
FIG. 11B illustrates data packet processing by an electronic device according to an embodiment of the disclosure.

FIGS. 11A and 11B illustrate data packet processing by an electronic device according to various embodiments of the disclosure.

Referring to FIGS. 11A and 11B, according to various embodiments of the disclosure, if currently available cores do not include a second operating core available to all group buffers, the controller 410 may preferentially allocate an operating core and a mask of the same cluster according to the priority of groups defined in the database 420. The number of cores allocated to the operating core and mask may be changed in proportion to the number of available cores. The number of cores allocated to the operating core and mask may follow a predefined policy differently according to the number of available cores. For example, according to the priority, a lower group may be allocated so as to avoid the operating core of an upper group. If the number of cores allocated to an operating core and a mask available to the lower group is equal to/less than a threshold value, the operating core of the upper group may not be avoided.

Referring to FIG. 11A, data packets of the first session and data packets of the second session may be stored in logical buffer 1, and data packets of the third session may be stored in logical buffer 2. According to various embodiments of the disclosure, the first operating core of data packets of the first session and that of data packets of the second session may be configured as the same first core 441. According to various embodiments of the disclosure, the second operating core of data packets of the first session may be configured as the second core 442, and the second operating core of data packets of the second session may be configured as the third core 443 unlike the first session. According to various embodiments of the disclosure, the first operating core and the second operating core of data packets of the third session may be configured as the fourth core 444.

Referring to FIG. 11B, if the fourth core 444 becomes offline and thus unavailable, the third session allocated to the fourth core 444 has a relatively high priority, and the third core 443, which is another core in the same cluster, may thus be allocated thereto in instead. The second session and the third session overlap the second operating core of the third core 443, and the second operating core of the second session having a relatively low priority may be changed from the third core 443 to the second core 442.

Figure 12:
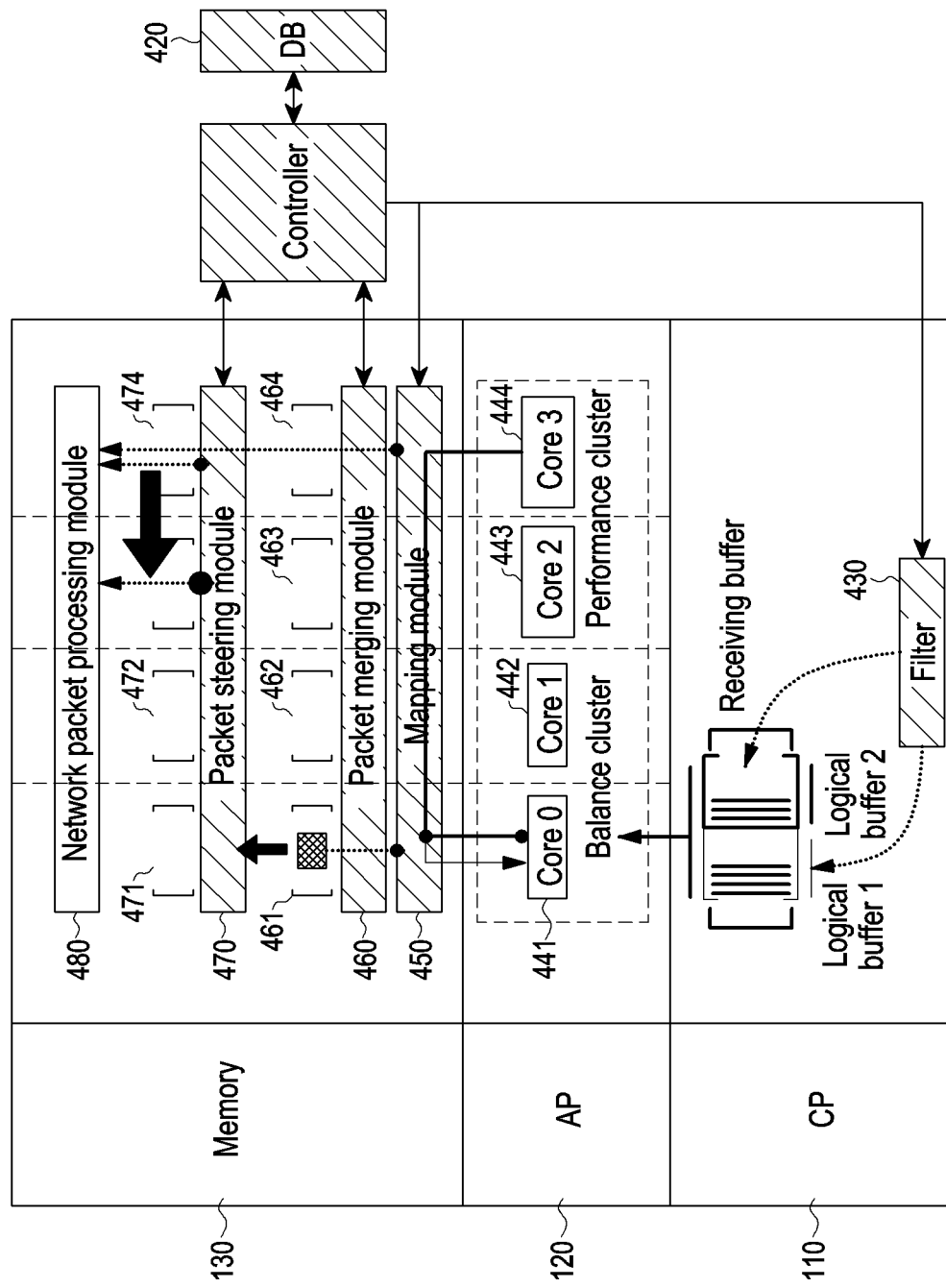
FIG. 12 illustrates data packet processing by an electronic device according to an embodiment of the disclosure.

FIG. 12 illustrates data packet processing by an electronic device according to an embodiment of the disclosure.

Referring to FIG. 12, the controller 410 may identify meta-information and, if the result of identifying meta-information indicates that the number of logical buffers of the CP 110 is different from immediately prior meta-information, the controller 410 may increase the degree of packet merging of packets allocated to respective operating cores to a threshold level or higher during a threshold time and/or a threshold packet number.

Referring to FIG. 12, when processing the packet merging module 460 regarding the first session by means of the first core 450, the controller 410 may increase the degree of packet merging of the packet merging module 460 to a threshold level or higher during a threshold time and/or a threshold packet number because logical buffer 2 is generated by the second session. By adjusting packet merging information regarding the first session, a second operating core may be allocated to the second session, and a movement time of the second operating core regarding the first session may be secured, thereby preventing the occurrence of errors due to a movement of the second operating core of the first session.

Figure 13:
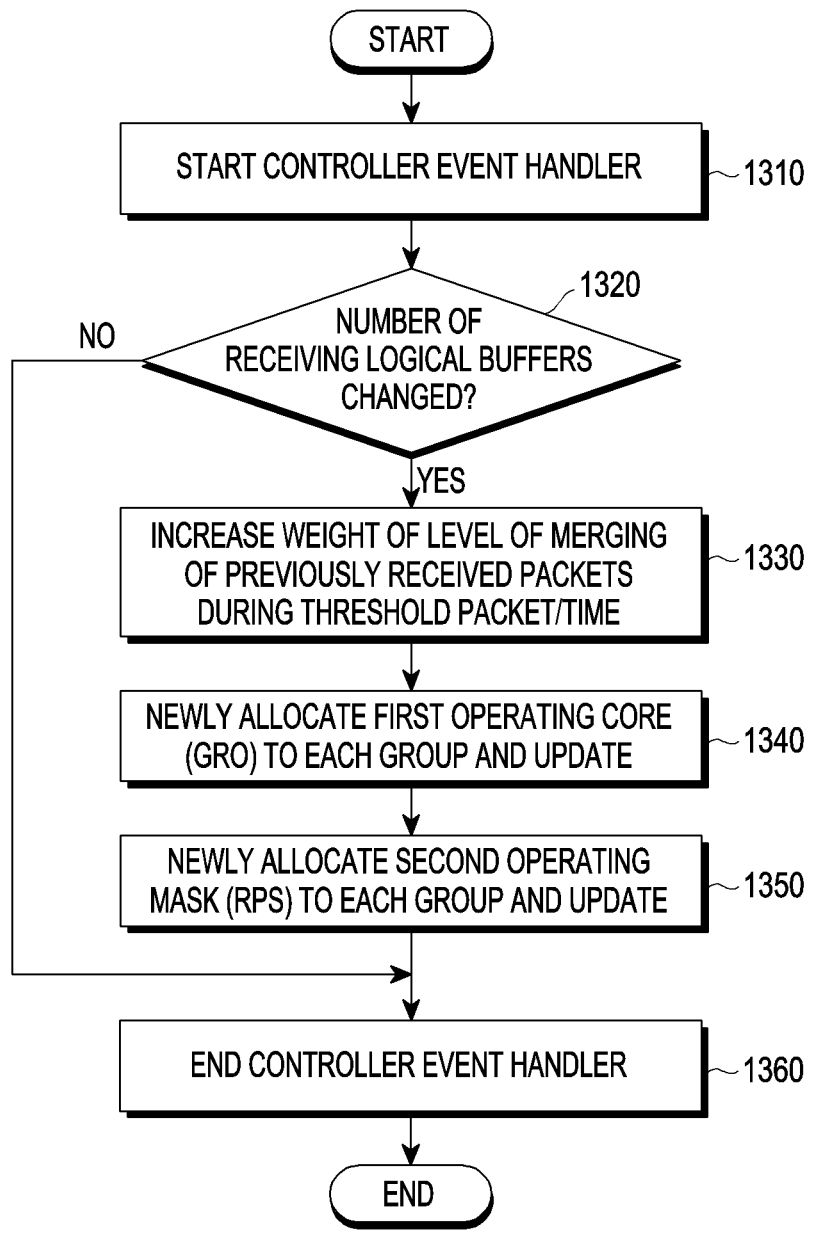
FIG. 13 illustrates a flow of operations for data packet processing by an electronic device according to an embodiment of the disclosure.

FIG. 13 illustrates a flow of operations for data packet processing by an electronic device according to an embodiment of the disclosure.

Referring to FIG. 13, the electronic device 101 may start a controller event handler in operation 1310. The controller 410 of the electronic device 101 may identify whether the number of receiving logical buffers has been changed in operation 1320. If the result of identification in operation 1320 indicates that number of receiving logical buffers has not been changed (No in operation 1320), the controller event handler may be ended in operation 1360. If the result of identification in operation 1320 indicates that number of receiving logical buffers has been changed (Yes in operation 1320), the threshold value of the level of merging of packets previously received during a threshold packet and/or a threshold time may be weighted in operation 1330 as described above with reference to FIG. 12.

According to various embodiments of the disclosure, the controller 410 of the electronic device 101 may newly allocate a first operating core to each group and update the operating core of the previous group in operation 1340. The controller 410 may newly allocate a second operating core to each group and update the operating core of the previous group in operation 1350 as illustrated in FIG. 12. The controller event handler may be ended in operation 1360 upon completing new allocation and update regarding the first operating core and the second operating core.

Figure 14:
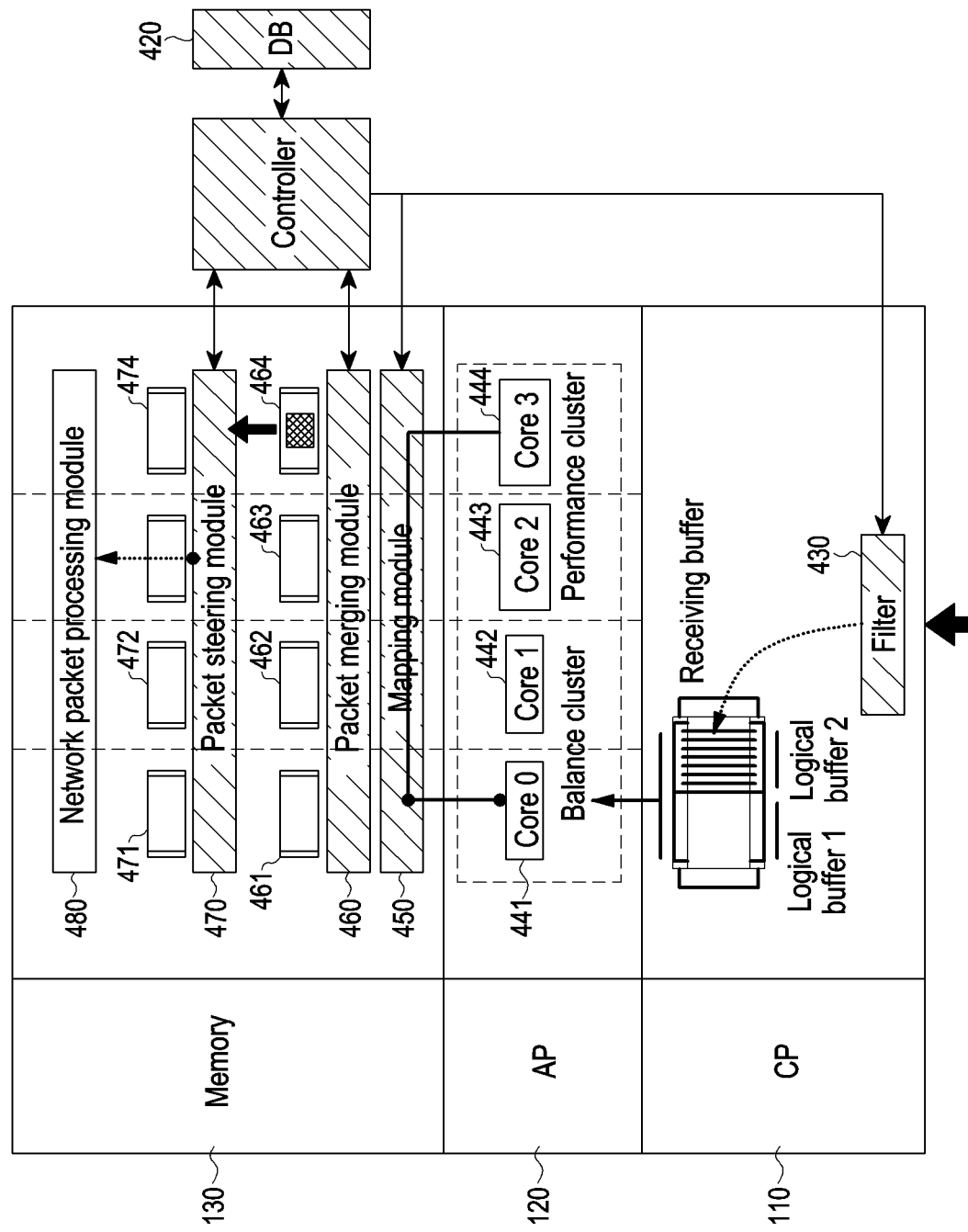
FIG. 14 illustrates data packet processing by an electronic device according to an embodiment of the disclosure.

FIG. 14 illustrates data packet processing by an electronic device according to an embodiment of the disclosure.

Referring to FIG. 14, according to various embodiments of the disclosure, if the result of identifying meta-information received from the CP 110 by the mapping module 450 of the electronic device 101 indicates that the number of packets stored in a logical buffer is equal to/larger than a threshold value and/or that the session number of packets inserted into the corresponding logical buffer is equal to/smaller than a threshold value, the threshold value regarding the level of packet merging of the corresponding session may be weighted.

Referring to FIG. 14, the filter 430 may store received data packets of a first session in logical buffer 2. The controller 410 may map the first session to a second group. The controller 410 may allocate the fourth core 444 as the first operating core and the second operating core regarding the second group. According to various embodiments of the disclosure, if the number of data packets of the first session stored in the logical buffer 2 is equal to/larger than a threshold value, or if the number of sessions stored in the logical buffer of the CP 110 is equal to/less than a threshold value (for example, in the case of a single session in FIG. 14), the controller 410 may weigh the threshold value of the level of merging packets of the first session stored in a buffer 464 corresponding to the fourth core 444 and processed by the packet merging module 460. By weighting the threshold value of the level of merging packets of the first session, the controller 410 may change the second operating core of the second group mapped to the first session from the fourth core 444 to the third core 443. By adjusting the level of packet merging by the packet merging module 460 with regard to the first session, a movement time of the second operating core regarding the first session may be secured, thereby preventing the occurrence of errors due to a movement of the second operating core of the first session.

Figure 15:
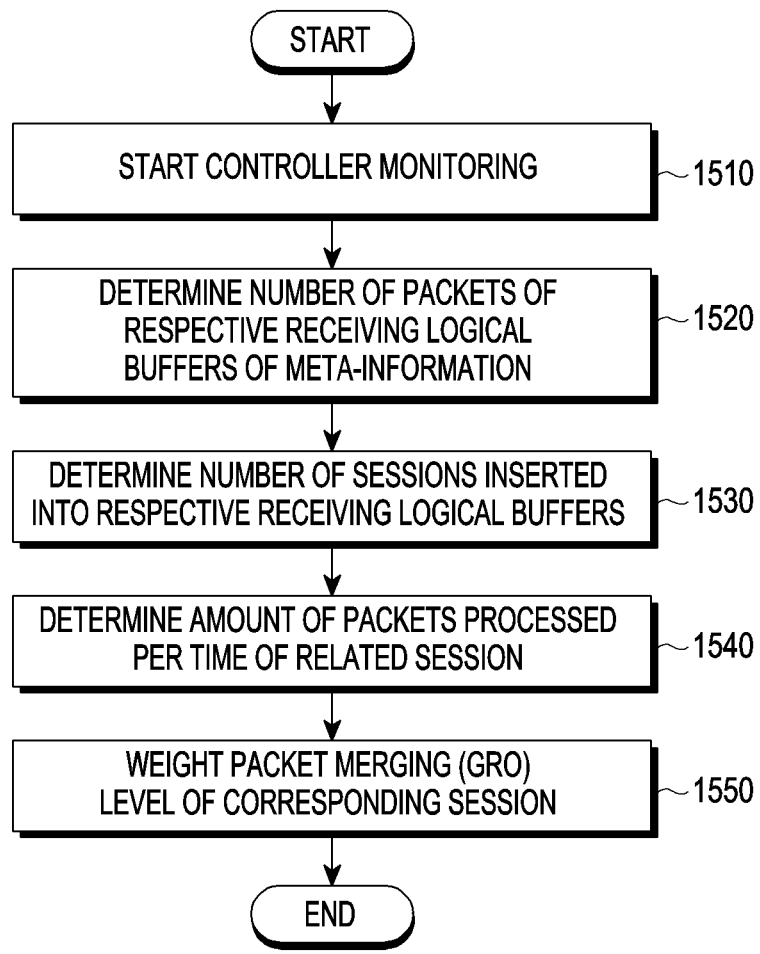
FIG. 15 illustrates a flow of operations for data packet processing by an electronic device according to an embodiment of the disclosure.

FIG. 15 illustrates a flow of operations for data packet processing by an electronic device according to an embodiment of the disclosure.

Referring to FIG. 15, the controller 410 of the electronic device 101 may start monitoring in operation 1510. According to various embodiments of the disclosure, the controller 410 may identify meta-information received from the mapping module 450. For example, the controller 410 may determine the number of packets of respective receiving logical buffers, based on the meta-information, in operation 1520, may determine the number of sessions inserted into respective receiving logical buffers in operation 1530, and may determine the amount of packets processed per time of related sessions in operation 1540.

According to various embodiments of the disclosure, if the result of identification indicates that a configured condition is satisfied (for example, if the number of packets stored in a receiving logical buffer is equal to/larger than a threshold value and/or if the session number of packets inserted into the corresponding receiving logical buffer is equal to/less than a threshold value), the controller 410 may weigh the threshold value regarding the level of packet merging of the corresponding session in operation 1550. By weighting the threshold value regarding the level of packet merging of the first session, the controller 410 may change the second operating core of the second group mapped to the first session from the fourth core 444 to the third core 443 as illustrated in FIG. 14.

Figure 16:
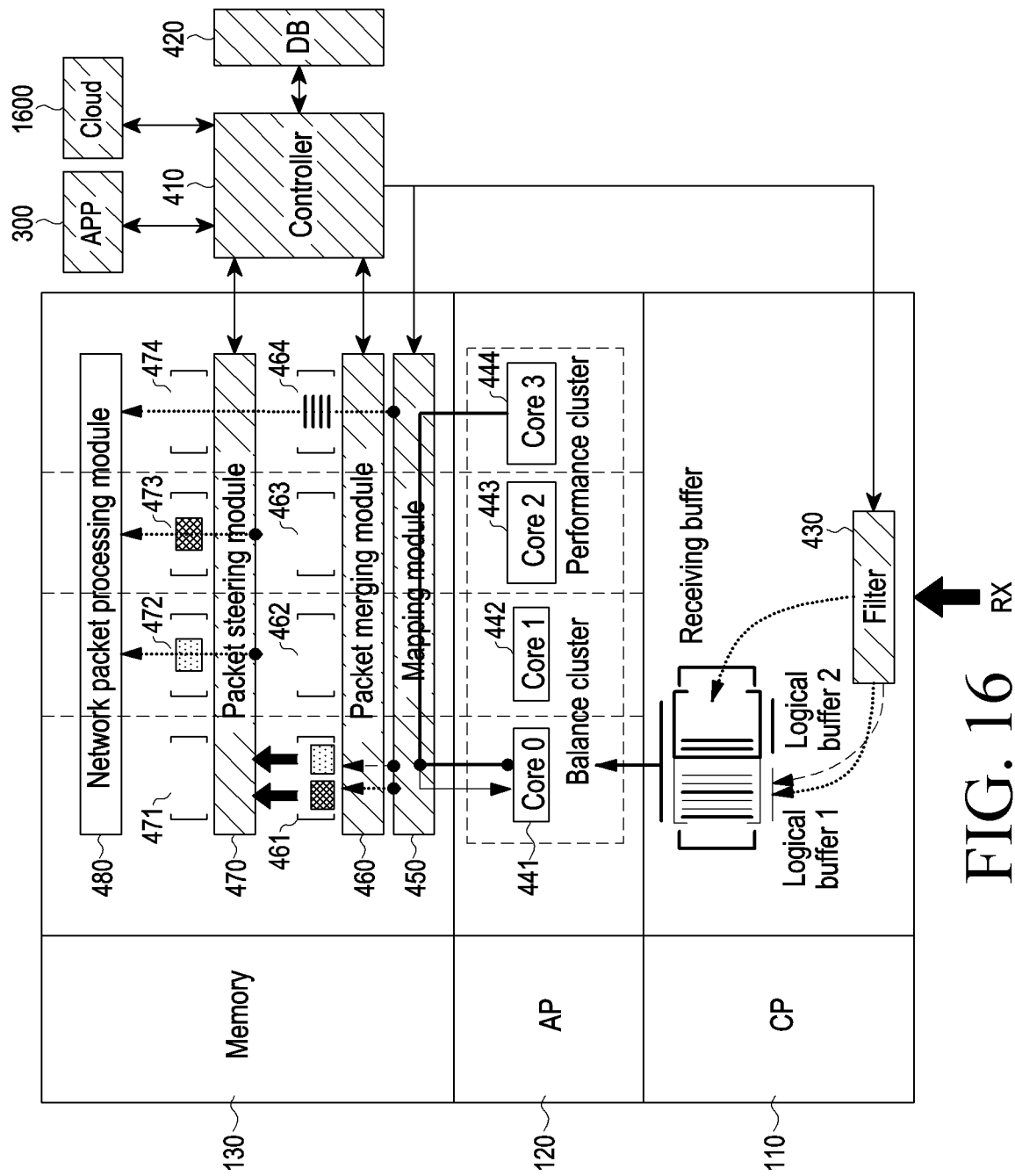
FIG. 16 illustrates data packet processing by an electronic device according to an embodiment of the disclosure.

FIG. 16 illustrates data packet processing by an electronic device according to an embodiment of the disclosure.

Referring to FIG. 16, the filter 430 of the CP 110 may store data packets of a first session and data packets of a second session in logical buffer 1 and may store data packets of a third session in logical buffer 2. According to various embodiments of the disclosure, the first operating core of data packets of the first session and that of data packets of the second session may be configured as the same first core 441. According to various embodiments of the disclosure, the second operating core of data packets of the first session may be configured as the second core 442, and the second operating core of data packets of the second session may be configured as the third core 443 unlike the first session. According to various embodiments of the disclosure, the first operating core and the second operating core of data packets of the third session may be configured as the fourth core 444.

According to various embodiments of the disclosure, in the application 300 or the cloud 1600, an event (for example, execution, deletion, or information update) regarding a service or an app may occur, or an event (for example, execution, deletion, or information update request) regarding a socket of the corresponding service or app may occur. Upon receiving an event regarding a service or an app from the application 300 or the cloud 1600, or upon receiving an event regarding a socket of the corresponding service or app therefrom, the controller 410 update the IP, port, or group information of the corresponding socket, based on the received event, in the database 420. The controller 410 may transfer session-specific group information to the filter 430 of the CP 110, based on information updated in the database 420. If the receiving buffer of the CP 110 is erased, and if the number of groups is updated by the session-specific group information received from the controller 410, a logical buffer corresponding to the updated group number may be generated.

Figure 17:
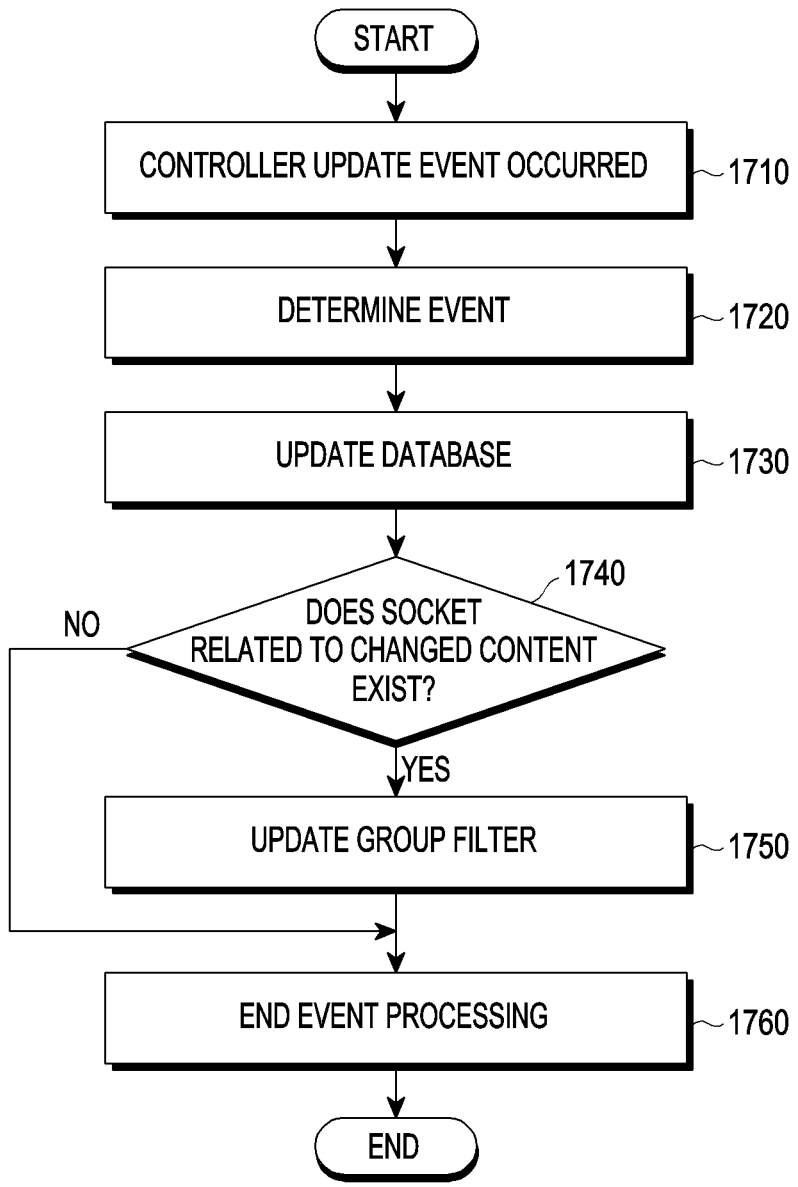
FIG. 17 illustrates a flow of operations for data packet processing by an electronic device according to an embodiment of the disclosure.

FIG. 17 illustrates a flow of operations for data packet processing by an electronic device according to an embodiment of the disclosure.

Referring to FIG. 17, the electronic device 101 may detect the occurrence of a controller update event in operation 1710. According to various embodiments of the disclosure, the controller update event may include execution of an application or a process, calling of an event from an application or a platform to the controller 410, receiving specific information from an MEC server, a change in URSP rule, and the occurrence of an event in a mapping module handler.

According to various embodiments of the disclosure, the controller 410 of the electronic device 110 may determine an event that occurred in operation 1720, and may update the database 420 in operation 1730 as described above with reference to FIG. 16. According to various embodiments of the disclosure, if it is determined in operation 1740 that there is a socket related to changed content (Yes in operation 1740), the controller 410 of the electronic device 110 may transfer changed session-specific group information to the filter 430 for the sake of group update, thereby updating the group filter, in operation 1750. Event processing may be ended in operation 1760 if the group filter is updated. If it is determined in operation 1740 that there is no socket related to changed content (No in operation 1740), event processing may be ended in operation 1760.

Figure 18:
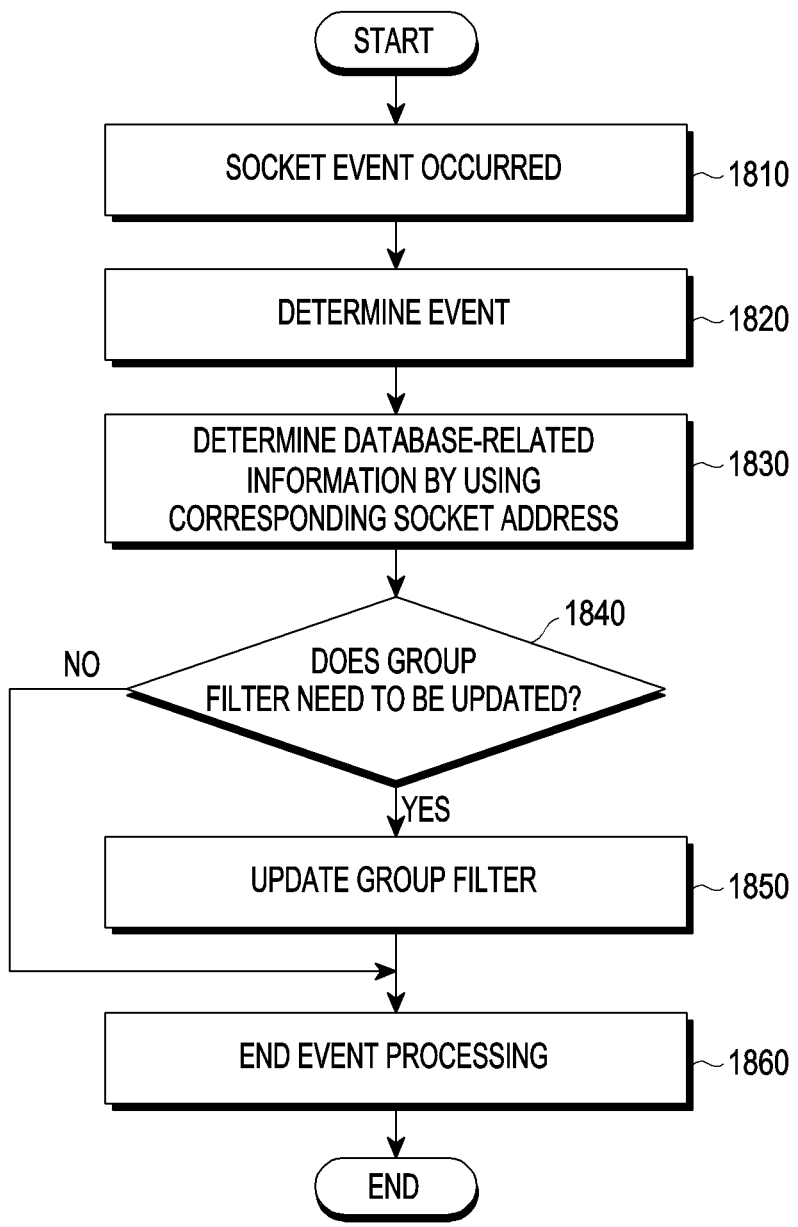
FIG. 18 illustrates a flow of operations for data packet processing by an electronic device according to an embodiment of the disclosure.

FIG. 18 illustrates a flow of operations for data packet processing by an electronic device according to an embodiment of the disclosure.

Referring to FIG. 18, the electronic device 101 may detect the occurrence of a socket event in operation 1810. According to various embodiments of the disclosure, the socket event may include the socket being open or closed, and receiving packets of a specific protocol.

According to various embodiments of the disclosure, the controller 410 of the electronic device 101 may determine a socket event that occurred in operation 1820, and may determine database-related information by using the corresponding socket address in operation 1830. If it is determined in operation 1840 that a group filter needs to be updated (Yes in operation 1840) as a result of determining the database-related information, the controller 410 of the electronic device 101 may transfer changed session-specific group information to the filter 430 for the sake of group update, thereby updating the group filter, in operation 1850. Event processing may be ended in operation 1860 if the group filter is updated. If it is determined in operation 1840 that there no need to update the group filter (No in operation 1840), event processing may be ended in operation 1860.

According to various embodiments of the disclosure, the database 420 may store an app management table, a group mapping table, and a session management table. According to various embodiments of the disclosure, the app management table may be managed as follow:

- when an app is installed in a terminal, the corresponding app and information are added to the app management table
- when an app is deleted from the terminal, the corresponding app and information are deleted from the app management table According to various embodiments of the disclosure, a method for defining a group when app information is added to the app management table may be allocated according to predefined app/group mapping information, allocated according to predefined meta-information/group mapping information, or allocated as a default value. The meta-information value of the app may be acquired from "Manifest" information of the operating system, from meta-information of the app provided by an app market, or from predefined app/meta-information mapping information.

According to various embodiments of the disclosure, the app management table may be managed in a format as in Table 1 below:

TABLE 1

| App name | App/Service ID | Group |
|---|---|---|
| com.samXX.app1 | 10340 | 1 |
| com.samXX.app6 | 10500 | 2 |

According to various embodiments of the disclosure, the group mapping table may be managed in a format as in Table 2 below:

TABLE 2

| App name | Group |
|---|---|
| com.samXX.app1 | 1 |
| com.samXX.app6 | 2 |

According to various embodiments of the disclosure, a category/group mapping table may be managed in a format as in Table 3 below:

TABLE 3

| Meta-information | Group |
|---|---|
| Game | 1 |
| VOIP | 2 |

According to various embodiments of the disclosure, the session management table may be managed in a format as in Table 4 below:

TABLE 4

| Flow ID | App/Service ID | Group | Protocol | Src ip address |
|---|---|---|---|---|
| 00001 | 10340 | 1 | TCP | 192.168.0.1 |
| 00002 | 10340 | 1 | UDP | 192.168.0.1 |
| 00003 | 10400 | 1 | VOIP | 192.168.0.1 |
| 00004 | 10500 | 0 | TCP | 192.168.0.2 |

According to various embodiments of the disclosure, session information may be generated by the occurrence of the first received packet or the first transmitted packet of a session absent in the session management table. According to various embodiments of the disclosure, the session information may be deleted if there is no communication for a threshold time or longer in the session, if the socket of the session is closed, if the app/service of the session is deleted, or if the interface of the session is deleted or change. According to various embodiments of the disclosure, the session information may be changed if the interface of the session is changed, if the group of the app/service of the session is changed, if the group regarding the protocol of the session is changed, or if the controller changes the group of the session.

According to various embodiments of the disclosure, a group of new session information may be allocated as follows:

- allocated based on app/group mapping information in the app management table
- allocated based on predefined protocol/group mapping information
- allocated based on interface address/group mapping information
- allocated as a default value.

According to various embodiments of the disclosure, session information may be referred to as the flow ID in Table 4, and may be generated based on connection information. For example, the session information may be generated by hashing at least one of a source IP address, a source port, a destination IP address, a destination port, and an IP protocol.

According to various embodiments of the disclosure, when a different group is requested to be applied to a session according to a different policy, the same may be applied according to the priority of the request for applying a group to a session, or any requested group may be applied. For example, the priority of the request for applying a group to a session may include a predefined priority, the time order (for example, oldest order or latest order) of the request, an arbitrary priority, and a priority predefined according to a combination of requests.

According to various embodiments of the disclosure, as a manner of updating the group of a session when a group applied to the session is released, the next-rank group may be applied when applied according to a priority, the same may be initialized by applying as a default group, or any group among redundantly applied groups may be applied.

According to various embodiments of the disclosure, a group-specific CPU mapping table may be represented as in Table 5 below, a group-specific merging level weight table may be represented as in Table 6 below, a session packet management table may be represented as in Table 7 below, and an available core/group level-specific static policy table may be represented as in Table 8 below:

TABLE 5

| Group | First operating core mask | Second operating core mask |
|---|---|---|
| 0 | 0x01(1000|0000) | 0x22(0100|0100) |
| 1 | 0x10(0000|1000) | 0x44(0010|0010) |

TABLE 6

| QoS class | Merging level weight |
|---|---|
| 0 | 10 |
| 1 | 1 |

TABLE 7

| Flow ID | First operating core number | Second operating core number | Amount of packets pressed per unit time | Merging level |
|---|---|---|---|---|
| 00001 | 4 | 6 | 200 | 2 |
| 00002 | 4 | 2 | 10,000 | 4 |
| 00003 | 4 | 6 | 5,000 | 2 |
| 00004 | 1 | 5 | 200,000 | MAX |

TABLE 8

| Available cores | Group number | Policy 1 (group-specific core mapping table number) |
|---|---|---|
| 8 | 4 or more | 1 |
| 8 | 3 | 2 |

Figure 19:
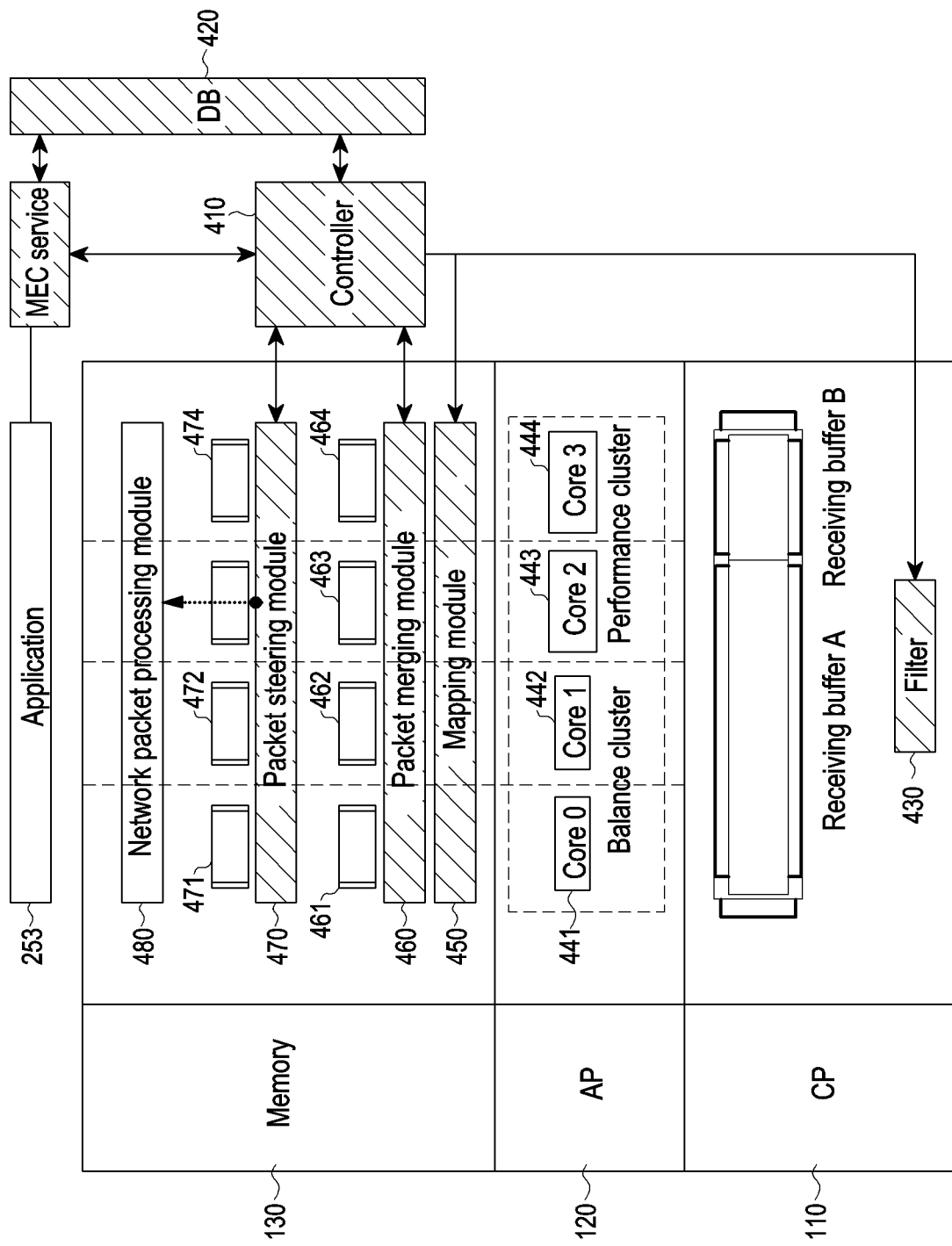
FIG. 19 illustrates data packet processing by an electronic device according to an embodiment of the disclosure.

FIG. 19 illustrates data packet processing by an electronic device according to an embodiment of the disclosure.

Referring to FIG. 19, if the electronic device 101 supports a mobile edge computing (MEC) service app or MEC service IP for a controller, the controller 410 may determine a group based on the MEC service information.

According to various embodiments of the disclosure, the AP 120 may communicate with an MEC control server through at least one of the operating system, middleware, and a service framework stored in the memory 130, and the AP 120 may identify MEC service information by communicating with the MEC control server. According to various embodiments of the disclosure, the MEC service information may include an MEC service application name, an MEC service full qualified domain name (FQDN), an MEC service IP address, whether a designated application provides an MEC service, whether there is an MEC service at a designated IP address, or whether there is an IP address of a designated FQDN. According to various embodiments of the disclosure, the controller 410 may identify the MEC service information and manage the same through a database 420. The controller 410 may determine a group based on MEC service information stored in the database 420.

Figure 20:
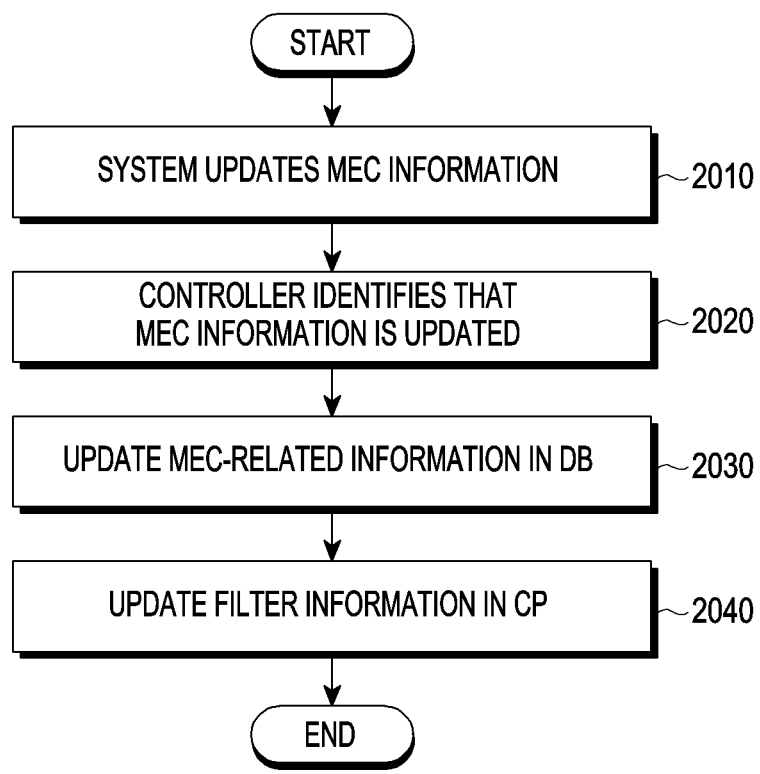
FIG. 20 illustrates a flow of operations for data packet processing by an electronic device according to an embodiment of the disclosure.

FIG. 20 illustrates a flow of operations for data packet processing by an electronic device according to an embodiment of the disclosure.

Referring to FIG. 20, the AP 120 of the electronic device 101 may identify and update MEC service information through an MEC server in operation 2010 as described above with reference to FIG. 19. According to various embodiments of the disclosure, the controller 410 may identify that the MEC service information has been updated, and may update the MEC service-related information in a database 420 in operation 2020. The controller 410 may transfer group update information to the filter 430 of the CP 110, based on MEC-related information stored in the database 420 in operation 2040.

According to various embodiments of the disclosure, as MEC service information received by the AP 120 from the MEC control server, an MEC service app list may be stored in the database 420 as in Table 9 below, and the MEC service information may be stored in the database 420 as in Table 10 below:

TABLE 9

| App | FQDN | Meta-information (category, priority) |
|---|---|---|
| com.samXX.app1 | s1.domain.com | Cloud game, 1 |
| com.samXX.app2 | s2.domain.com | Video streaming, 2 |

TABLE 10

| Requested FQDN | Response IP |
|---|---|
| s1.domain.com | Ff:ff:ff:ff:ff:ff |
| s3.domain.com | — |

According to various embodiments of the disclosure, during an MEC information change, the AP 120 may directly store the changed MEC information in the database 420 and may transfer the content of change to the controller 410. During the MEC information change, the AP 120 may generate an event in the controller 410 such that the controller 410 identifies the content of MEC information change in the database 420. In another embodiment of the disclosure, the controller 410 may operate to periodically identify the content of MEC information change in the database 420.

According to various embodiments of the disclosure, during an MEC information change, the controller 410 may define an app and a group in the app management table, based on meta-information included in an MEC service app list. The meta-information may include category/specified group information. As a method for defining a group based on the meta-information, the same may be allocated arbitrarily, or allocated based on predefined meta-information and group mapping information. According to various embodiments of the disclosure, if MEC information is deleted from the MEC service app list, the controller 410 may update app/group information in the app management table by an arbitrary allocation method, a default value allocation method, or a method in which the next-rank group is applied based on the priority in the case of redundant application.

Figure 21:
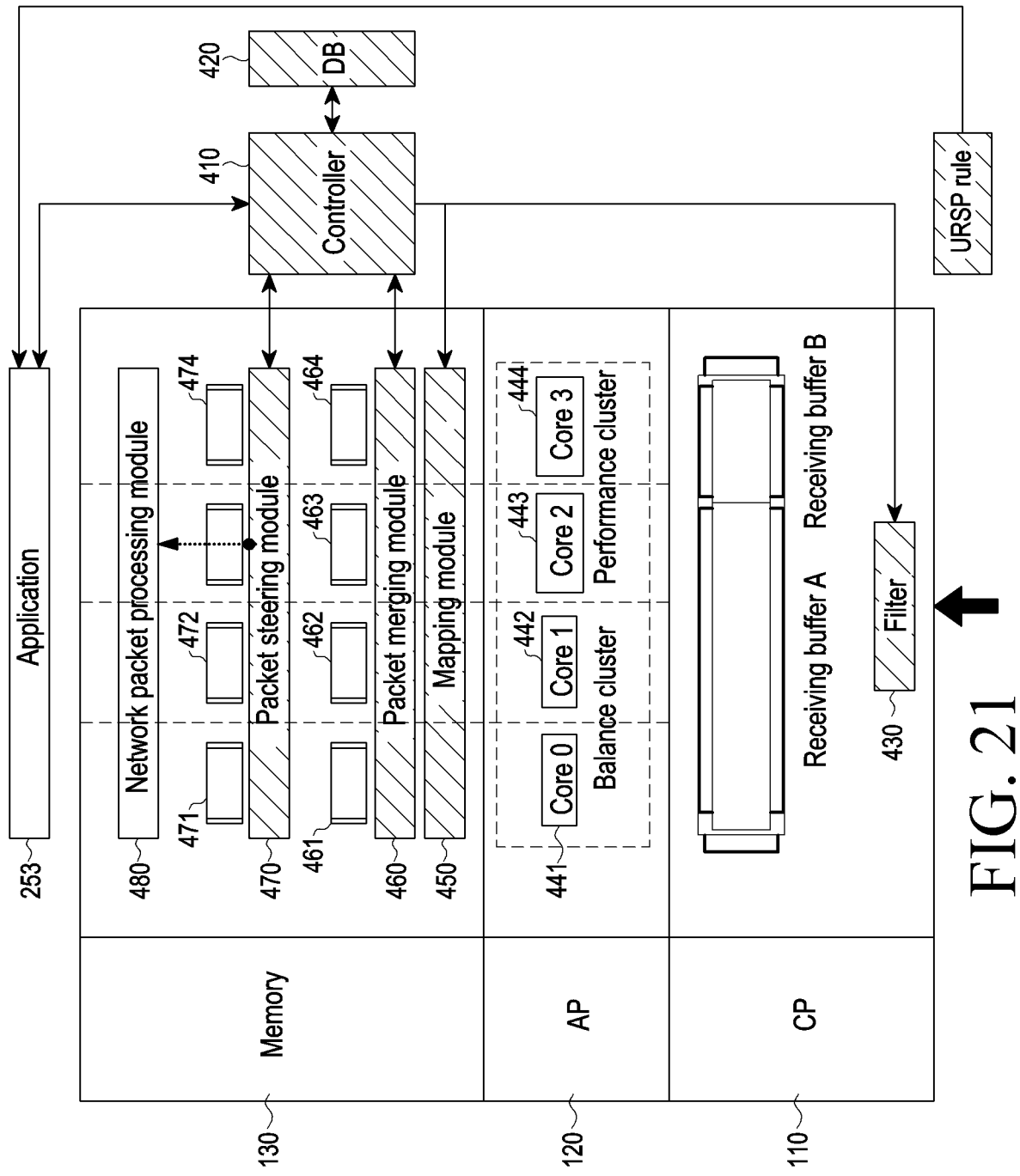
FIG. 21 illustrates data packet processing by an electronic device according to an embodiment of the disclosure.

According to various embodiments of the disclosure, during an MEC information change, the controller 410 may update a group of a session based on an updated app management table or update a group of a session in the following method, based on MEC service information received from the MEC control server:
- the app management table is updated based on the updated MEC service app list, and a session is updated in the session management table with reference to the updated app management table
- the group of the corresponding app is determined based on an MEC service FQDN, thereby updating the app management table, and the session is updated in the session management table with reference to the updated app management table the corresponding session is updated in the session management table, based on the MEC service IP the app management table is updated based on information indicating whether the MEC service exists, and the session is updated in the session management table with reference to the updated app management table the session is updated in the session management table with reference to the IP of a query of the FQDN FIG. 21 illustrates data packet processing by an electronic device according to an embodiment of the disclosure.

Referring to FIG. 21, the application 253 of the AP 120 of the electronic device 101 may receive an URSP rule from the CP 110. For example, the application 253 may interpret and manage the URSP rule received from the CP 110. The application 253 may allocate a socket of a specific app to a specific interface according to the URSP rule received from the CP 110. The interface allocation information may be provided to the controller 410. The controller 410 may store and manage the interface allocation information in the database 420. The controller 410 may generate session-specific group information, based on the interface allocation information stored in the database 420, and transfer the same to the filter 430 of the CP 110.

Figure 22:
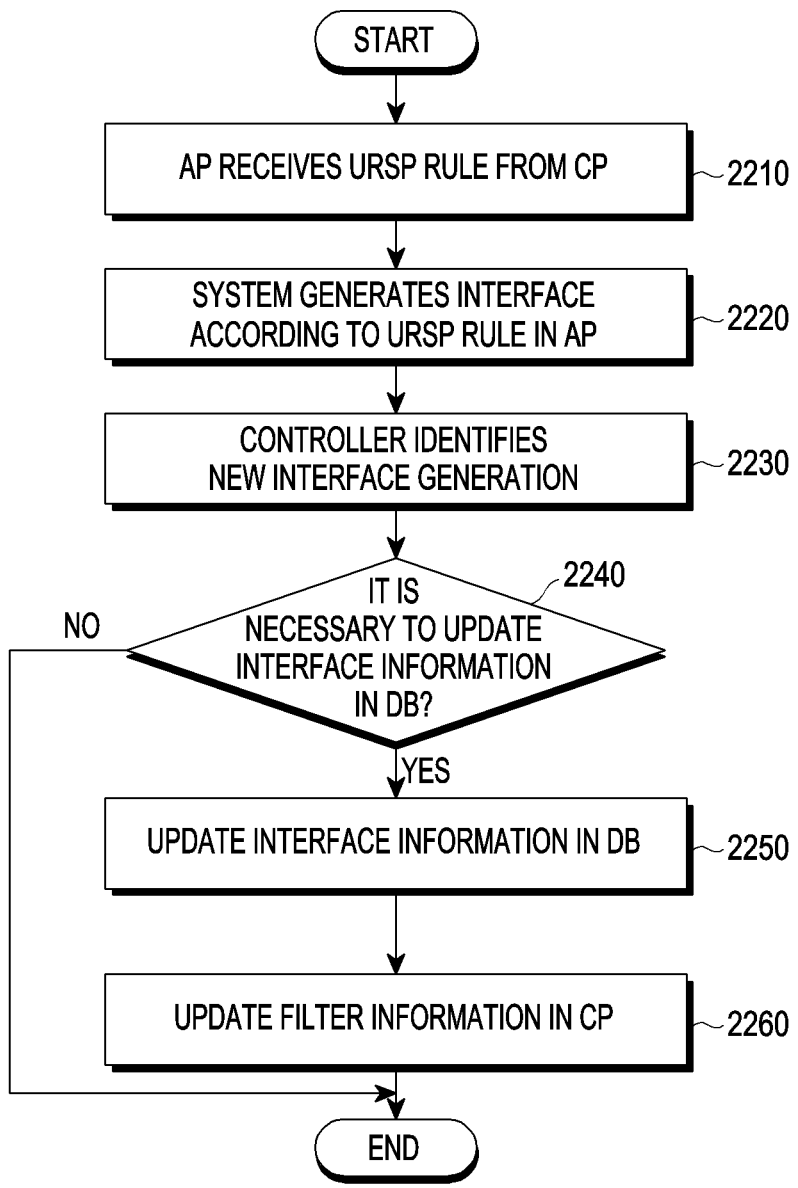
FIG. 22 illustrates a flow of operations for data packet processing by an electronic device according to an embodiment of the disclosure.

FIG. 22 illustrates a flow of operations for data packet processing by an electronic device according to an embodiment of the disclosure.

Referring to FIG. 22, according to various embodiments of the disclosure, the AP 120 may receive a URSP rule from the CP 110 in operation 2210. The AP 120 may generate an interface according to the URSP rule in operation 2220. According to various embodiments of the disclosure, the controller 410 may identify generation of the new interface in operation 2230, and may determine whether it is necessary to update interface information in the database 420 in operation 2240. If the result of determination in operation 2240 indicates that it is necessary to update interface information in the database (Yes in operation 2240), the controller 410 may update interface information in the database in operation 2250. According to various embodiments of the disclosure, the controller 410 may identify that the interface information has been updated in operation 2250, and may transfer group update information to the filter 430 of the CP 110, based on interface update information stored in the database 420, in operation 2260. If the result of determination in operation 2240 indicates that it is unnecessary to update interface information in the database (No in operation 2240), the operations may end without transferring group update information to the filter 430 of the CP 110.

According to various embodiments of the disclosure, the controller 410 may monitor an interface change. For example, when instructing an interface change, the AP 120 may transfer the result of command to the controller 410. In another embodiment of the disclosure, the controller 410 may operate to periodically identify the state of the interface. According to various embodiments of the disclosure, the controller 410 may identify whether there is a change in the interface list in the database 420, may identify whether a predefined keyword is included in the interface name among the updated interface, may identify whether the AP 120 has informed the controller 410 of an updated interface name or IP, or may identify whether an interface allocated to a predefined IP has been generated or deleted, thereby determining whether it is necessary to update interface information. The interface management table stored and managed in the database 420 may be configured as in Table 11 below:

TABLE 11

| Interface name | Interface address | Group |
|---|---|---|
| Rmnet0 | 1.1.1.11.1.1.2 | 1 |
| urllc-rmnet0 | Ffff:ffff:ffff:ffff | 2 |
| embb-rmnet1 | 1.1.1.3 | 3 |

According to various embodiments of the disclosure, the controller 410 may allocate a new group to an allocated IP and an interface that needs to be updated, and may store the interface management table as in Table 11 above in the database 420. According to various embodiments of the disclosure, the controller 410 may arbitrarily allocate a group based on the interface, may allocate a new group not defined previously, or may allocate a group based on predefined interface/group mapping information. For example, if the existing socket uses a corresponding interface, or if an IP address is used as the address, the controller 410 may update the group of the corresponding socket to the group address of the corresponding interface.

Figure 23:
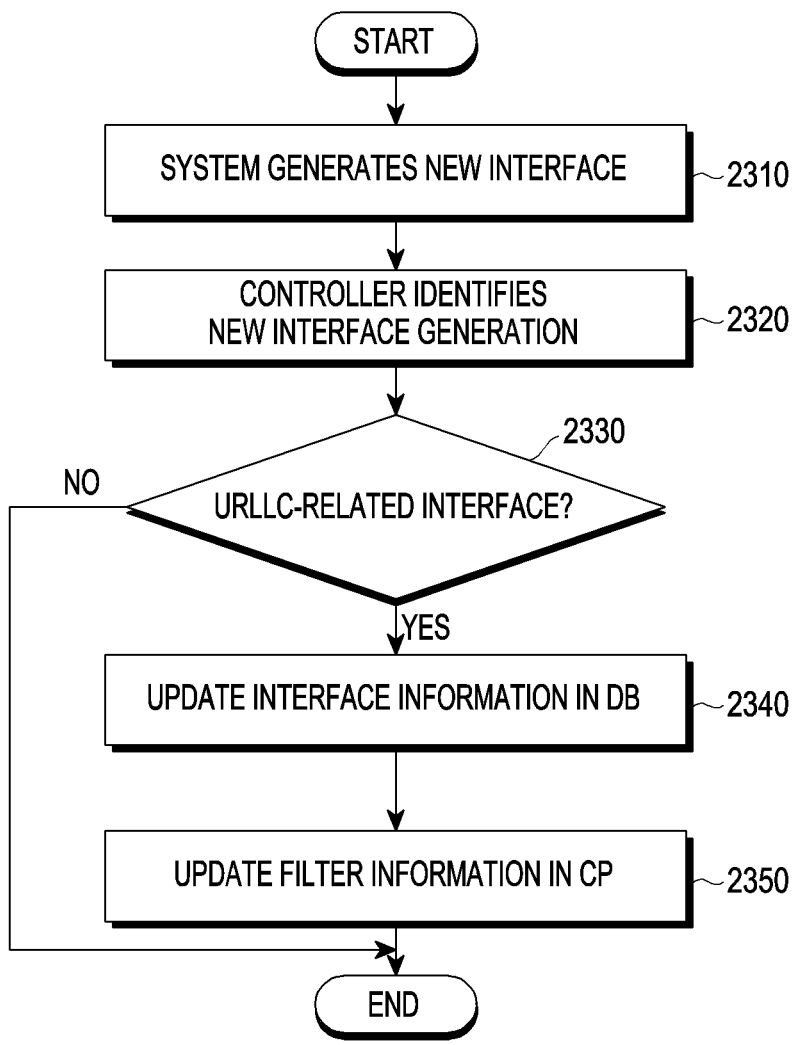
FIG. 23 illustrates a flow of operations for data packet processing by an electronic device according to an embodiment of the disclosure.

FIG. 23 illustrates a flow of operations for data packet processing by an electronic device according to an embodiment of the disclosure.

Referring to FIG. 23, according to various embodiments of the disclosure, the AP 120 may generate a new interface in operation 2310. According to various embodiments of the disclosure, the controller 410 may identify generation of the new interface in operation 2320 and may determine whether the newly generated interface is a URLLC-related interface in operation 2330. If the result of determination in operation 2330 indicates that the newly generated interface is a URLLC-related interface (Yes in operation 2330), the controller 410 may update interface information in the database in operation 2340. According to various embodiments of the disclosure, the controller 410 may identify that the interface information has been updated in operation 2340, and may transfer group update information to the filter 430 of the CP 110, based on interface update information stored in the database 420, in operation 2350. If the result of determination in operation 2330 indicates that it is necessary to update interface information in the database (No in operation 2330), the operations may end without transferring group update information to the filter 430 of the CP 110.

According to various embodiments of the disclosure, when instructing an interface change, the AP 120 may transfer the result of command to the controller 410 such that the controller 410 identifies whether the interface is changed. As another method, the controller 410 may periodically identify the interface state. The controller 410 may identify whether a predefined keyword (for example, urllc, urllc-rmnet0) is included in the interface name, thereby identifying whether the interface is related to URLLC. According to various embodiments of the disclosure, the AP 120 may notify the controller 410 of the URLLC interface name or IP such that the controller 410 identifies whether the interface is related to URLLC. According to various embodiments of the disclosure, the controller 410 may identify whether the interface is related to URLLC according to whether the interface has been allocated to a predefined IP.

According to various embodiments of the disclosure, the controller 410 may allocate a new group ID to the URLLC interface and the allocated IP and store the same in the database 420. If the existing socket uses a corresponding interface, or if an IP address is used as the address, the controller 410 may update the group of the corresponding socket to the group address of the corresponding interface. A table to which a new group ID of the URLLC-related interface stored and managed in the database 420 is allocated may be configured as in Table 12 below:

TABLE 12

| Interface name | IP address | Group |
| --- | --- | --- |
| rmnet0 | 192.168.0.1 | 1 |
| urllc-rmnet0 | 192.168.0.2 | 2 |

For example, the table of the URLLC-related socket stored in the database 420 may be updated from the table in Table 13 below to the table in Table 14 below:

TABLE 13

| Flow ID | App/service ID | Group | Protocol | Src ip address |
| --- | --- | --- | --- | --- |
| 00001 | 10340 | 1 | TCP | 192.168.0.1 |
| 00002 | 10340 | 1 | UDP | 192.168.0.1 |
| ... | | | | |
| 00004 | 10500 | 1 | TCP | 192.168.0.2 |

TABLE 14

| Flow ID | App/service ID | Group | Protocol | Src ip address |
| --- | --- | --- | --- | --- |
| 00001 | 10340 | 1 | TCP | 192.168.0.1 |
| 00002 | 10340 | 1 | UDP | 192.168.0.1 |
| ... | | | | |
| 00004 | 10500 | 2 | TCP | 192.168.0.2 |

Figure 24A:
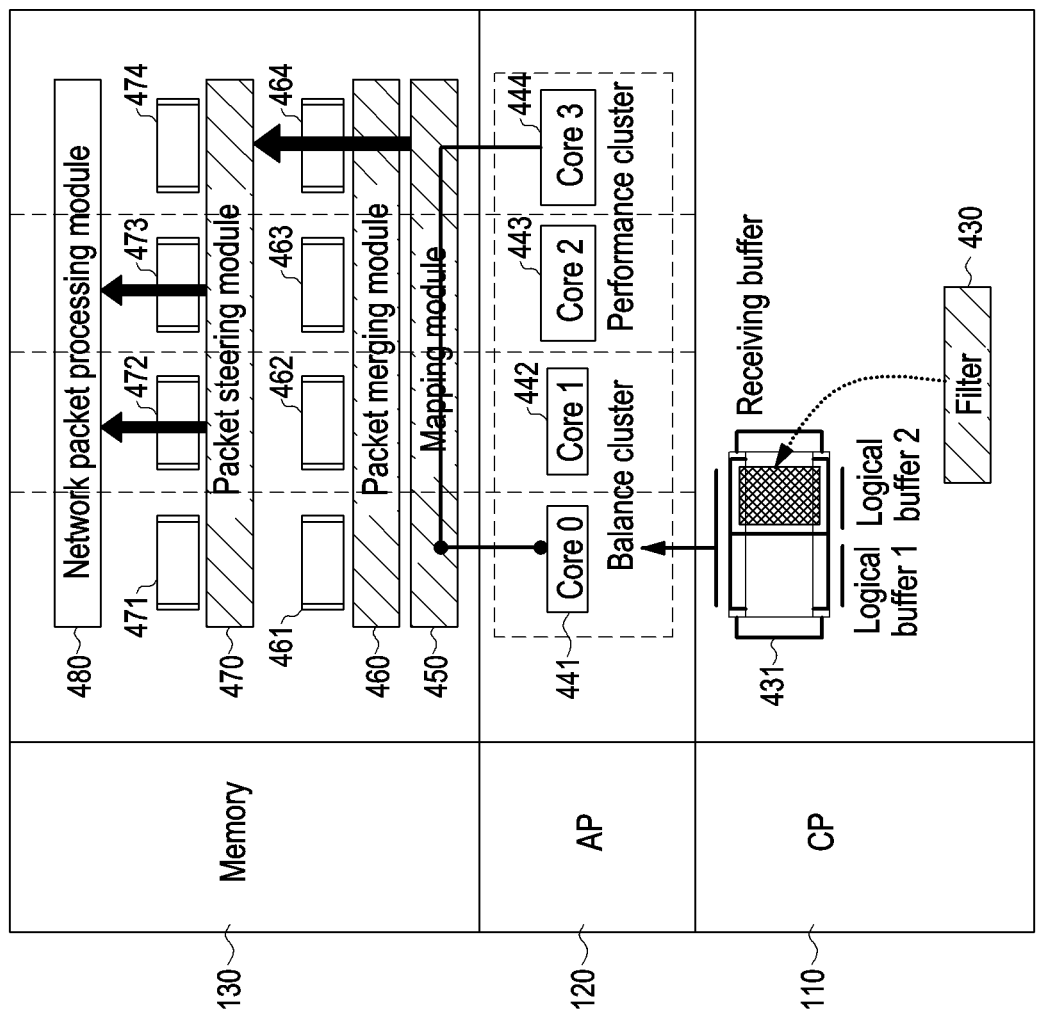
FIG. 24A illustrates data packet processing by an electronic device according to an embodiment of the disclosure.
Figure 24B:
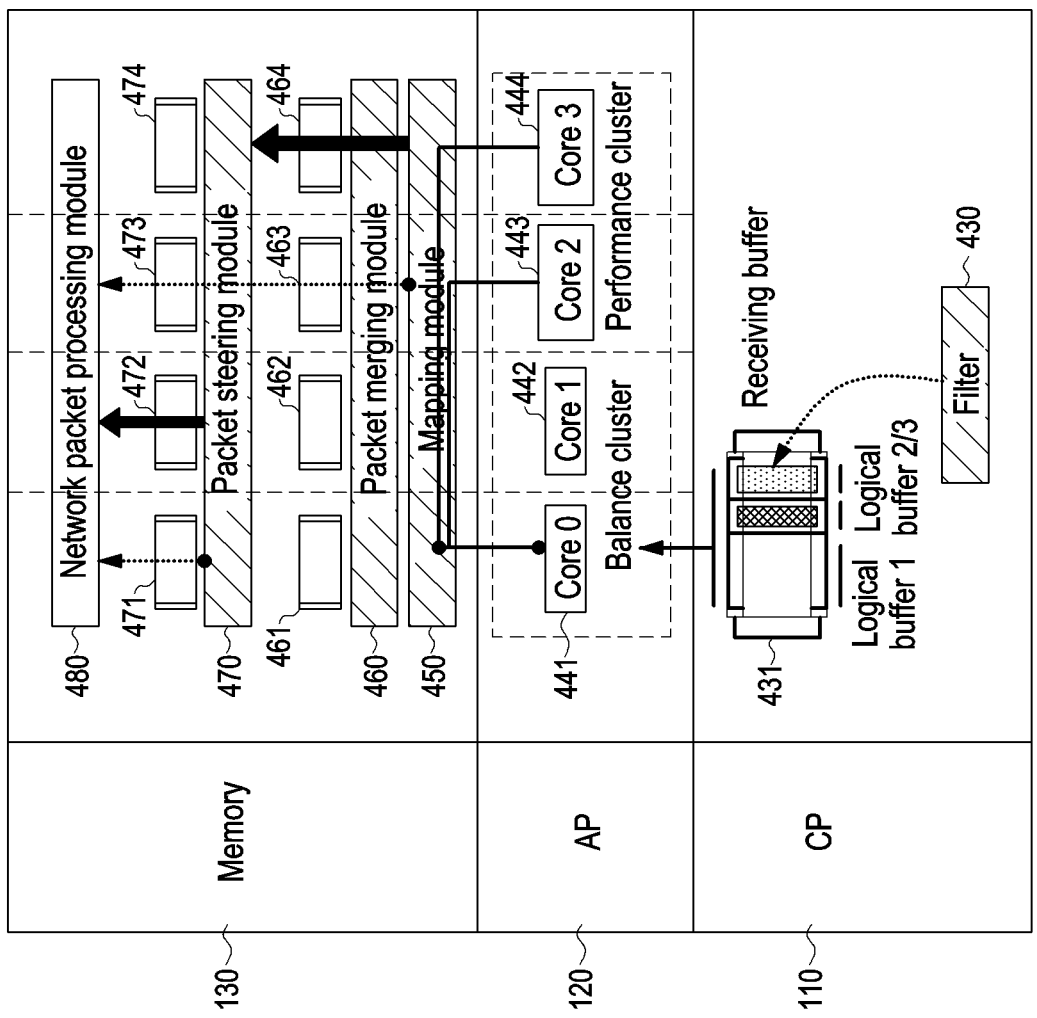
FIG. 24B illustrates data packet processing by an electronic device according to an embodiment of the disclosure.

FIGS. 24A and 24B illustrate data packet processing by an electronic device according to various embodiments of the disclosure.

Referring to FIG. 24A, the first session, the second session, and the third session may be stored in logical buffer 2 corresponding to the second group. Data packets of the first session, data packets of the second session, and data packets of the third session may have the fourth core 444 allocated thereto as the first operating core. Data packets of the first session may have the second core 442 allocated thereto as the second operating core, and data packets of the second session and data packets of the third session may have the third core 443 allocated thereto as the second operating core.

According to various embodiments of the disclosure, based on meta-information received by the mapping module 450 from the CP 110, if packets of a receiving logical buffer correspond to threshold value or more, or if the session number of packets inserted into the corresponding receiving logical buffer is equal to/larger than a threshold value, the controller 410 may request the filter 430 of the CP 110 to update an additional group, based on the amount of packets processed per time of each session in the packet merging module 460. According to various embodiments of the disclosure, the CP 110 may generate logical buffer 3, as illustrated in FIG. 24B, such that data packets of the corresponding session (for example, third session) are processed by a separate core. For example, as illustrated in FIG. 24B, data packets of the first session and data packets of the second session may be stored in newly generated logical buffer 3. Data packets of the third session may remain stored in existing logical buffer 2. According to various embodiments of the disclosure, the third session stored in logical buffer 2 may have the third core 443 allocated thereto as the first operating core and the second operating core. Data packets of the first session and data packets of the second session may have the fourth core 444 allocated thereto as the first operating core. Data packets of the first session may have the second core 442 allocated thereto as the second operating core, and data packets of the second session may have the first core 441 allocated thereto as the second operating core.

Figure 25:
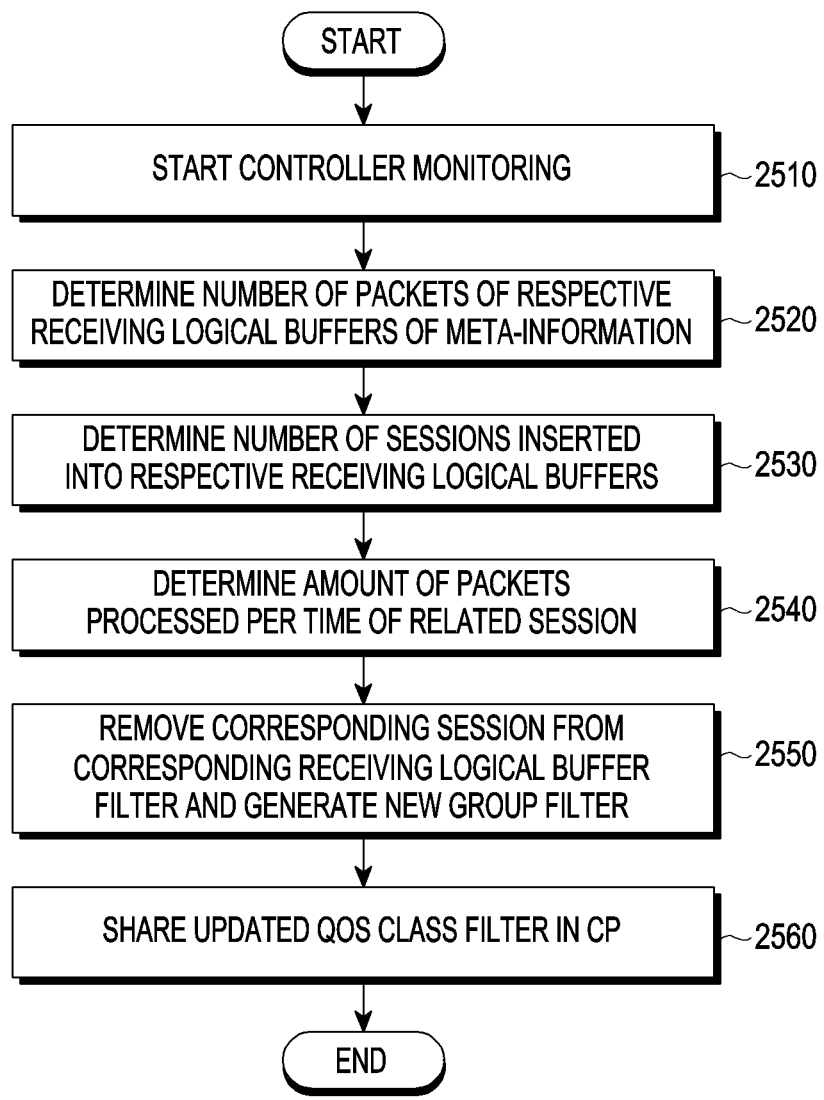
FIG. 25 illustrates a flow of operations for data packet processing by an electronic device according to an embodiment of the disclosure.

FIG. 25 illustrates a flow of operations for data packet processing by an electronic device according to an embodiment of the disclosure.

Referring to FIG. 25, according to various embodiments of the disclosure, the controller 410 may start monitoring in operation 2510. The controller 410 may determine the number of packets of each receiving logical buffer, based on meta-information, in operation 2520, may determine the number of sessions inserted into each receiving logical buffer in operation 2530, and may determine the amount of packets processed per time of the relevant session in operation 2540.

According to various embodiments of the disclosure, the controller 410 may remove the corresponding session from the corresponding receiving logical buffer filter, based on the determined pieces of information, and generate a new group filter in operation 2550. The controller 410 may share QoS class information in the filter 430 of the CP 110 such that the new group is generated.

Figure 26:
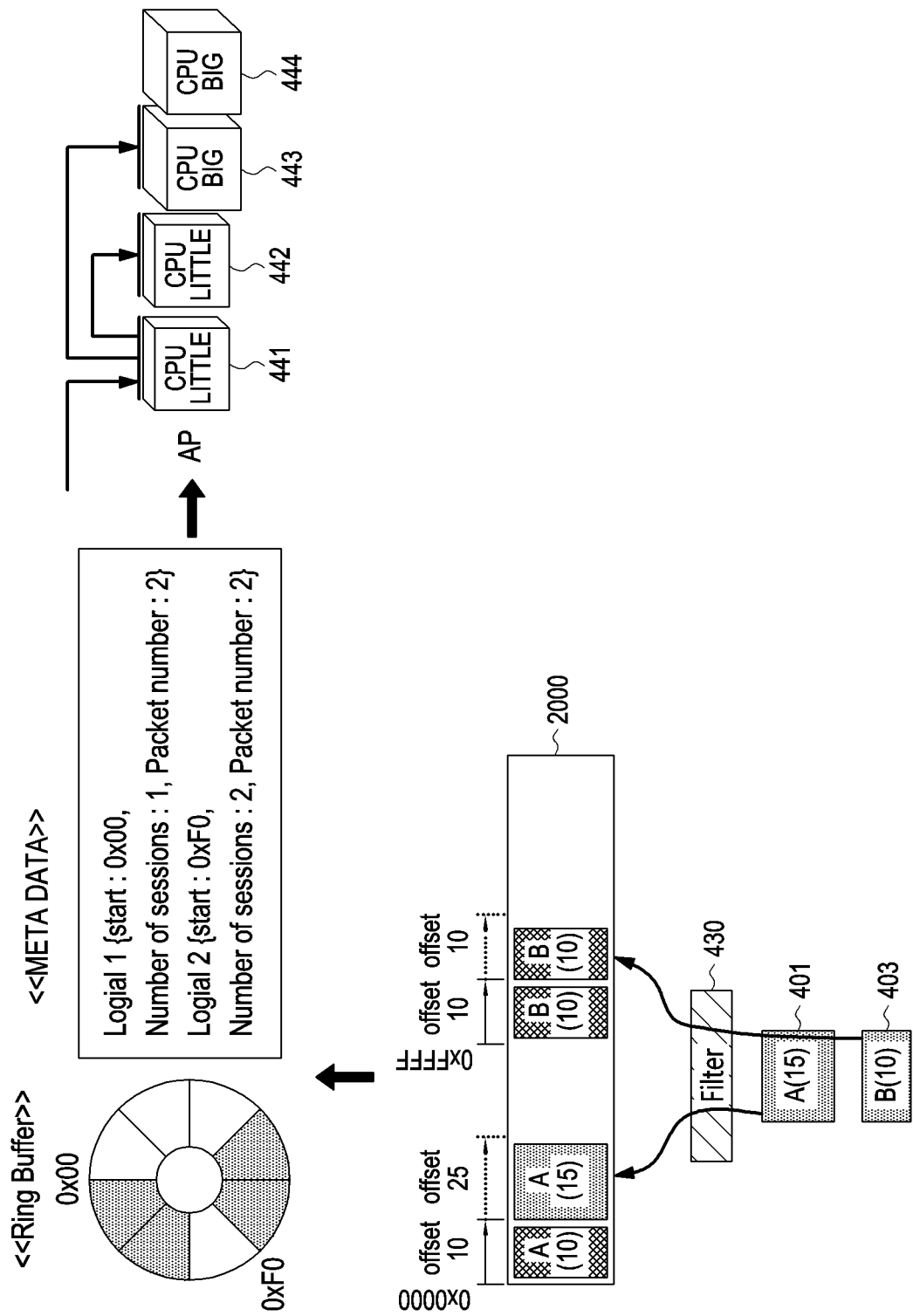
FIG. 26 illustrates data packet processing by an electronic device according to an embodiment of the disclosure.

FIG. 26 illustrates data packet processing by an electronic device according to an embodiment of the disclosure.

Referring to FIG. 26, the CP 110 may divide the on-memory write starting point into multiple ones, and may allocate data with reference to multiple offsets according to the filter. The CP 110 may transfer meta-information (or metadata) together with a ring buffer to the AP 120, and the AP 120 may map data packets received based on the transferred meta-information to multiple operating cores 441, 442, 443, and 444. For example, the filter 430 may receive data packets 401 of session A, and may store the received data packets 401 in a position next to already-stored data packets of session A in a receiving buffer. The filter 430 may receive data packets 403 of session B, and may store the received data packets 403 in a position next to already-stored data packets of session B in the receiving buffer. The CP 110 may parallel-process multiple software interrupts (bottom half) by utilizing a single physical interrupt (top half). According to various embodiments of the disclosure, the CP 110 may generate a flow ID (or session ID) by utilizing the size of received each frame and meta-information. For example, as illustrated in FIG. 26, A 15 may indicate meta-information A and a frame size of 15 bytes. The CP 110 may generate a flow ID, based on meta-information of a frame, by utilizing separate hardware or CP inner resources. Information utilized by the CP 110 may include at least one of a source IP address, a source port, a destination IP address, a destination port, and an IP protocol. The CP 110 may generate a flow ID or session ID in a method identical or similar to the above-mentioned method in which the AP 120 generates a flow ID or session ID.

According to various embodiments of the disclosure, the CP 110 may determine a receiving buffer by utilizing flow ID/group mapping information (or session ID/group mapping information) with reference to the flow ID of a received frame. In the case of a frame absent in the corresponding table, an arbitrary group may be configured, or a predefined default group may be configured. The CP 110 may position corresponding frame data in the position of the determined receiving buffer and then update the buffer state. For example, when positioning a received frame in a buffer, the CP 110 may update the number of packets inserted into the buffer and the number of inserted sessions. When the CP 110 transfers the current buffer to the AP 120, buffer memory information may be transferred to the AP 120 as meta-information. According to various embodiments of the disclosure, the meta-information may include at least one of a buffer number, the starting position of the buffer, the final position of the buffer, the packet number of the buffer, and the session number of the buffer. After the CP 110 transfers the buffer and meta-information to the AP 120, the CP 110 may initialize buffer information.

Figure 27A:
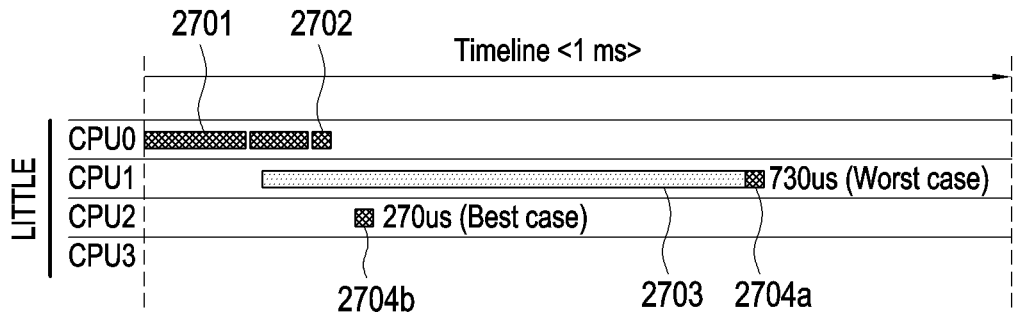
FIG. 27A illustrates data packet processing by an electronic device according to an embodiment of the disclosure.
Figure 27B:
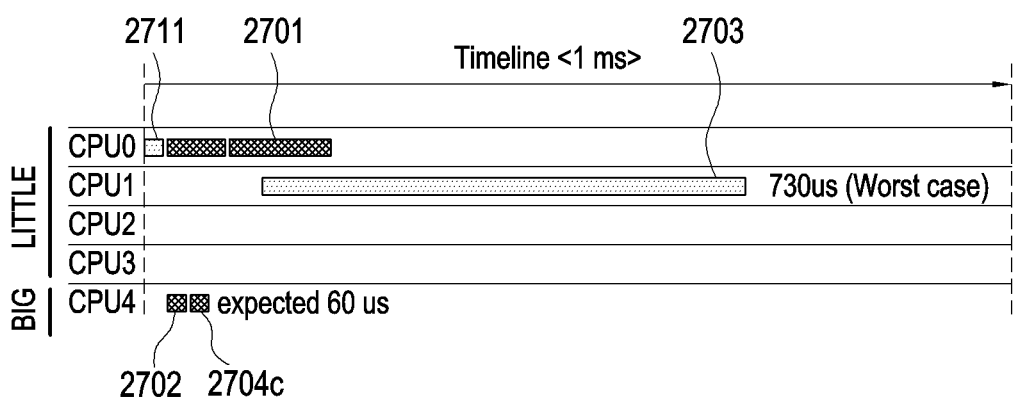
FIG. 27B illustrates data packet processing by an electronic device according to an embodiment of the disclosure.

FIGS. 27A and 27B illustrate data packet processing by an electronic device according to various embodiments of the disclosure.

Referring to FIG. 27A, when CPU0 performs packet distribution and merging with regard to a first session and a second session, stack processing regarding the second session may take 270 μs (minimum) to 730 μs (maximum). For example, packet distribution and merging 2701 regarding the first session and packet distribution and merging 2702 regarding the second session (for example, a session related to a low-latency service) may be performed by CPU0 (for example, first core). Network stack processing 2703 regarding the first session may be performed by CPU1 (for example, second core). Network stack processing regarding the second session may be processed after the network stack processing 2703 regarding the first session is completed by CPU1, as indicated by 2704a, or processed in a parallel manner through CPU2 (for example, third core) as indicated by 2704b. Network stack processing regarding the second session, if processed as indicated by 2704a, may take 730 μs, and if processed as indicated by 2704b, may take 270 μs.

In comparison, referring to FIG. 27B, according to various embodiments as described above, CPU0 may map the second session to a separate core, prior to packet merging, as indicated by 2711. After core mapping is first processed with regard to each session, as indicated by 2711, CPU0 may perform packet merging 2071, and CPU1 may perform network stack processing 2703, with regard to the first session. CPU4 may perform packet merging 2702 and network stack processing 2704c with regard to the second session. For example, stack processing regarding the second session may take 60 μs by mapping the second session from CPU0 to CPU4 (for example, fifth core) prior to packet merging. If the second session is related to a URLLC service, latency related to packet processing may be reduced by the method in FIG. 27B.

Figure 28A:
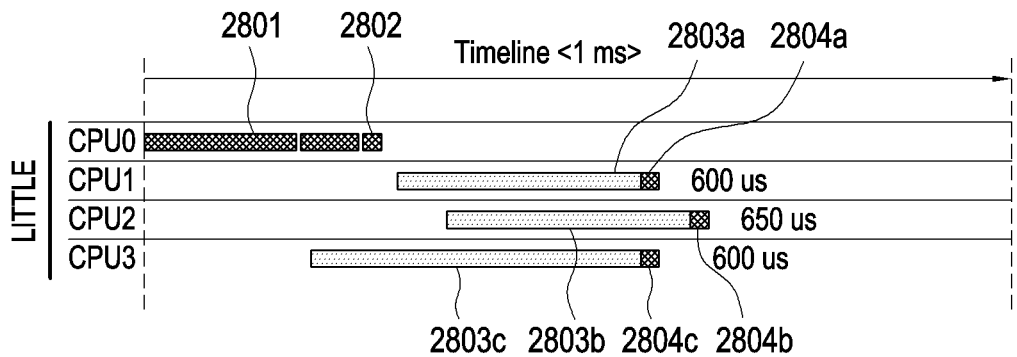
FIG. 28A illustrates data packet processing by an electronic device according to an embodiment of the disclosure.
Figure 28B:
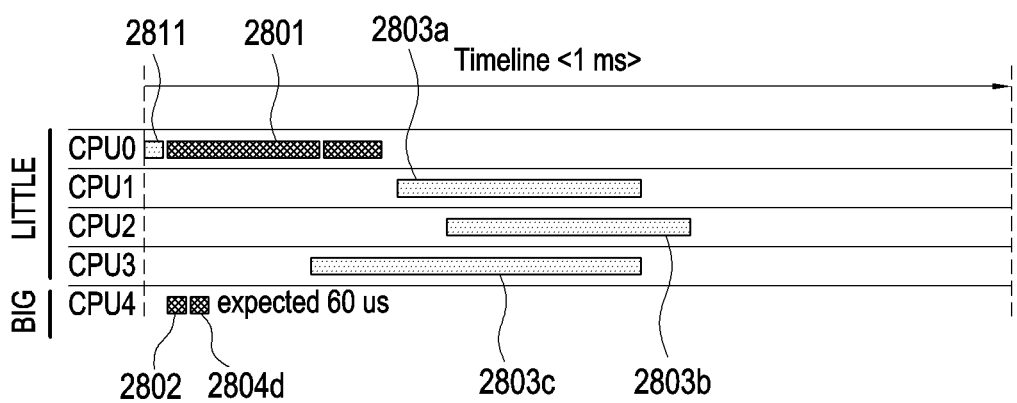
FIG. 28B illustrates data packet processing by an electronic device according to an embodiment of the disclosure.

FIGS. 28A and 28B illustrate data packet processing by an electronic device according to various embodiments of the disclosure.

Referring to FIG. 28A, when CPU0 performs packet distribution and merging with regard to a first session and a second session, stack processing regarding the second session may take 650 μs. For example, packet distribution and merging 2801 regarding the first session and packet distribution and merging 2802 regarding the second session (for example, a session related to a low-latency service) may be performed by CPU0 (for example, first core). Network stack processing 2803a, 2803b, and 2803c regarding the first session may be distributed processed by CPU1, CPU2, and CPU3. Network stack processing regarding the second session may be processed after the network stack processing 2803a, 2803b, and 2803c regarding the first session is completed by each CPU, as indicated by 2804a, 2804b, and 2804c. Network stack processing regarding the second session, if processed as indicated by 2804a, 2804b, and 2804c, may take 650 μs.

In comparison, referring to FIG. 28B, according to various embodiments as described above, CPU0 may map the second session to a separate core, prior to packet merging, as indicated by 2811. After core mapping is first processed with regard to each session, as indicated by 2811, CPU0 may perform packet merging 2081, and CPU1, CPU2, and CPU3 may perform network stack processing 2803a, 2803b, and 2803c in a parallel manner with regard to the first session. CPU4 may perform packet merging 2802 and network stack processing 2804d with regard to the second session. For example, stack processing regarding the second session may take 60 μs by mapping the second session from CPU0 to CPU4 prior to packet merging. If the second session is related to a URLLC service, latency related to packet processing may be reduced by the method in FIG. 28B.

Figure 29A:
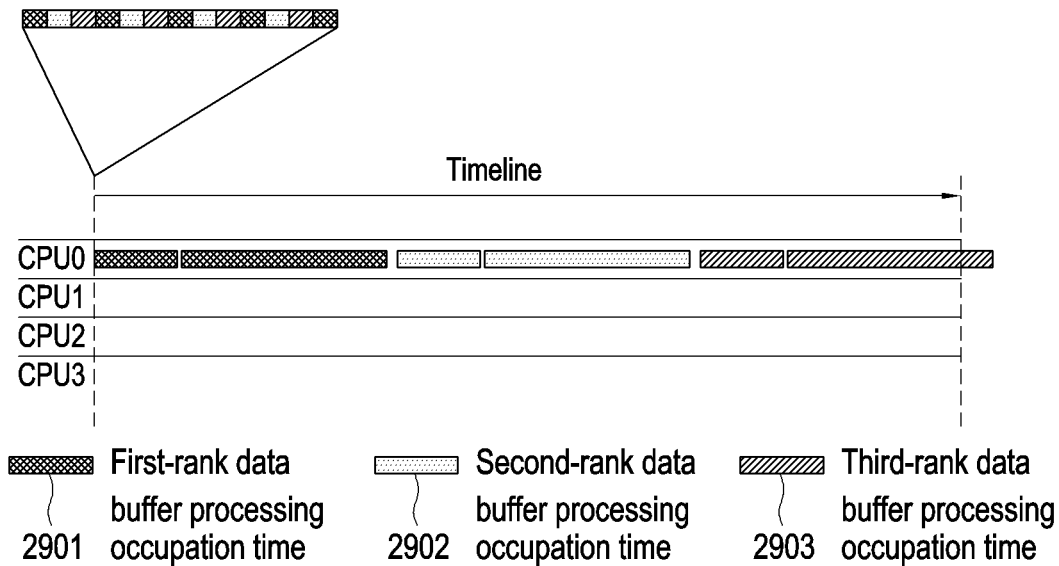
FIG. 29A illustrates data packet processing by an electronic device according to an embodiment of the disclosure.
Figure 29B:
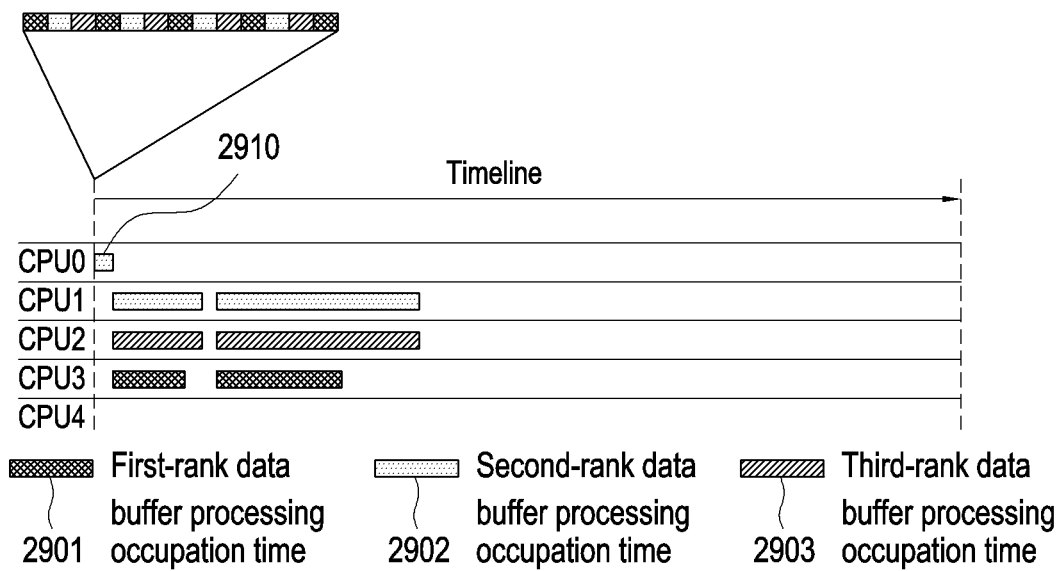
FIG. 29B illustrates data packet processing by an electronic device according to an embodiment of the disclosure.

FIGS. 29A and 29B illustrate data packet processing by an electronic device according to various embodiments of the disclosure.

Referring to FIG. 29A, if respective sessions are processed according to priority, processing of low-ranked sessions may be delayed. For example, buffer processing 2901 of first-rank data may be completed, buffer processing 2902 of second-rank data may then be completed, and buffer processing 2903 of third-rank data may be completed after buffer processing 2902 of the second-rank data is completed.

In comparison, referring to FIG. 29B, the overall packet processing speed may be improved by mapping data packets of respective session from CPU0 to CPU1 to CPU3, as indicated by 2910, before CPU0 merges packets as described above. For example, according to various embodiments as described above, CPU0 may map first-rank data, second-rank data, and third-rank data to separate cores, respectively, as indicated by 2910. Buffer processing 2901 of first-rank data, buffer processing 2902 of second-rank data, and buffer processing 2903 of third-rank data may be parallel-processed by CPU1, CPU2, and CPU3, respectively.

Figure 30:
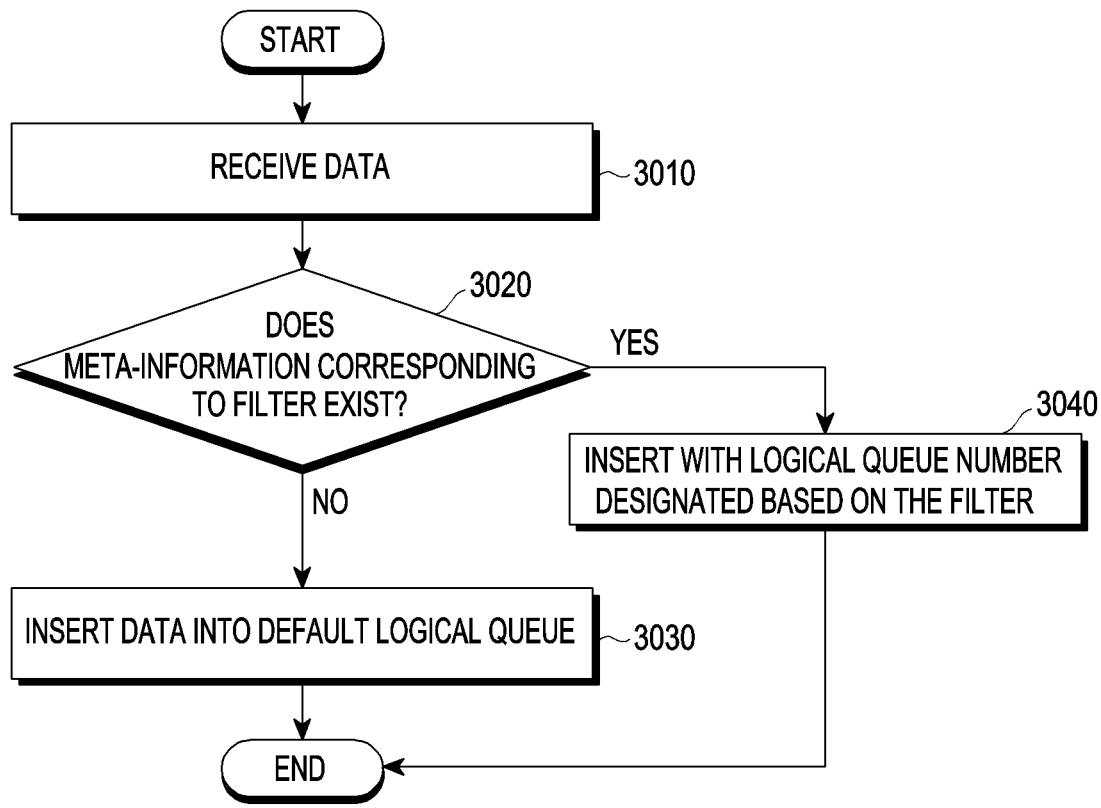
FIG. 30 illustrates a flow of operations for data packet processing by an electronic device according to an embodiment of the disclosure.

FIG. 30 illustrates a flow of operations for data packet processing by an electronic device according to an embodiment of the disclosure.

Referring to FIG. 30, the CP 110 may receive data in operation 3010. In operation 3020, if meta-information corresponding to a filter exists (Yes in operation 3020), the filter 430 of the CP 110 may insert data into a default logical queue (logical buffer) in operation 3030. In operation 3020, if no meta-information corresponding to a filter exists (No in operation 3020), the filter 430 of the CP 110 may insert data by using a logical queue (logical buffer) number designated based on the filter, in operation 3040.

Figure 31:
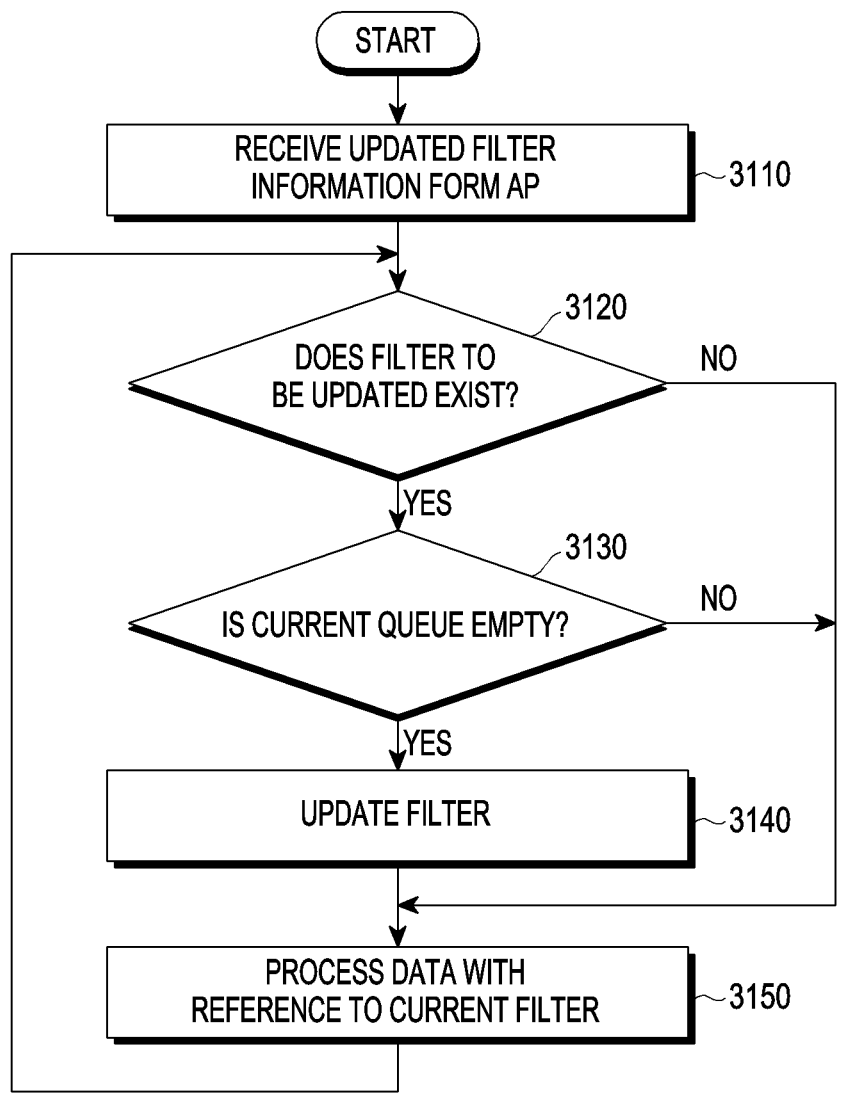
FIG. 31 illustrates a flow of operations for data packet processing by an electronic device according to an embodiment of the disclosure.

FIG. 31 illustrates a flow of operations for data packet processing by an electronic device according to an embodiment of the disclosure.

Referring to FIG. 31, the CP 110 may receive updated filter information from the AP 120 in operation 3110. If it is determined in operation 3120 that there exists a filter to be updated (Yes in operation 3120), it may be identified in operation 3130 whether the current queue is empty. If it is determined in operation 3130 that the current queue is empty (Yes in operation 3130), the CP 110 may update the filter in operation 3140, and may process data with reference to the current filter in operation 3150. If it is determined in operation 3120 that there exists no filter to be updated (No in operation 3120), data may be processed with reference to the current filter in operation 3150. If it is determined in operation 3130 that the current queue is not empty (No in operation 3130), data may be processed with reference to the current filter in operation 3150.

Figure 32:
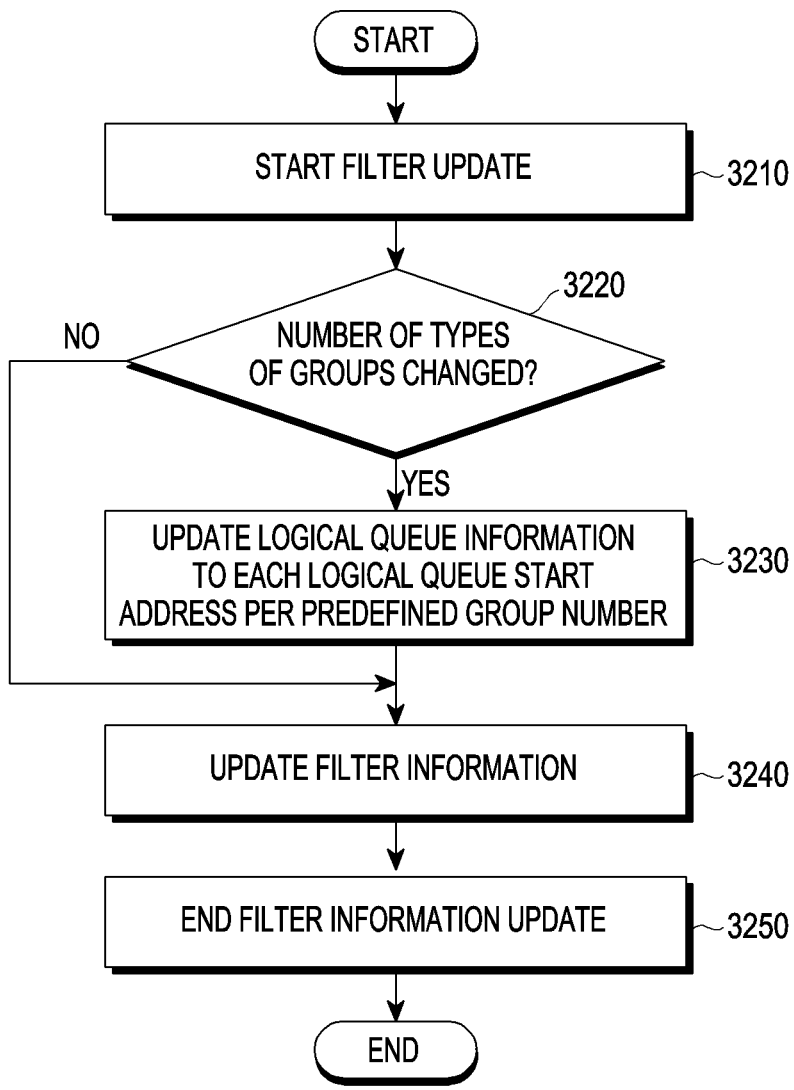
FIG. 32 illustrates a flow of operations for data packet processing by an electronic device according to an embodiment of the disclosure.

FIG. 32 illustrates a flow of operations for data packet processing by an electronic device according to an embodiment of the disclosure.

Referring to FIG. 32, the controller 410 may start filter update in operation 3210. If it is determined in operation 3220 that the number of group types is changed (Yes in operation 3220), the controller 410 may update logical queue information to each logical queue start address per predefined group number in operation 3230. The controller 410 may request the CP 110 to update filter information in operation 3240, and filter information update may be ended in operation 3250. If it is determined in operation 3220 that the number of group types is not changed (No in operation 3220), the controller 410 may request the CP 110 to update filter information without updating logical queue information in operation 3240.

Figure 33:
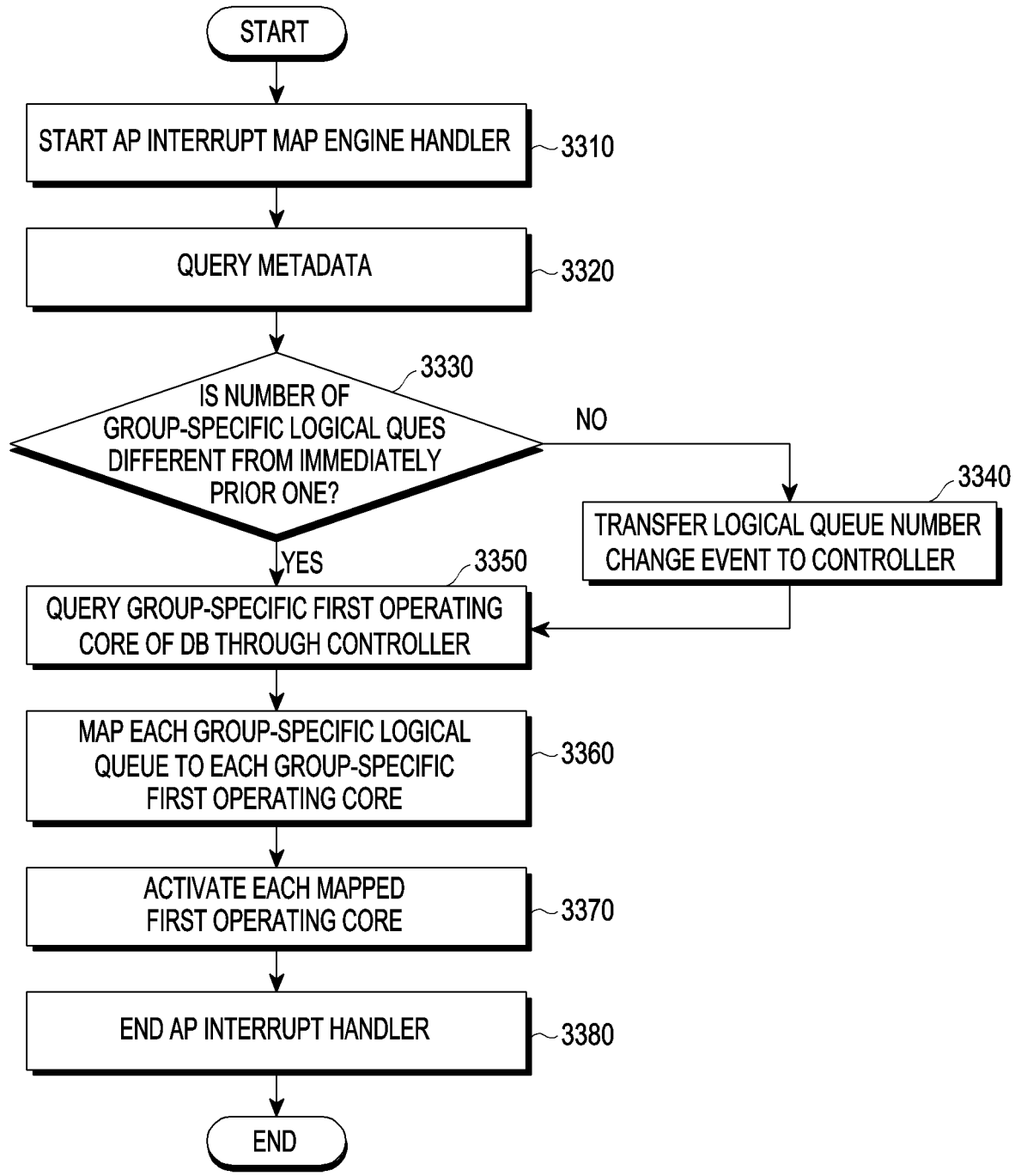
FIG. 33 illustrates a flow of operations for data packet processing by an electronic device according to an embodiment of the disclosure.

FIG. 33 illustrates a flow of operations for data packet processing by an electronic device according to an embodiment of the disclosure.

Referring to FIG. 33, the AP 120 may start an AP interrupt map engine (mapping module) handler in operation 3310. The AP 120 may query metadata in operation 3320 and may determine in operation 3330 whether the number of group-specific logical queues is different from the immediately prior one. If it is determined in operation 3330 that the number of group-specific logical queues is not different from the immediately prior one (No in operation 3330), the AP 120 may transfer a logical queue number change event to the controller 410 in operation 3340. If it is determined in operation 3330 that the number of group-specific logical queues is different from the immediately prior one (Yes in operation 3330), the AP 120 may query the group-specific first operating core of the database 42 through the controller 410 in operation 3350.

According to various embodiments of the disclosure, the AP 120 may map each group-specific logical queue to each group-specific first operating core in operation 3360, and may activate each mapped first operating core in operation 3370. The AP interrupt handler may be ended in operation 3380.

According to various embodiments of the disclosure, a filter structure may be configured as in Table 15 below, and a logical queue (receiving buffer) may be configured as in Table 16 and Table 17 below:

TABLE 15

| Flow ID | Group |
| --- | --- |
| 0001 | 1 |
| 0002 | 1 |

TABLE 16

| Group | Receiving buffer number |
| --- | --- |
| 0 | 0 |
| 1 | 1 |

TABLE 17

| Receiving buffer number | Starting address | Offset | Packet number | Session number |
| --- | --- | --- | --- | --- |
| 0 | 0x0000 | 0x256 | 2 | 1 |
| 1 | 0xFFFF | 0x0 | 2 | 1 |

According to various embodiments of the disclosure, the receiving buffer size may be determined by the CP 110 or the AP 120. For example, the CP 110 may determine the buffer size according to an internal policy. The CP 110 may determine the buffer size according to a predefined policy or a policy transferred from the AP 120. Each policy referred to by the CP 110 may include buffer-specific statistics of the CP, the number of frames inserted into respective framed during a threshold time, and the total number of frames received during a threshold time.

According to various embodiments of the disclosure, the AP 120 may determine the buffer size by using the interface of the CP 110 according to each policy. For example, the AP 120 may utilize, as the buffer-specific statistics of the CP 110, the number of frames inserted into respective framed during a threshold time and the total number of frames received during a threshold time. In addition, as session-specific statistics and information, the AP 120 may refer to the number of packets of respective sessions received during a threshold time, or the number of packets of received respective sessions and the number of received packets per buffer when converting buffers having respective sessions allocated thereto, or the category of an app and a buffer size allocated to the category.

According to various embodiments of the disclosure, the predefined policy may include a fixed size, an identical ratio against the entire size, a group-specific defined size or ratio. In connection with the buffer size in the above methods, the size may include an absolute size, a relative size (ratio), a relative ratio against the absolute size, the absolute number of buffers, the relative number of buffers, and a relative ratio against the entire number.

Figure 34:
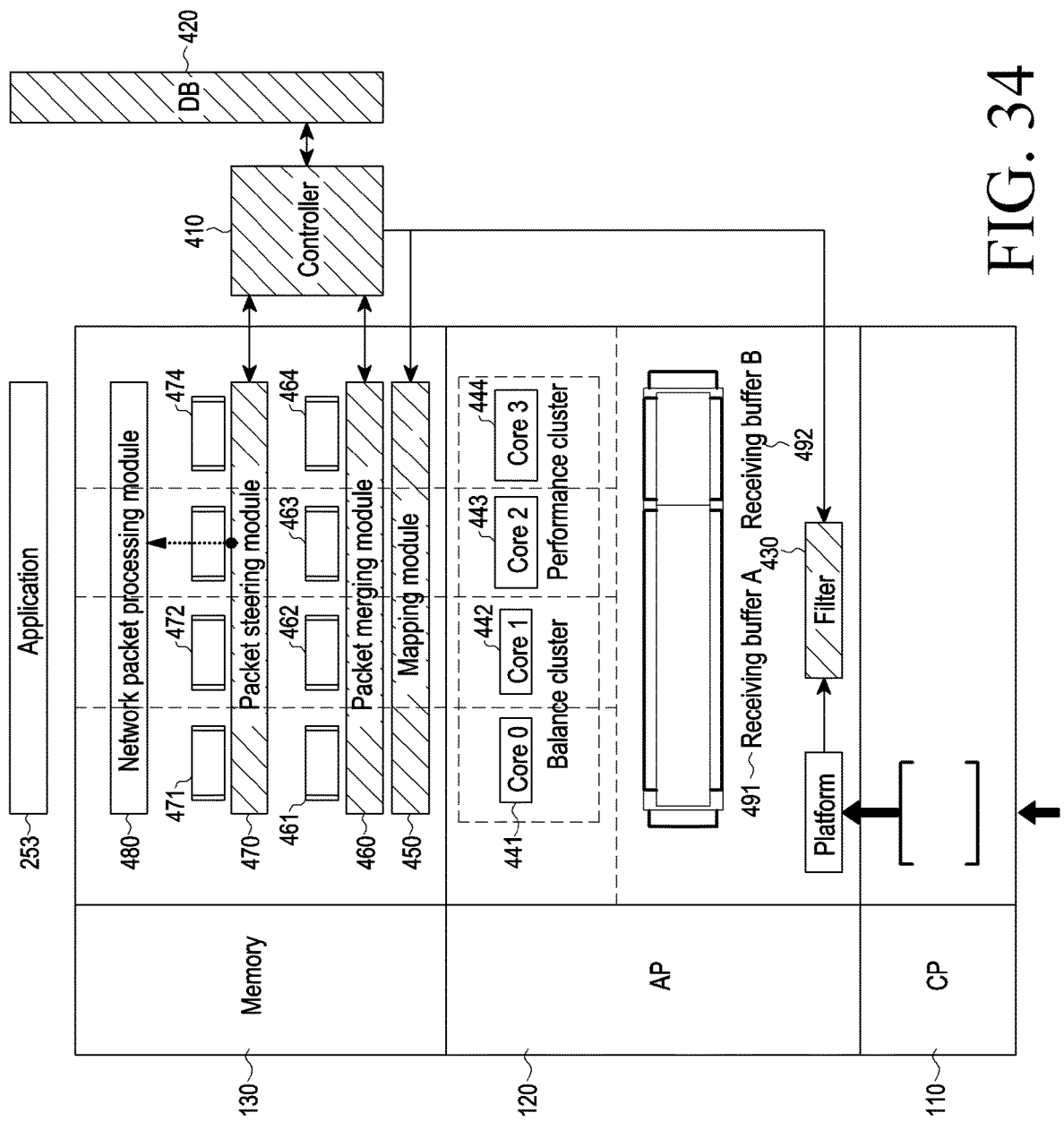
FIG. 34 illustrates a flow of operations for data packet processing by an electronic device according to an embodiment of the disclosure.

FIG. 34 illustrates a flow of operations for data packet processing by an electronic device according to an embodiment of the disclosure.

Referring to FIG. 34, if the CP 110 does not support generation of a logical buffer corresponding to a group, receiving buffers 491 and 492 may be generated inside the AP 120, thereby implementing the above-described embodiments.

For example, at least one receiving buffer (for example, receiving buffer A 491 and receiving buffer B 492) may be generated in the memory of the AP 120. The AP 120 may classify a frame (or data packet) transferred from the CP 110 and store the same in the receiving buffers 491 and 492 in the AP 120 so as to correspond to a filter transferred from the controller 410. The type of the frame may include a type before being allocated to a structure (for example, sk_buff in the case of a Linux kernel) for managing packets in a kernel similarly to a case in which the CP 110 processes received data according to a platform implemented in the AP 120 to receive a frame (or data packet) from the CP 110. In following operations, a configuration in which the AP 120 replaces the above-described CP 110 in above-described embodiments may be implemented as a program operating in at least one of a driver or a kernel, a packet processing platform, or a filter engine.

In various embodiments described above, the AP 120 and the CP 110 are described as separate components, but the AP 120 and the CP 110 are not necessarily configured as separate chips. For example, the AP 120 and the CP 110 may be configured as separate chips, respectively, or configured such that an application processor and a communication processor are included in a single chip. According to various embodiments described above, a controller 410 may be included in the AP 120 and may be included in a hardware component separately from the AP 120. For example, the controller 410 may be stored as a program 140 which has been described above with reference to FIG. 1, or which will be described later with reference to FIG. or implemented as one of an operating system 142 (for example, Android™, Linux™, iOS™, Windows™, Symbian™, Tizen™, or Bada™), middleware 144, or an application 146.

Figure 35:
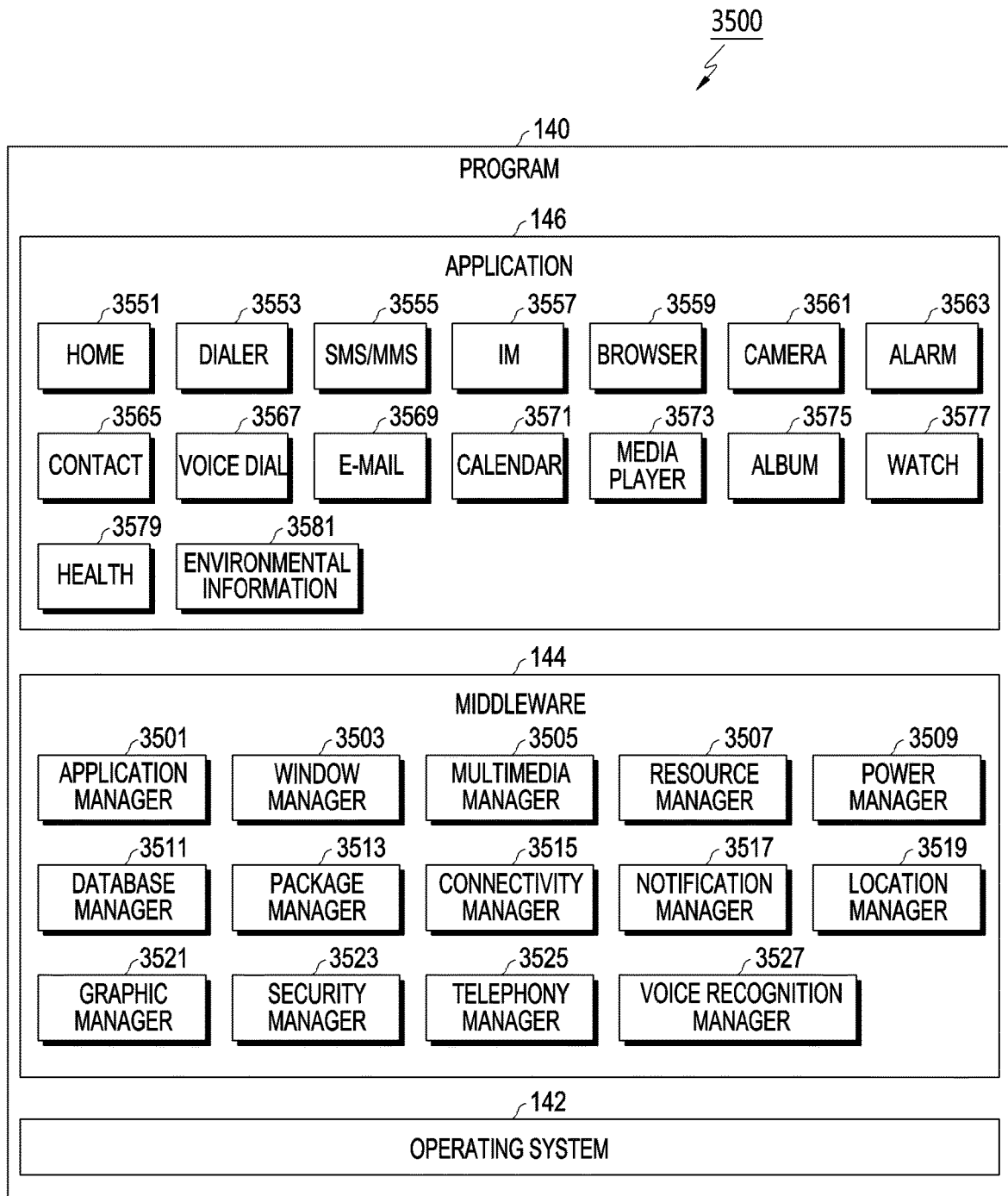
FIG. 35 is a block diagram illustrating an example of a program according to an embodiment of the disclosure.

FIG. 35 is a block diagram 3500 illustrating a program according to an embodiment of the disclosure.

Referring to FIG. 35, according to an embodiment of the disclosure, the program 140 may include an operating system 142 for controlling one or more resources of the electronic device 101, middleware 144, or an application 146 which can be executed by the operating system 142. The operating system 142 may include, for example, Android™, iOS™, Windows™, Symbian™, Tizen™, or Bada™. At least a partial program among the program 140 may be preloaded in the electronic device 101 during manufacturing, or downloaded from an external electronic device (for example, the external electronic device 102 or 104 or a server 108) or updated when used by a user, for example.

The operating system 142 may control management (for example, allocation or recovery) of one or more system resources (for example, a process, a memory, or a power supply) of the electronic device 101. Additionally or alternatively, the operating system 142 may include one or more driver programs for driving other hardware devices of the electronic device 101, for example, an input module 150, a sound output module 155, a display module 160, an audio module 170, a sensor module 176, an interface 177, a haptic module 179, a camera module 180, a power management module 188, a battery 189, a communication module 190, a subscriber identity module 196, or an antenna module 197.

The middleware 144 may provide various functions to the application 146 such that functions or information provided from one or more resources of the electronic device 101 can be used by the application 146. The middleware 144 may include, for example, an application manager 3501, a window manager 3503, a multimedia manager 3505, a resource manager 3507, a power manager 3509, a database manager 3511, a package manager 3513, a connectivity manager 3515, a notification manager 3517, a location manager 3519, a graphic manager 3521, a security manager 3523, a telephony manager 3525, or a speech recognition manager 3527.

The application manager 3501 may manage the life cycle of the application 146, for example. The window manager 3503 may manage one or more GUI resources used on the screen, for example. The multimedia manager 3505 may recognize one or more formats necessary to play media files and may perform encoding or decoding of a corresponding media file among the media files by using a codec conforming to a format selected therefrom. The resource manager 3507 may manage the source code of the application 146 or the memory space of the memory 130, for example. The power manager 3509 may manage the capacity, temperature, or power of the battery 189 and may determine or provide relevant information necessary for operations of the electronic device 101 by using corresponding information among the same, for example. According to an embodiment of the disclosure, the power manager 3509 may interwork with the basic input/output system (BIOS) (not illustrated) of the electronic device 101.

The database manager 3511 may generate, discover, or change a database to be used by the application 146, for example. The package manager 3513 may manage installation or update of an application distributed as a package file, for example. The connectivity manager 3515 may manage wireless connection or direct connection between the electronic device 101 and an external electronic device, for example. The notification manager 3517 may provide a function for notifying the user of the occurrence of a designated event (for example, incoming call, message, or alarm), for example. The location manager 3519 may manage position information of the electronic device 101, for example. The graphic manager 3521 may manage one or more graphic effects to be provided to the user or a user interface related thereto, for example.

The security manager 3523 may provide system security or user authentication, for example. The telephony manager 3525 may manage a voice communication function or a video communication function provided by the electronic device 101, for example. The speech recognition manager 3527 may transmit the user's speech data to the server 108 and may receive a command corresponding to a function to be performed by the electronic device 101 at least partially based on the speech data, or character data converted at least partially based on the speech data, from the server 108, for example. According to an embodiment of the disclosure, the middleware 3544 may dynamically delete some of existing components or add new components. According to an embodiment of the disclosure, at least a part of the middleware 144 may be included as a part of the operating system 142 or implemented as different software separate from the operating system 142.

The application 146 may include, for example, a home 3551, a dialer 3553, an SMS/MMS 3555, an instant message (IM) 3557, a browser 3559, a camera 3561, an alarm 3563, a contact 3565, speech recognition 3567, an e-mail 3569, a calendar 3571, a media player 3573, an album 3575, a watch 3577, health 3579 (for example, measuring biometric information, such as the amount of exercise or blood glucose), or environment information 3581 (for example, measuring atmospheric pressure, humidity, or temperature information) applications. According to an embodiment of the disclosure, the application 146 may further include an information exchange application (not illustrated) capable of supporting information exchange between the electronic device 101 and an external electronic device. The information exchange application may include, for example, a notification relay application configured to transfer designated information (for example, call, message, or alarm) to an external electronic device, or a device management application configured to manage the external electronic device. The notification relay application may transfer notification information corresponding to a designated event (for example, e-mail reception) occurred in another application (for example, e-mail application 3569) of the electronic device 101 to the external electronic device, for example. Additionally or alternatively, the notification relay application may receive notification information from the external electronic device and provide the same to the user of the electronic device 101.

The device management application may control the power (for example, turn-on or turn-off) or function (for example, brightness, resolution, or focus) of an external electronic device communicating with the electronic device 101 or some components thereof (for example, the display module or camera module of the external electronic device), for example. Additionally or alternatively, the device management application may support installation, deletion, or update of an application operating in the external electronic device.

An electronic device according to one of various embodiments may include an application processor including multiple cores, and a communication processor electrically connected to the application processor. The application processor may configure at least one session related to each application such that the at least one session corresponds to at least one core among the multiple cores, based on quality of service (QoS), transmit information corresponding to a first core configured for a first session among the at least one session to the communication processor, receive a data packet of the first session from the communication processor, and process the received data packet of the first session through the first core configured for the first session, based on information corresponding to the first core.

According to various embodiments of the disclosure, the first session may be a session related to ultra reliable low latency communication (URLLC), and the first core may be a core having a relatively high processing speed among the multiple cores.

According to various embodiments of the disclosure, the communication processor may receive information corresponding to the first core from the application processor, allocate a logical buffer corresponding to the first core, based on information corresponding to the first core, and in case that a data packet of the first session is received from an external electronic device, store the received data packet of the first session in the logical buffer allocated corresponding to the first core.

According to various embodiments of the disclosure, the information corresponding to the first core may correspond to first group information configured by grouping at least one session.

According to various embodiments of the disclosure, the application processor may distribute a data packet received from the communication processor to each core of the multiple cores, and control a packet merging policy to be applied to each session of the received data packet for the data packet distributed to each core.

According to various embodiments of the disclosure, the application processor may control packet merging to be performed by the first core for the first session, and control network packet processing to be performed by the first core for the first session.

According to various embodiments of the disclosure, the application processor may control packet merging to be performed by the first core for the first session, and control network packet processing to be performed by a second core different from the first core for the first session.

According to various embodiments of the disclosure, the application processor may receive meta-information from the communication processor, and control the data packet of the first session received from the communication processor to be processed through the first core, based on the received meta-information.

An electronic device according to one of various embodiments may include an application processor including multiple cores, and a communication processor electrically connected to the application processor. The application processor may configure at least one session related to each application such that the at least one session corresponds to at least one core among multiple cores included in the application processor, based on quality of service (QoS), receive a data packet of a first session among the at least one session from the communication processor, store the received data packet of the first session in a buffer allocated for a first core configured corresponding to the first session among the multiple cores, and process the data packet of the first session stored in the buffer through the first core.

According to various embodiments of the disclosure, the application processor may apply a packet merging policy regarding the data packet of the first session through the first core.

According to various embodiments of the disclosure, the first session may be a session related to ultra reliable low latency communication (URLLC), and the first core may be a core having a relatively high processing speed among the multiple cores.

A method for operating an electronic device according to one of various embodiments may be a method for processing a received data packet by an electronic device, the method including the operations of configuring at least one session related to each application such that the at least one session corresponds to at least one core among multiple cores included in an application processor, based on quality of service (QoS), transmitting information corresponding to a first core configured for a first session among the at least one session to the communication processor by the application processor, receiving a data packet of the first session from the communication processor by the application processor, and processing the received data packet of the first session through the first core configured for the first session, based on information corresponding to the first core.

According to various embodiments of the disclosure, the first session may be a session related to ultra reliable low latency communication (URLLC), and the first core may be a core having a relatively high processing speed among the multiple cores.

According to various embodiments of the disclosure, the method may include the operations of receiving information corresponding to the first core from the application processor, allocating a logical buffer corresponding to the first core, based on information corresponding to the first core, and in case that a data packet of the first session is received from an external electronic device, storing the received data packet of the first session in the logical buffer allocated corresponding to the first core.

According to various embodiments of the disclosure, the information corresponding to the first core may correspond to first group information configured by grouping at least one session.

According to various embodiments of the disclosure, the method may include the operations of distributing a data packet received from the communication processor to each core of the multiple cores, and controlling a packet merging policy to be applied to each session of the received data packet for the data packet distributed to each core.

According to various embodiments of the disclosure, the method may include the operations of controlling packet merging to be performed by the first core for the first session, and controlling network packet processing to be performed by the first core for the first session.

According to various embodiments of the disclosure, the method may include the operations of controlling packet merging to be performed by the first core for the first session, and controlling network packet processing to be performed by a second core different from the first core for the first session.

According to various embodiments of the disclosure, the method may include the operations of receiving meta-information from the communication processor by the application processor, and processing the data packet of the first session received from the communication processor through the first core, based on the received meta-information.

A method for operating an electronic device according to one of various embodiments may be a method for processing a received data packet by an electronic device, the method including the operations of configuring at least one session related to each application such that the at least one session corresponds to at least one core among multiple cores included in an application processor, based on quality of service (QoS), receiving a data packet of a first session among the at least one session from the communication processor by the application processor, storing the received data packet of the first session in a buffer allocated for a first core configured corresponding to the first session among the multiple cores, and processing the data packet of the first session stored in the buffer through the first core.

According to various embodiments of the disclosure, the method may include an operation of applying a packet merging policy regarding the data packet of the first session through the first core.

According to various embodiments of the disclosure, the first session may be a session related to ultra reliable low latency communication (URLLC), and the first core may be a core having a relatively high processing speed among the multiple cores.

A processing chip according to one of various embodiments may include an application processor including multiple cores, and a communication processor electrically connected to the application processor inside the processing chip. The application processor may configure at least one session related to each application such that the at least one session corresponds to at least one core among the multiple cores, based on quality of service (QoS), transmit information corresponding to a first core configured for a first session among the at least one session to the communication processor, receive a data packet of the first session from the communication processor, and process the received data packet of the first session through the first core configured for the first session, based on information corresponding to the first core.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., a master device or task performing device). For example, a processor of the machine (e.g., a master device or task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an application processor comprising multiple cores; and
a communication processor electrically connected to the application processor,
wherein the application processor is configured to:
correspond at least one session related to an application to at least one core among the multiple cores, wherein the multiple cores includes a first group of cores having a first processing performance and a first power consumption characteristics and a second group of cores having a second processing performance and a second power consumption characteristics,
transmit information on a group of at least one session corresponding to a first core among the multiple cores to the communication processor,
receive a data packet of a first session among the at least one session corresponding to the first core, from the communication processor,
distribute the data packet of the first session to the first core among the multiple cores, based on information on the group of the at least one session corresponding to the first core, and
process the data packet of the first session through the first core, and
wherein the first session is a session related to ultra reliable low latency communication (URLLC), which requires to be processed based on the first processing performance.

2. The electronic device of claim 1,
wherein the first core is a core having a relatively high processing speed among the multiple cores.

3. The electronic device of claim 1, wherein the communication processor is configured to:
receive information corresponding to the first core from the application processor,
allocate a logical buffer corresponding to the first core, based on information corresponding to the first core, and
in case that a data packet of the first session is received from an external electronic device, store the received data packet of the first session in the logical buffer allocated corresponding to the first core.

4. The electronic device of claim 3, wherein the information corresponding to the first core corresponds to first group information configured by grouping at least one session.

5. The electronic device of claim 1, wherein the application processor is further configured to:

distribute a data packet received from the communication processor to each core of the multiple cores, and
control a packet merging policy to be applied to each session of the received data packet for the data packet distributed to each core.

6. The electronic device of claim 1, wherein the application processor is further configured to:
receive meta-information from the communication processor, and
control the data packet of the first session received from the communication processor to be processed through the first core, based on the received meta-information.

7. The electronic device of claim 1, wherein the application processor is further configured to:
control packet merging to be performed by the first core for the first session, and
control network packet processing to be performed by a second core different from the first core for the first session.

8. An electronic device comprising:
an application processor comprising multiple cores; and
a communication processor electrically connected to the application processor,
wherein the application processor is configured to:
correspond at least one session related to an application to at least one core among multiple cores included in the application processor, wherein the multiple cores includes a first group of cores having a first processing performance and a first power consumption characteristics and a second group of cores having a second processing performance and a second power consumption characteristics,
receive a data packet of a first session among the at least one session corresponding to a first core, from the communication processor,
store the data packet of the first session in a buffer allocated for the first core among the multiple cores, based on information on a group of the at least one session corresponding to the first core, and
process the data packet of the first session stored in the buffer through the first core, and
wherein the first session is a session related to ultra reliable low latency communication (URLLC), which requires to be processed based on the first processing performance.

9. A method for processing a received data packet by an electronic device, the method comprising:
correspond at least one session related to an application to at least one core among multiple cores included in an application processor, wherein the multiple cores includes a first group of cores having a first processing performance and a first power consumption characteristics and a second group of cores having a second processing performance and a second power consumption characteristics;
transmitting information on a group of at least one session corresponding to a first core among the multiple cores to a communication processor by the application processor;
receiving a data packet of a first session among the at least one session corresponding to the first core, from the communication processor by the application processor;
distribute the data packet of the first session to the first core among the multiple cores, based on information on the group of the at least one session corresponding to the first core; and processing the data packet of the first session through the first core; and wherein the first session is a session related to ultra reliable low latency communication (URLLC), which requires to be processed based on the first processing performance.

10. The method of claim 9, further comprising:

receiving information corresponding to the first core from the application processor;

allocating a logical buffer corresponding to the first core, based on information corresponding to the first core; and in case that a data packet of the first session is received from an external electronic device, storing the received data packet of the first session in the logical buffer allocated corresponding to the first core.

11. The method of claim 10, wherein the information corresponding to the first core corresponds to first group information configured by grouping at least one session.

12. The method of claim 9, further comprising:

distributing a data packet received from the communication processor to each core of the multiple cores; and controlling a packet merging policy to be applied to each session of the received data packet for the data packet distributed to each core.

13. The method of claim 9, further comprising:

receiving meta-information from the communication processor by the application processor; and processing the data packet of the first session received from the communication processor through the first core, based on the received meta-information.

14. The method of claim 9, further comprising:

controlling packet merging to be performed by the first core for the first session; and controlling network packet processing to be performed by a second core different from the first core for the first session.

15. One or more non-transitory computer-readable storage media storing computer-executable instructions that, when executed by at least one processor, configure a display device to preform operations comprising:

correspond at least one session related to an application to at least one core among multiple cores included in an application processor, wherein the multiple cores includes a first group of cores having a first processing performance and a first power consumption characteristics and a second group of cores having a second processing performance and a second power consumption characteristics;

receiving a data packet of a first session among the at least one session corresponding to a first core, from a communication processor by the application processor;

storing the data packet of the first session in a buffer allocated for the first core among the multiple cores, based on information on a group of the at least one session corresponding to the first core; and processing the data packet of the first session stored in the buffer through the first core, wherein the first session is a session related to ultra reliable low latency communication (URLLC), which requires to be processed based on the first processing performance.

16. The one or more non-transitory computer-readable storage media of claim 15, wherein the first core is a core having a relatively high processing speed among the multiple cores.

17. One or more non-transitory computer-readable storage media storing computer-executable instructions that, when executed by at least one processor, configure a display device to preform operations comprising:

correspond at least one session related to an application to at least one core among multiple cores included in an application processor, wherein the multiple cores includes a first group of cores having a first processing performance and a first power consumption characteristics and a second group of cores having a second processing performance and a second power consumption characteristics;

transmitting information on a group of at least one session corresponding to a first core among the multiple cores to a communication processor by the application processor;

receiving a data packet of a first session among the at least one session corresponding to the first core, from the communication processor by the application processor;

distribute the data packet of the first session to the first core among the multiple cores, based on information on the group of the at least one session corresponding to the first core; and processing the data packet of the first session through the first core, wherein the first session is a session related to ultra reliable low latency communication (URLLC), which requires to be processed based on the first processing performance.

18. The one or more non-transitory computer-readable storage media of claim 17, wherein the operations further comprising:

receiving information corresponding to the first core from the application processor;

allocating a logical buffer corresponding to the first core, based on information corresponding to the first core; and in case that a data packet of the first session is received from an external electronic device, storing the received data packet of the first session in the logical buffer allocated corresponding to the first core.

19. The one or more non-transitory computer-readable storage media of claim 17, wherein the operations further comprising:

distributing a data packet received from the communication processor to each core of the multiple cores; and controlling a packet merging policy to be applied to each session of the received data packet for the data packet distributed to each core.

20. The one or more non-transitory computer-readable storage media of claim 17, wherein the operations further comprising:

receiving meta-information from the communication processor by the application processor; and processing the data packet of the first session received from the communication processor through the first core, based on the received meta-information.

* * * * *